(12) United States Patent
Hines et al.

(10) Patent No.: US 11,470,037 B2
(45) Date of Patent: Oct. 11, 2022

(54) NAVIGATION PATHWAY GENERATION

(71) Applicant: Self Financial, Inc., Austin, TX (US)

(72) Inventors: Brandon Hines, Austin, TX (US); Philip Baggett, Austin, TX (US)

(73) Assignee: Self Financial, Inc., Austin, TX (US)

( * ) Notice: Subject to any disclaimer, the term of this patent is extended or adjusted under 35 U.S.C. 154(b) by 0 days.

(21) Appl. No.: 17/464,585

(22) Filed: Sep. 1, 2021

(65) Prior Publication Data

US 2022/0078149 A1 Mar. 10, 2022

Related U.S. Application Data

(63) Continuation-in-part of application No. 17/015,761, filed on Sep. 9, 2020.

(60) Provisional application No. 63/086,475, filed on Oct. 1, 2020.

(51) Int. Cl.
*H04L 51/42* (2022.01)
*G06F 3/04842* (2022.01)

(52) U.S. Cl.
CPC .......... *H04L 51/42* (2022.05); *G06F 3/04842* (2013.01)

(58) Field of Classification Search
CPC .............................. H04L 51/22; G06F 3/04842
See application file for complete search history.

(56) References Cited

U.S. PATENT DOCUMENTS

| | | | |
|---|---|---|---|
| 5,798,508 A | 8/1998 | Walker | |
| 5,926,816 A | 7/1999 | Bauer | |
| 6,101,510 A * | 8/2000 | Stone | H04L 67/02 715/234 |
| 6,173,316 B1 * | 1/2001 | De Boor | G06F 9/451 709/203 |
| 6,353,839 B1 * | 3/2002 | King | G06F 40/143 715/236 |
| 6,401,104 B1 | 6/2002 | LaRue | |

(Continued)

FOREIGN PATENT DOCUMENTS

WO 2019053324 A1 3/2019

OTHER PUBLICATIONS

Non-Final Office Action in related U.S. Appl. No. 17/464,585 dated Mar. 16, 2022.

(Continued)

*Primary Examiner* — Jeremy L Stanley
(74) *Attorney, Agent, or Firm* — Pillsbury Winthrop Shaw Pittman, LLP

(57) ABSTRACT

A method includes obtaining a first message from a client device, determining a set of values based on the first message, where first and second subsets of values of the set of values is associated with a first and second navigation screens, respectively. The method also includes generating a second message including the set of values and sending the second message to the client device. The method also includes updating a navigation stack stored on the client device based on the set of values by inserting a value of the first subset before a value of the second subset in a sequence of the navigation stack. The method also includes displaying the second navigation screen based on the second subset, where an interaction with a user interface element of the client device causes the client device to display the first navigation screen.

21 Claims, 18 Drawing Sheets

(56) References Cited

U.S. PATENT DOCUMENTS

| | | | |
|---|---|---|---|
| 6,460,058 B2 * | 10/2002 | Koppolu | G06F 16/748 707/E17.013 |
| 6,978,445 B2 * | 12/2005 | Laane | G06F 16/957 717/125 |
| 6,990,503 B1 | 1/2006 | Luo | |
| 7,024,386 B1 | 4/2006 | Mills | |
| 7,065,496 B2 | 6/2006 | Subbloie | |
| 7,308,457 B1 | 12/2007 | Sundman | |
| 7,346,848 B1 * | 3/2008 | Ruthfield | G06F 3/0481 715/802 |
| 7,523,191 B1 * | 4/2009 | Thomas | G06F 11/3476 709/224 |
| 7,653,744 B2 * | 1/2010 | Kanefsky | H04L 67/04 455/445 |
| 7,689,506 B2 | 3/2010 | Fei | |
| 7,774,444 B1 | 8/2010 | George | |
| 7,783,757 B2 * | 8/2010 | Plamondon | H04L 67/28 709/225 |
| 8,027,983 B1 | 9/2011 | Nandy et al. | |
| 8,117,623 B1 | 2/2012 | Malasky | |
| 8,250,064 B1 | 8/2012 | Ramesh | |
| 8,412,593 B1 | 4/2013 | Song | |
| 8,433,996 B2 * | 4/2013 | Paulsami | G06F 3/0482 715/830 |
| 8,595,101 B1 | 11/2013 | Daukas | |
| 8,688,713 B1 | 4/2014 | Upstill et al. | |
| 8,751,378 B2 | 6/2014 | Domhelm | |
| 8,881,250 B2 * | 11/2014 | Yefimov | H04W 12/06 726/19 |
| 8,954,887 B1 | 2/2015 | Tseng | |
| 9,117,003 B2 * | 8/2015 | Stellanova | G06F 16/954 |
| 9,128,895 B2 | 9/2015 | Chan | |
| 9,195,477 B1 * | 11/2015 | Spencer | H04L 45/745 |
| 9,256,904 B1 | 2/2016 | Haller | |
| 9,285,958 B1 * | 3/2016 | Hill | G06F 16/954 |
| 9,350,717 B1 | 5/2016 | Siddiqui | |
| 9,535,560 B1 | 1/2017 | Heiney | |
| 9,536,263 B1 | 1/2017 | Dean | |
| 9,558,047 B1 * | 1/2017 | Joyce | H04W 4/024 |
| 9,575,617 B1 * | 2/2017 | Joyce | G06F 16/9566 |
| 9,594,477 B1 * | 3/2017 | Ardakani | G06F 16/957 |
| 9,600,350 B2 | 3/2017 | Jooste | |
| 9,645,707 B1 * | 5/2017 | Joyce | G06F 16/958 |
| 9,652,508 B1 | 5/2017 | Imaizumi et al. | |
| 9,652,712 B2 | 5/2017 | Corrado | |
| 9,690,820 B1 | 6/2017 | Girulat, Jr. | |
| 9,710,852 B1 | 7/2017 | Olson | |
| 9,740,751 B1 * | 8/2017 | Yeom | G06F 3/167 |
| 9,747,288 B1 | 8/2017 | Beckford | |
| 9,760,602 B1 | 9/2017 | Ghodsi | |
| 9,806,942 B2 * | 10/2017 | Saxena | G06F 16/951 |
| 9,838,458 B2 * | 12/2017 | Boudville | H04L 67/38 |
| 9,842,330 B1 | 12/2017 | Van Os | |
| 9,870,589 B1 | 1/2018 | Arnold | |
| 9,886,175 B1 * | 2/2018 | Cox | G06F 9/451 |
| 9,910,685 B2 * | 3/2018 | Desineni | G06F 9/451 |
| 9,916,621 B1 | 3/2018 | Wasser | |
| 9,953,093 B1 * | 4/2018 | Cudich | G06F 16/986 |
| 9,983,892 B2 * | 5/2018 | Desineni | G06F 9/451 |
| 9,996,561 B1 | 6/2018 | Barsness | |
| 10,049,136 B1 | 8/2018 | Barsness | |
| 10,055,308 B2 * | 8/2018 | Tomnikov | G06F 16/957 |
| 10,057,227 B1 | 8/2018 | Hess | |
| 10,061,852 B1 | 8/2018 | Plenderleith | |
| 10,089,053 B2 * | 10/2018 | Gerlach | G09G 5/003 |
| 10,177,967 B2 * | 1/2019 | Lakes | H04L 67/2814 |
| 10,178,111 B1 | 1/2019 | Wilson | |
| 10,198,144 B2 * | 2/2019 | Munoz | G06F 3/0481 |
| 10,205,718 B1 | 2/2019 | Chang | |
| 10,229,208 B2 | 3/2019 | Hopkins | |
| 10,282,143 B2 * | 5/2019 | Yano | H04N 1/00411 |
| 10,296,629 B2 | 5/2019 | Chidambaran | |
| 10,305,985 B1 | 5/2019 | Ma | |
| 10,346,826 B2 * | 7/2019 | Boudville | H04L 9/3239 |
| 10,354,533 B2 * | 7/2019 | Cole | G06Q 20/14 |
| 10,402,721 B2 | 9/2019 | Corrado | |
| 10,410,142 B1 | 9/2019 | Hess | |
| 10,423,691 B1 * | 9/2019 | Patel | G06F 16/9566 |
| 10,438,008 B2 | 10/2019 | Antonopoulos | |
| 10,440,015 B1 | 10/2019 | Pham | |
| 10,467,615 B1 * | 11/2019 | Omojola | G06Q 20/02 |
| 10,482,532 B1 | 11/2019 | Kapczynski | |
| 10,489,789 B1 | 11/2019 | Gerling-Ospina | |
| 10,499,192 B2 | 12/2019 | Walter | |
| 10,505,825 B1 | 12/2019 | Bettaiah | |
| 10,529,018 B1 | 1/2020 | Liu | |
| 10,547,521 B1 | 1/2020 | Roy | |
| 10,552,819 B1 | 2/2020 | Gupta | |
| 10,560,309 B1 | 2/2020 | Chitalia | |
| 10,565,591 B2 * | 2/2020 | Lee | H04L 63/083 |
| 10,572,945 B1 | 2/2020 | McNair | |
| 10,585,720 B1 | 3/2020 | Kesler | |
| 10,628,435 B2 | 4/2020 | Saini | |
| 10,642,805 B1 | 5/2020 | Masse | |
| 10,643,154 B2 | 5/2020 | Litherland | |
| 10,698,916 B1 * | 6/2020 | Levy | G06T 1/60 |
| 10,726,002 B1 | 7/2020 | Srivastava | |
| 10,728,121 B1 | 7/2020 | Chitalia | |
| 10,740,353 B2 | 8/2020 | Horowitz | |
| 10,776,444 B1 * | 9/2020 | Bailey | H04L 67/00 |
| 10,783,576 B1 | 9/2020 | Van Os | |
| 10,810,463 B2 | 10/2020 | Min | |
| 10,839,431 B1 * | 11/2020 | Nath | G06Q 30/0277 |
| 10,853,791 B1 | 12/2020 | Ellis | |
| 10,868,742 B2 | 12/2020 | Chitalia | |
| 10,901,990 B1 | 1/2021 | Vogelsgesang | |
| 10,915,968 B1 | 2/2021 | Berger | |
| 10,922,372 B1 * | 2/2021 | Bailey | G06F 16/9577 |
| 10,949,178 B1 | 3/2021 | Russell | |
| 10,949,725 B1 * | 3/2021 | Alvarez-Cohen | G06F 9/547 |
| 10,949,918 B2 | 3/2021 | Fidanza | |
| 10,963,960 B1 | 3/2021 | Kushner | |
| 10,990,513 B2 | 4/2021 | Poppe | |
| 11,037,238 B1 | 6/2021 | Mishraky | |
| 11,037,239 B2 | 6/2021 | Studnitzer | |
| 11,042,930 B1 | 6/2021 | Mintz | |
| 11,048,794 B1 | 6/2021 | Bordow | |
| 11,055,284 B1 | 7/2021 | Vogelsgesang | |
| 11,055,692 B1 * | 7/2021 | Bodalia | G06Q 20/3276 |
| 11,068,314 B2 | 7/2021 | Roy | |
| 11,106,754 B1 * | 8/2021 | Bailey | G06F 21/6218 |
| 11,119,998 B1 | 9/2021 | Certain | |
| 11,120,800 B1 | 9/2021 | Cheng | |
| 11,132,373 B1 | 9/2021 | Timko | |
| 11,204,898 B1 | 12/2021 | Waas | |
| 11,210,687 B2 | 12/2021 | Kesiboyana | |
| 11,216,511 B1 | 1/2022 | Bigdelu | |
| 11,222,449 B2 | 1/2022 | Ram Mohan Maddala | |
| 11,232,489 B2 | 1/2022 | Coulter | |
| 11,249,821 B1 * | 2/2022 | Shah | G06F 9/541 |
| 11,256,619 B2 | 2/2022 | Syamala | |
| 11,263,268 B1 | 3/2022 | Bourbie | |
| 11,269,824 B1 | 3/2022 | Waas | |
| 11,269,871 B1 | 3/2022 | Bourbie | |
| 11,270,375 B1 | 3/2022 | Jennings | |
| 11,277,315 B1 | 3/2022 | Patel | |
| 11,281,668 B1 | 3/2022 | Borden | |
| 11,294,870 B1 | 4/2022 | Waas | |
| 11,323,327 B1 | 5/2022 | Chitalia | |
| 11,363,106 B2 | 6/2022 | Nelluri | |
| 2002/0103824 A1 | 8/2002 | Koppolu et al. | |
| 2004/0064758 A1 | 4/2004 | Novik | |
| 2004/0111410 A1 | 6/2004 | Burgoon | |
| 2005/0166148 A1 | 7/2005 | Garding | |
| 2005/0234878 A1 | 10/2005 | Dettinger | |
| 2005/0246326 A1 | 11/2005 | McKeon | |
| 2006/0031818 A1 | 2/2006 | Poff | |
| 2006/0294058 A1 | 12/2006 | Zabback | |
| 2007/0016587 A1 | 1/2007 | Ranger | |
| 2007/0136673 A1 | 6/2007 | Minamida | |
| 2007/0143416 A1 | 6/2007 | Daigle | |
| 2007/0143435 A1 | 6/2007 | Daigle | |
| 2007/0165623 A1 | 7/2007 | Clark | |

(56) References Cited

U.S. PATENT DOCUMENTS

| | | | |
|---|---|---|---|
| 2007/0179936 A1 | 8/2007 | Rajakumar | |
| 2008/0098173 A1 | 4/2008 | Chidambaran | |
| 2008/0172356 A1 | 7/2008 | Bruno | |
| 2008/0294689 A1 | 11/2008 | Metzger | |
| 2008/0319957 A1 | 12/2008 | Muralidhar | |
| 2008/0319968 A1 | 12/2008 | Dettinger | |
| 2009/0070300 A1 | 3/2009 | Bartels | |
| 2009/0106214 A1 | 4/2009 | Jain | |
| 2009/0126013 A1 | 5/2009 | Atwood | |
| 2009/0265352 A1 | 10/2009 | Holenstein | |
| 2009/0318118 A1 | 12/2009 | Chang | |
| 2009/0319496 A1 | 12/2009 | Waren | |
| 2009/0319498 A1 | 12/2009 | Zabokritski | |
| 2009/0319499 A1 | 12/2009 | Meijer | |
| 2009/0319501 A1 | 12/2009 | Goldstein | |
| 2010/0029250 A1 | 2/2010 | Gupta | |
| 2010/0145946 A1 | 6/2010 | Conrad | |
| 2010/0306249 A1 | 12/2010 | Hill | |
| 2011/0035398 A1 | 2/2011 | Lee | |
| 2011/0055231 A1 | 3/2011 | Huck | |
| 2011/0088043 A1 | 4/2011 | Lind | |
| 2011/0131229 A1 | 6/2011 | Kubota et al. | |
| 2011/0219357 A1* | 9/2011 | Livshits | H03M 7/30 717/115 |
| 2011/0296351 A1 | 12/2011 | Ewing, Jr. et al. | |
| 2011/0313922 A1 | 12/2011 | Ben Ayed | |
| 2011/0320432 A1 | 12/2011 | Dewar | |
| 2012/0095911 A1 | 4/2012 | Ibasco | |
| 2012/0124043 A1 | 5/2012 | Handy et al. | |
| 2012/0293558 A1 | 11/2012 | Dilts | |
| 2012/0330837 A1 | 12/2012 | Persaud | |
| 2013/0018918 A1 | 1/2013 | Peek | |
| 2013/0082819 A1 | 4/2013 | Cotterill | |
| 2013/0117288 A1 | 5/2013 | De Smet | |
| 2013/0173449 A1 | 7/2013 | Ng | |
| 2013/0332910 A1 | 12/2013 | Ganai | |
| 2014/0127994 A1* | 5/2014 | Nightingale | H04W 12/082 455/41.1 |
| 2014/0138435 A1* | 5/2014 | Khalid | G06Q 20/227 235/380 |
| 2014/0149400 A1 | 5/2014 | Fu | |
| 2014/0180923 A1 | 6/2014 | Choi | |
| 2014/0280030 A1 | 9/2014 | Freedman | |
| 2014/0280541 A1 | 9/2014 | Walter | |
| 2014/0304246 A1 | 10/2014 | Helmich | |
| 2014/0317615 A1 | 10/2014 | Ma | |
| 2015/0088760 A1 | 3/2015 | Meurs | |
| 2015/0154644 A1* | 6/2015 | Saxena | G06Q 30/0269 705/14.66 |
| 2015/0186892 A1 | 7/2015 | Zhang | |
| 2015/0293945 A1 | 10/2015 | Amrhein | |
| 2015/0334108 A1* | 11/2015 | Khalil | H04L 63/102 726/8 |
| 2015/0339570 A1 | 11/2015 | Scheffler | |
| 2015/0379082 A1 | 12/2015 | Hu | |
| 2016/0014600 A1 | 1/2016 | Hanson | |
| 2016/0070446 A1* | 3/2016 | Clark | G06F 16/40 715/804 |
| 2016/0085738 A1 | 3/2016 | Briggs | |
| 2016/0125412 A1 | 5/2016 | Cannon | |
| 2016/0142394 A1* | 5/2016 | Ullrich | G16H 10/60 726/7 |
| 2016/0150406 A1 | 5/2016 | Vincent | |
| 2016/0164866 A1 | 6/2016 | Oberheide | |
| 2016/0234330 A1* | 8/2016 | Popowitz | H04L 67/2823 |
| 2016/0239284 A1* | 8/2016 | Boudville | H04L 67/34 |
| 2016/0239529 A1 | 8/2016 | Bulkowski | |
| 2016/0239929 A1 | 8/2016 | Hudson | |
| 2016/0267387 A1 | 9/2016 | Prabha | |
| 2016/0286396 A1 | 9/2016 | Tuukkanen | |
| 2016/0306800 A1* | 10/2016 | Son | G06F 16/86 |
| 2016/0328442 A1 | 11/2016 | Waas | |
| 2016/0371346 A1 | 12/2016 | White | |
| 2017/0010869 A1 | 1/2017 | Heiney | |
| 2017/0032024 A1 | 2/2017 | Ye | |
| 2017/0046235 A1 | 2/2017 | Straub | |
| 2017/0046784 A1 | 2/2017 | Kiluk | |
| 2017/0091470 A1 | 3/2017 | Infante-Lopez | |
| 2017/0103103 A1 | 4/2017 | Nixon | |
| 2017/0132024 A1* | 5/2017 | Desineni | G06F 9/44521 |
| 2017/0163647 A1 | 6/2017 | Cernoch | |
| 2017/0168802 A1 | 6/2017 | Quinlan | |
| 2017/0188073 A1 | 6/2017 | Cao | |
| 2017/0192766 A1* | 7/2017 | Sogani | G06F 8/61 |
| 2017/0195339 A1 | 7/2017 | Brown | |
| 2017/0195397 A1* | 7/2017 | Boudville | G06F 9/45558 |
| 2017/0214705 A1 | 7/2017 | Gupta | |
| 2017/0230357 A1 | 8/2017 | Canfield | |
| 2017/0262551 A1 | 9/2017 | Cho | |
| 2017/0286958 A1 | 10/2017 | Herman | |
| 2017/0308565 A1 | 10/2017 | Broll | |
| 2017/0309046 A1 | 10/2017 | Demiralp | |
| 2017/0337210 A1 | 11/2017 | Boehme | |
| 2017/0339250 A1 | 11/2017 | Momchilov et al. | |
| 2017/0346851 A1 | 11/2017 | Drake | |
| 2017/0346875 A1 | 11/2017 | Wells | |
| 2018/0006871 A1 | 1/2018 | Yang | |
| 2018/0034859 A1 | 2/2018 | Aronowitz | |
| 2018/0048630 A1 | 2/2018 | Griffin | |
| 2018/0054412 A1 | 2/2018 | Cunico | |
| 2018/0165604 A1 | 6/2018 | Minkin | |
| 2018/0198614 A1 | 7/2018 | Neumann | |
| 2018/0211312 A1 | 7/2018 | Smith | |
| 2018/0218030 A1 | 8/2018 | Wong | |
| 2018/0218031 A1 | 8/2018 | Wong | |
| 2018/0218032 A1 | 8/2018 | Wong | |
| 2018/0218044 A1 | 8/2018 | Wong | |
| 2018/0234496 A1* | 8/2018 | Ratias | H04L 9/3239 |
| 2018/0285780 A1 | 10/2018 | Ouyang | |
| 2018/0288574 A1 | 10/2018 | DeLuca | |
| 2018/0293577 A1* | 10/2018 | Kim | H04L 67/00 |
| 2018/0349363 A1 | 12/2018 | Jujjuri | |
| 2018/0349991 A1 | 12/2018 | Fidanza | |
| 2019/0007398 A1 | 1/2019 | Jaladi | |
| 2019/0012256 A1 | 1/2019 | Poppe | |
| 2019/0019184 A1 | 1/2019 | Lacey | |
| 2019/0020554 A1 | 1/2019 | Lilienthai | |
| 2019/0034482 A1 | 1/2019 | Werner | |
| 2019/0043231 A1 | 2/2019 | Uzgin | |
| 2019/0057161 A1 | 2/2019 | Ackerman | |
| 2019/0065553 A1 | 2/2019 | Young | |
| 2019/0073676 A1 | 3/2019 | Wang | |
| 2019/0121350 A1 | 4/2019 | Celia | |
| 2019/0130750 A1 | 5/2019 | Cole | |
| 2019/0141039 A1* | 5/2019 | Stoops | H04L 51/00 |
| 2019/0180311 A1* | 6/2019 | Chan | G06Q 30/0236 |
| 2019/0188368 A1 | 6/2019 | Hastings | |
| 2019/0188788 A1 | 6/2019 | Baker, IV | |
| 2019/0236202 A1 | 8/2019 | Guney | |
| 2019/0265941 A1 | 8/2019 | Baba | |
| 2019/0266374 A1* | 8/2019 | Lee | G06F 3/038 |
| 2019/0272178 A1* | 9/2019 | Hu | G06F 9/445 |
| 2019/0278749 A1 | 9/2019 | Yoakley | |
| 2019/0288850 A1 | 9/2019 | Beecham | |
| 2019/0303360 A1 | 10/2019 | Lee | |
| 2019/0318074 A1 | 10/2019 | Ledwith | |
| 2019/0340291 A1 | 11/2019 | Raman | |
| 2019/0342329 A1 | 11/2019 | Turgeman | |
| 2019/0362086 A1 | 11/2019 | VanLoo | |
| 2019/0386984 A1 | 12/2019 | Thakkar | |
| 2020/0005292 A1 | 1/2020 | Mao | |
| 2020/0034365 A1 | 1/2020 | Martin | |
| 2020/0034375 A1 | 1/2020 | Tung | |
| 2020/0074546 A1 | 3/2020 | Coulter | |
| 2020/0092106 A1 | 3/2020 | Leong | |
| 2020/0104095 A1 | 4/2020 | Sarir | |
| 2020/0105254 A1 | 4/2020 | Sarir | |
| 2020/0139840 A1* | 5/2020 | Roeder | H04W 4/80 |
| 2020/0153859 A1 | 5/2020 | Hsiung | |
| 2020/0155015 A1 | 5/2020 | Ashrafi | |
| 2020/0183496 A1 | 6/2020 | Sugihara | |
| 2020/0192897 A1 | 6/2020 | Halstead | |
| 2020/0201860 A1 | 6/2020 | Vogelsgesang | |

(56) References Cited

U.S. PATENT DOCUMENTS

| | | |
|---|---|---|
| 2020/0218510 A1 | 7/2020 | Clower |
| 2020/0242303 A1* | 7/2020 | Hwang ................. G06F 40/134 |
| 2020/0265457 A1* | 8/2020 | Miller ................. G06Q 30/0215 |
| 2020/0274923 A1 | 8/2020 | Jujjuri |
| 2020/0279255 A1 | 9/2020 | Douglas |
| 2020/0286164 A1 | 9/2020 | Kade |
| 2020/0287892 A1 | 9/2020 | Ganesan |
| 2020/0311080 A1 | 10/2020 | Willems |
| 2020/0311819 A1* | 10/2020 | Blank ................. G06Q 40/06 |
| 2020/0349194 A1 | 11/2020 | Kundu |
| 2020/0401463 A1 | 12/2020 | Weishaupt |
| 2020/0410820 A1 | 12/2020 | Ellis |
| 2021/0004332 A1 | 1/2021 | Geri |
| 2021/0042442 A1 | 2/2021 | Al-Kabra |
| 2021/0042789 A1 | 2/2021 | Coyle |
| 2021/0073285 A1 | 3/2021 | Hunter |
| 2021/0081157 A1 | 3/2021 | Lam |
| 2021/0089537 A1 | 3/2021 | Hanson |
| 2021/0090578 A1 | 3/2021 | Trapp |
| 2021/0109917 A1 | 4/2021 | Xiao |
| 2021/0117553 A1 | 4/2021 | Shpurov |
| 2021/0119794 A1 | 4/2021 | Shpurov |
| 2021/0124684 A1 | 4/2021 | Russell |
| 2021/0141836 A1 | 5/2021 | Byrne |
| 2021/0157812 A1 | 5/2021 | Rumiantsau |
| 2021/0166234 A1 | 6/2021 | Anderson |
| 2021/0168049 A1 | 6/2021 | Lin |
| 2021/0182808 A1 | 6/2021 | Bhasin |
| 2021/0200899 A1 | 7/2021 | Brannon |
| 2021/0201278 A1* | 7/2021 | Annamalai ......... H04W 12/068 |
| 2021/0203661 A1 | 7/2021 | Sankey |
| 2021/0218773 A1 | 7/2021 | Prakash |
| 2021/0234869 A1 | 7/2021 | Bondugula |
| 2021/0241286 A1 | 8/2021 | Parker |
| 2021/0248143 A1 | 8/2021 | Khillar |
| 2021/0256536 A1 | 8/2021 | Abdelsamie |
| 2021/0258308 A1 | 8/2021 | Avetisov |
| 2021/0279045 A1 | 9/2021 | Ko |
| 2021/0281403 A1* | 9/2021 | Wisgo ................. H04L 9/0872 |
| 2021/0312556 A1 | 10/2021 | Natali, Jr. |
| 2021/0318888 A1* | 10/2021 | Abbasian ................. G06F 21/30 |
| 2021/0342480 A1 | 11/2021 | Kogan |
| 2021/0357542 A1* | 11/2021 | Bowen ................. G06T 11/60 |
| 2021/0365456 A1 | 11/2021 | Kondiles |
| 2021/0390141 A1 | 12/2021 | Weishaupt |
| 2021/0409405 A1 | 12/2021 | Salajegheh |
| 2022/0004542 A1 | 1/2022 | Han |
| 2022/0067105 A1 | 3/2022 | Vodovotz |
| 2022/0076234 A1* | 3/2022 | Bodalia ............. G06Q 30/0633 |
| 2022/0076235 A1* | 3/2022 | Doyle ................. G06Q 20/085 |
| 2022/0076236 A1* | 3/2022 | Bodalia ............. G06Q 20/085 |

OTHER PUBLICATIONS

Written Opinion in related International Application PCT/US2021/049709 dated Dec. 24, 2021.
International Search Report in related International Application PCT/US2021/049709 dated Dec. 24, 2021.
International Search Report in related International Application PCT/US2021/049716 dated Dec. 24, 2021.
Non-Final Office Action in related U.S. Appl. No. 17/471,019 dated Apr. 25, 2022, pp. 1-52.
Non-Final Office Action in related U.S. Appl. No. 17/471,029 dated May 25, 2022, pp. 1-41.
Nair, V., Bartunov, S., Gimeno, F., von Glehn, I., Lichocki, P., Lobov, I., O'Donoghue, B., Sonnerat, N., Tjandraatmadja, C., Wang, P. and Addanki, R., 2020. Solving mixed integer programs using neural networks. Arxiv.org. Retrieved from the Internet: https:// arxiv.org/ (Year: 2020), pp. 1-57.
Non-Final Office Action in related U.S. Appl. No. 17/471,039 dated Jun. 24, 2022, pp. 1-49.

* cited by examiner

NAVIGATION PATHWAY GENERATION

CROSS-REFERENCE TO RELATED APPLICATIONS

This patent is a continuation-in-part of U.S. patent application Ser. No. 17/015,761, titled, "INTERFACE AND SYSTEM FOR UPDATING ISOLATED REPOSITORIES," filed 9 Sep. 2020, and this patent claims the benefit of U.S. Provisional Patent Application 63/086,475, titled MODEL FOR UTILIZATION RETRIEVAL AND PREDICTION, filed 1 Oct. 2020. The entire content of the aforementioned earlier-filed patent-filing is hereby incorporated by reference for all purposes.

BACKGROUND

Often, one electronic document will link to another, for example, with a uniform resource locator (URL). Selecting such a link often will cause a user's computing device to send a request for the corresponding document over a network, in some cases, after using a domain name system to resolve a domain name in the URL to an Internet Protocol address of a server where the document is hosted. Similar techniques are used in representational state transfer (REST) application program interface calls, to invoke functionality of a remotely executing service.

Deep linking applies a similar paradigm to context switches between applications on a client computing device. A "deep link," upon selection, may cause the user's computing device to launch, for instance, a native application in a non-default state specified by the deep link, allowing developers to provide links to such applications in various states specified by the links.

SUMMARY

The following is a non-exhaustive listing of some aspects of the present techniques. These and other aspects are described in the following disclosure.

Some aspects include a process that includes obtaining a first message from a client computing device and determining a set of values based on the first message, wherein a first subset of values of the set of values is associated with a first navigation screen, and wherein a second subset of values of the set of values is associated with a second navigation screen. The process may also include generating a second message comprising the set of values, sending the second message to the client computing device, and updating a navigation stack stored on the client computing device based on the set of values by inserting a value of the first subset of values before a value of the second subset of values in a sequence of the navigation stack. The process may also include displaying the second navigation screen based on the second subset of values, wherein an interaction with a user interface element of the client computing device causes the client computing device to display the first navigation screen.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
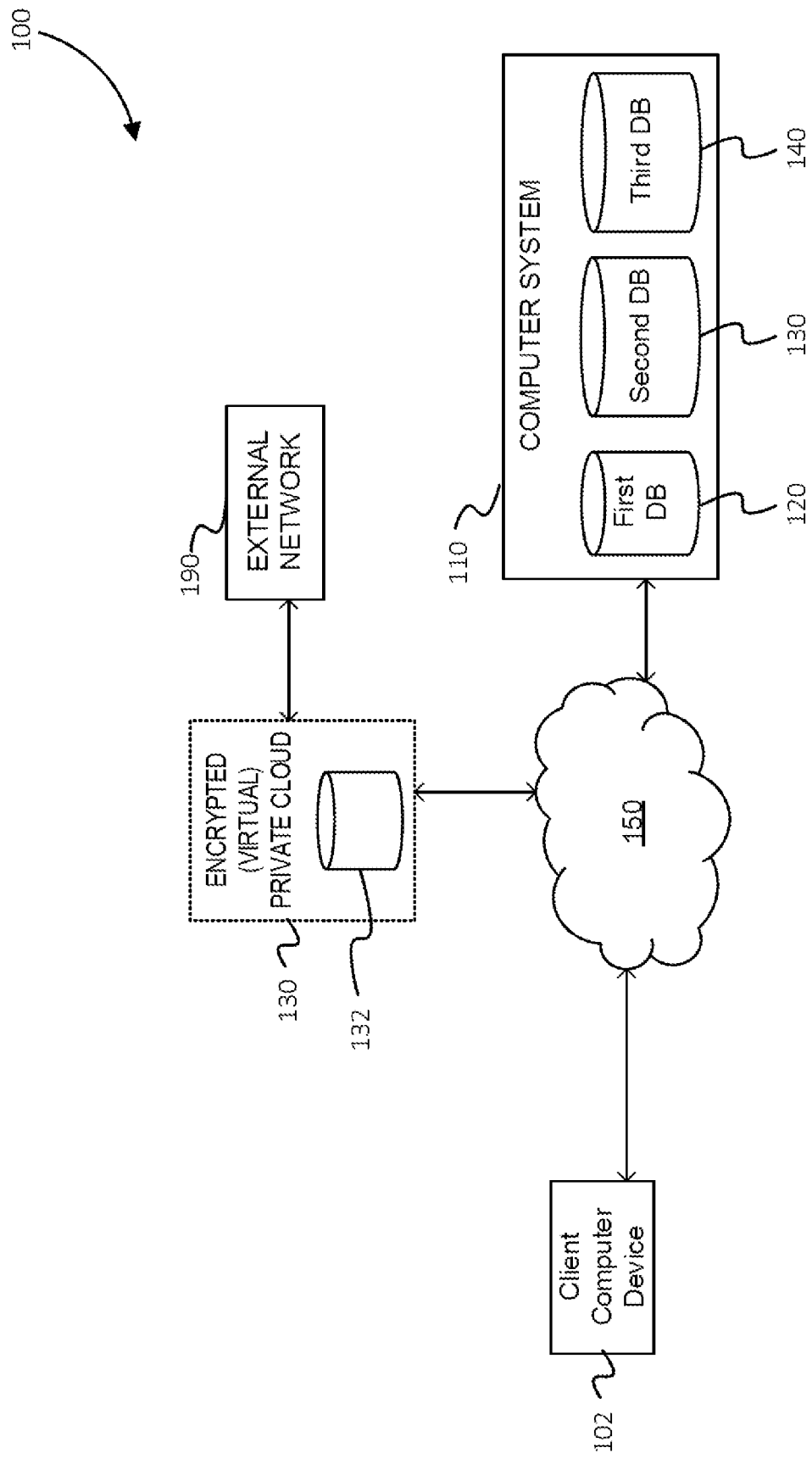
FIG. 1 is a schematic diagram of a first computing environment in which a score stored in an account may be updated, in accordance with some embodiments of the present technique.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of data systems. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

In a variety of scenarios, it may be useful for a user to adjust scores of different accounts subject to constraints on the adjustment and linkable therebetween. Examples include adjusting a credit limit in one account and an accumulated credit stored in another, wherein the linkage is linear (e.g., one-to-one, or according to some other coefficient). Other examples include various forms of industrial process controls, where metrics reported by sensors at one stage of the process affect performance of downstream processes and appropriate target setpoints for those process steps, such as a thermal budget for processing an annealed metal workpiece or semiconductor device in which thermal budget consumed by upstream processes limits thermal budget consumable by downstream processes. In another example, manufacturing lines are often tuned with target inventory levels at each step, and deviations from that target at one step may affect the desired target levels at another.

In some embodiments, computer systems may determine quantitative or categorical values for storage in a first data structure using information stored in another data structure isolated from the first data structure. In many such cases, the mechanisms used to isolate or otherwise silo information stored in different data structures can increase the difficulty of determining of these values or updating a data structure based on these values. Additionally, some cases may require a user to manually edit or confirm changes to the values using interfaces compatible with various platforms. In some cases, performance limitations or user comfort may challenge the performance of such interfaces or increase user frustration when using the interfaces.

Some embodiments may include operations to adjust a value of a first account based on the value of a second account, where each account may be of different account types and may be associated with a different data structure, a different set of categories or a different set of encryption systems. Some embodiments may obtain the web message from a client computing device and, in response, provide a user interface (UI) to the computing device via a set of program instructions or other data used to generate an instance of the UI on the client computing device. The UI may include UI elements, such as sliders, radio buttons, rotating objects, text entry boxes, or the like. Some embodiments may determine a boundary usable for defining the limits to the possible configurations of the UI element. Some embodiments may generate multiple intermediate values causing a UI element to be configurable to a corresponding number of possible intermediate configurations. The UI may include program code to then reconfigure the UI element to a smaller number of allowed configurations, where each of the smaller number of allowed configurations may be equal to a boundary value or a value between the boundary values. Alternatively, the first account and the second account may share an account type, and may share a data structure or a number and type of fields being stored.

Some embodiments may determine that a set of update requests to an account value are within a determined time interval and, in response, combine values stored in the set of update requests before updating the account. Some embodiments may determine that the update requests are within the time interval based on timestamps associated with each request based on a directed comparison of each timestamp, a binning operation to assign requests to different times, or the like. Some embodiments may store a record of the combined value in an account without storing a record of the two individual values in the same account. Some embodiments may store data associated with an account in an encrypted data structure, such as an encrypted database, using a symmetric, block cipher encryption and decryption algorithm, where the use of a symmetric block cipher algorithm may increase security and inhibit unauthorized decryption of sensitive data.

By providing one or more of the features described in this disclosure, some embodiments may increase the front-facing performance of interfaces being used at a client computing device. Additionally, some embodiments may more efficiently store transaction data or other data associated with a user account by reducing data storage consumption. Additionally, some embodiments may more efficiently encrypt data in an efficient manner that accommodates digit limitations of external application protocol interfaces (APIs) or reduces processing of encrypted data. That said, none of the preceding (or following) should be read as a disclaimer of any subject matter, as a variety of independently useful techniques are described, and some of those techniques may be deployed to address some issues without addressing other described problems with earlier approaches. Furthermore, while some embodiments may be described as having a feature, this is not to suggest that all embodiments have this feature or that any other described feature is not also amenable to variation. For example, while some embodiments may use a first account having a first type and a second account having a different account type, some embodiments may perform operations described in this disclosure for accounts of a same account type.

FIG. 1 is a schematic diagram of a first computing environment in which a score stored in an account may be updated, in accordance with some embodiments of the present technique. In some embodiments, the computing environment 100 may be configured to mitigate some of the above-described problems, such as challenges associated with securely updating cross-account information. The computing environment 100 may include a network 150 in communication with a computer system 110 that receive messages such as web requests or responses from a client computing device 102. As further discussed below, the client computing device 102 may include mobile computing devices, laptops, virtual reality headsets, desktop computers, kiosk terminals, or the like. A user of the client computing device 102 may access data associated with a profile of the user, where the profile may be stored in a first database 112. As used in this disclosure, a database may refer to various types of data structures, such as a relational database or a non-relational database. The computer system 110 may include servers stored in a centralized location, a cloud server system, a distributed computing platform using different components or services, or the like. Records from each of the first database 112, second database 113, or third database 114 may include links to associated records with respect to each other. In some embodiments, each of the databases may include values obtained from messages provided by external computer systems, such data indicating a borrowed loan amount of a bank.

Some embodiments may store data in a set of relational databases such as PostgreSQL™, Oracle mySQL™, or the like. For example, some embodiments may store a set of profile data in a SQL table, where each record of the SQL table may represent a user profile and include, as table fields, a user's name, a user identifier, a set of associated account identifiers, a password hash, or the like. Alternatively, or in addition, some embodiments may store data in a non-relational or distributed database such as Apache Cassandra™, MongoDB™, or the like. For example, some embodiments may store a set of loan account information in a first MongoDB database and a set of credit account information a second MongoDB database. In some embodiments, the data of each database may be encrypted at rest or in transit, where records of a database may be linked another associated record in a different database (e.g., a record stored in a SQL table). Some embodiments may use a relational or non-relational database to store a pointer, map, or other value usable for indicating relationships between a profile, associated accounts, associated account value, or associated data stored in external systems. As further discussed in this disclosure, some embodiments may perform operations to reduce data consumption of data stored in the computer system 110. Databases need not be persistent and can include in-memory databases, which can include non-persistent program state. Or in some cases, databases may persist program state to a media that can retain information even in the event that power is lost.

Accounts store and associate various types of scores with entities, and entities may be associated with profiles. In some cases, entities are associated with profiles in a one-to-one mapping, and multiple accounts may be associated with a single entity and corresponding profile. Examples of scores include in-game scores of video games, monetary amounts credited to or owed by an entity, accumulated or lost amounts of feedstock at various stages of industrial processes, and inventor amounts at various stages of a manufacturing process. In some cases, the scores denote rivalrous quantities, like money or inventory, or in some cases, scores denote non-rivalrous quantities, like character strengths in various dimensions in a video game. Reference to "an account" followed by reference to "the account" is consistent with scenarios where the account has changed in some regard between when the item is referenced, i.e., use of the indefinite article followed by the definite article should not be read to suggest that the thing referenced is immutable. Similar principles of construction should be applied to other mutable entities.

The computer system 110 may include or communicate with an encrypted virtual private cloud (VPC) 130 via the network 150, which may include a database of encrypted values 132. The data stored in the encrypted VPC 130 may be isolated from other components of the computer system 110. Some embodiments may enforce the encryption of any data being transferred into the VPC 130 or enforce a requirement that data encrypted in the encrypted VPC 130 remain encrypted while at rest or while being edited. Data from the encrypted VPC 130 may be stored in other components of the computer system 110 or may be communicated to an external network 190. As discussed further below, the external network 190 may include application program interfaces to securely receive data from the encrypted VPC 130, which may cause the external network 190 to perform actions such as determining a card identifier or causing a manufacturing device to generate a physical card based on the card identifier.

Figure 2:
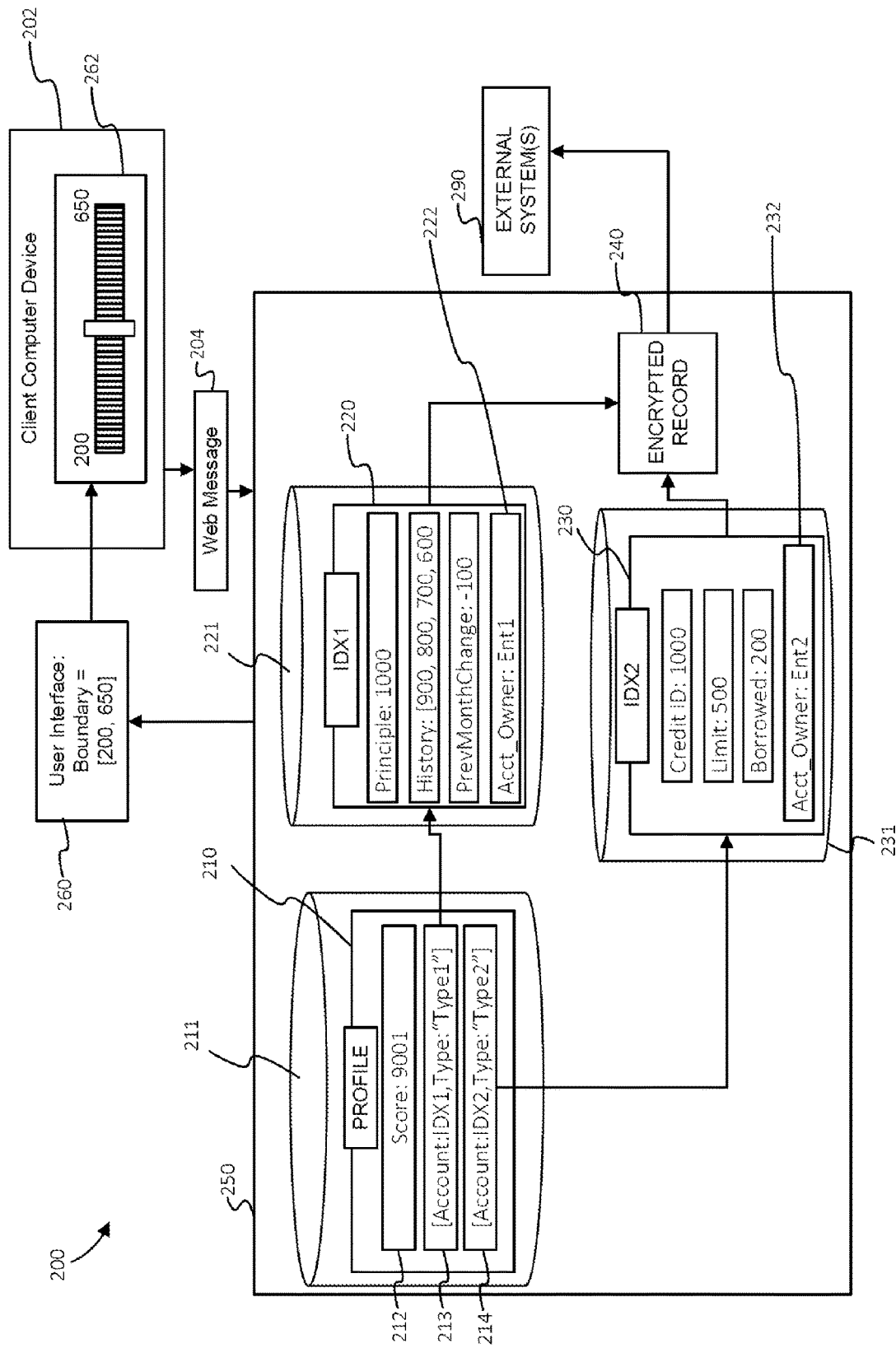
FIG. 2 is a logical and physical architecture block diagram illustrating a computing environment in which various learning infrastructure may be implemented with the present techniques in accordance with some embodiments.

FIG. 2 is a logical and physical architecture block diagram illustrating a computing environment in which various learning infrastructure may be implemented with the present techniques in accordance with some embodiments. In some cases, some or all of the techniques described in this disclosure may be implemented in the computing environment 200. The computing device 202 may send data via a web message 204 to a computer system 250. Data sent in the web message 204 from the computing device 202 may include account identifiers (e.g., a username, in account number), passwords, values for account parameters (e.g., an amount to deposit), parameters indicating the creation, modification, or deletion of an account, or the like.

Some embodiments may be written in or provide program code written in a computer language that is supported by a web browsing application via a set of libraries or engines. For example, an application described in this disclosure may be written in JavaScript, where the application may call one or more APIs of an application such as Google Chrome™, Microsoft Edge™, or Apple Safari™. Alternatively, or in addition, some embodiments may be written in other computer languages such as C#, C++, Python, Ruby, and the like. Additionally, some embodiments may use a web application development framework to provide application functionality or to provide UI features. These development frameworks may include Vue, React.js, Angular, Flutter, or the like. For example, some embodiments may use one or more functions of React.js in a source code to compile when determining a UI.

A "web message" is an application-layer communication over a network to or from a web browser (which may include a webview object in a native application, a headless browser, or a browser extension). Web messages are not limited to rendered content or user inputs, and web messages may be encoded in hypertext transport language protocol (HTTP, like HTTP 2) or according to other application-layer protocols. A "web message" (expressed as singular) can include one or more transmissions, in some cases with intervening responsive messages, like acknowledgements or API responses.

In some embodiments, the present techniques may be implemented as JavaScript code (or other ECMAScript compliant language). In some embodiments, code implementing the present techniques may be executed by a JavaScript engine (e.g., the Chakra, SpiderMonkey, JavascriptCore, Carakan, or V8 JavaScript engine) running in a web browser. In some embodiments, the code may be parsed to an abstract syntax tree. This abstract syntax tree may be transformed into a bytecode representation. The bytecode representation may then be compiled into machine code, such as the native machine code of the computer executing the web browser or a machine code of a virtual machine. In some cases, a UI or UI-associated function may be provided or implemented with WebAssembly code.

Some embodiments may use the data provided by the computing device 202 to access a first account 210 stored in the profile database 211, which is part of the computer system 250. The first account 210 may represent a profile and may be populated with data field values for fields such as a score field 212, a second account identifier field 213, and a third account identifier field 214. The value for the second account identifier field 213 may include an identifier usable to identify or access a second account 220. The second account 220 may be of a first account type and may be stored as a record in a second account database 221. The value for the third account identifier field 214 may include an identifier usable to identify or access a third account 230 of a third database 231. The third account 230 may be of a second account type, where the second account type is different from the first account type with respect to the fields of the account types, number of fields of the account types, links to other databases, or the like.

As discussed further below, accounts of different types may be structured as different data structures, include different data structures, store different fields (e.g., different data types, different types of tuples, etc.), be secured with different encryption methods, or the like. For example, the second account 220 may be of the first account type and may be associated with loans. The second account 220 and may include fields that indicates a loan borrower, a loan principle amount, a loan interest, a loan repayment amount, or the like. The third account 230 may be of a second account type and may be associated with credit values. The third account 230 and may include fields that indicates a credit identifier, a card identifier, a credit limit, an amount borrowed, a maximum credit, or the like. Other account types may apply to other non-monetary use cases, like inventory back-log relative to a target, inventory surplus relative to a target in a manufacturing process, or process metric surplus relative to a target and process metric deficit relative to a target in industrial process controls.

Some embodiments may include methods of providing UI program instructions 260 to the computing device 202 based on a respective profile and set of accounts associated with the respective profile. For example, after receiving the web message 204 from the computing device 202, some embodiments may determine a boundary having a permitted lower bound of 200 and a permitted upper bound of 650 based on the data stored in the second account 220 and the third account 230. As further discussed below, the UI program instructions 260 may cause a computing device 202 to display a UI element 262 that ranges between a first value written as "200" on the UI element 262 and a second value written as "650."

The term "user interface" or "UI" can reference both a static interface for a user and one that evolves over time. For example, a single UI can transition from one state to the next as part of an animated transition or responsive to user input. Reference to things displayed or otherwise done by a UI do not require that those things be displayed or done concurrently, as a UI can display or do one thing and then later display or do another, while still being the same UI as that term is used herein. The term "UI" is used broadly to refer to something presented to a user, like by a client computing device, and instructions or data by which that presentation is composed at a remote device, like a server. For instance, a server can generate a UI by generating the HTML or JSON by which the client device renders a webpage, without displaying that webpage itself at the server. In some cases, both a client device and server system may cooperate as part of the same computer system to determine a UI.

Some embodiments may provide ownership of an account to third-party entities, such as a commercial organization, financial institute, government organization, or the like, and indicate ownership of an account using a field of the account. For example, as indicated by the account owner field 222, the second account 220 may be registered to a user listed by the first account 210 and be owned by the entity "Ent1." Some embodiments may separate control of an account from ownership of an account, where a first entity may be able to control or update an account owned by a second entity. For example, some embodiments may allow a company to provide the UI program instructions 260 to the computing device 202. A UI instantiated by the computing device 202 based on the UI program instructions 260 may enable a computing device user to update a credit payment. The credit payment may be associated with the third account 230 of the computing device user, where the credit payment account may be owned by a second entity set in the account owner field 232 as "Ent2," and where the credit payment may decrease the amount in the borrowed amount field 233.

Some embodiments may update the encrypted record 240, which may be stored in the fourth database 241. For example, changes in the borrowed amount field 233 may be used to update the encrypted record 240. In some embodiments, one or more values of the fourth database 241 may be encrypted, and may be a part of a VPC, such as the VPC 130. It should be mentioned that, while the encrypted record 240 is described as encrypted, other values of other databases may also be encrypted. For example, the value for the borrowed amount field 233 of the third database 231 may be encrypted using one or more encryption methods described in this disclosure. Alternatively, some or all of the databases described in this disclosure, such as the databases 211, 221, 231, or 241, may be encrypted or include encrypted values, where some or all of the databases described in this disclosure may be part of one or more VPCs.

The processes represented by the flowcharts presented below are intended to be illustrative and non-limiting. In some embodiments, for example, the methods may be accomplished with one or more additional operations not described, and/or without one or more of the operations discussed. For example, some embodiments may perform the process 300 by performing operations described for blocks 304, 308, 312, 316, 320, and 340 without performing operations described for blocks 328, 332, or 336. Additionally, the order in which the processing operations of the methods are illustrated (and described below) is not intended to be limiting. For example, some embodiments may perform the process 300 by performing operations described for blocks 304, 308, 312, 316, 320, and 340 after performing operations described for blocks 328, 332, or 336. In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

Figure 3:
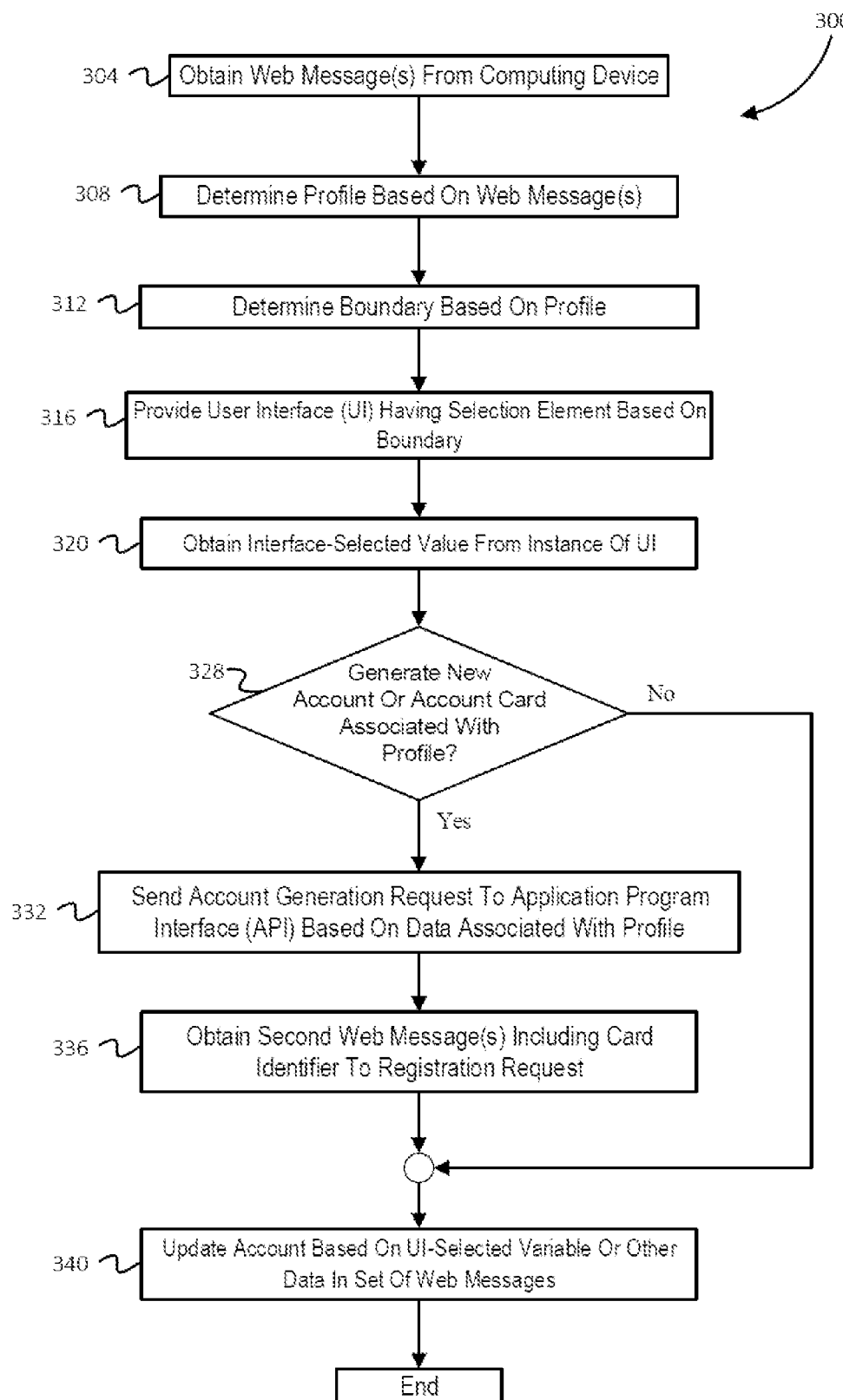
FIG. 3 is a flowchart illustrating a process to provide and obtain data via a UI, in accordance with some embodiments of the present techniques.

FIG. 3 is a flowchart illustrating a process to provide and obtain data via a UI, in accordance with some embodiments of the present techniques. In some embodiments, the process 300 may include obtaining a set of web messages from a computing device, as indicated by block 304. As described in this disclosure, a message may include a set of sub-messages sent in the form of one or more data packets sent according to an internet protocol. The message may be provided in the form of a web request or a response to the web request ("web response") sent over the Internet. For example, the message may include a web request including textual information encoded in the ASCII format divided into frames and including hashed account identifiers or passwords. In some embodiments, the message may include account access such as a username, password, verification identifier, or the like. For example, the message may include a username and password usable to access a profile.

Some embodiments may receive a web request to update an account, where updating an account may include generating an account, populating an empty field with a value, modifying a field value of an account, or deleting an account. For example, some embodiments may receive a request to generate a new account representing a credit account, where the credit account will be associated with an existing account representing a loan account. Some embodiments may receive a request that causes a server to provide a response that includes program instructions. In some embodiments, the web response program instructions may cause a client computing device to display a UI usable to obtain data required to update an account.

The process 300 may include determining a profile based on the set of web messages, as indicated by block 308. The profile may be a type of account stored as record in a database of profiles. As discussed elsewhere in this disclosure, the database of profiles may include a relational database such as a SQL database, a non-relational database, or other data structure. The profile may include one or more fields identifying an individual user, an organization, or other entity. For example, a profile may include a user name, an organization that the user represents, a set of permissions indicating what accounts the user has access to, a set of account identifiers corresponding to the other accounts the user has access to, a set of account owners representing one or more entities that own the user's account(s), or the like.

Some embodiments may include a profile having associations to another account associated with the profile, where the other account may be stored in a database different from the database used to store the profile. Records of different databases may store different types of values, may be updated in different ways, or the like. For example, a first reference in the profile may be linked to a first account of a first type, such as a loan account type, and a second reference in the profile may be linked to a second account of a second type, such as a credit account type. The first account may include a score assigned to a user associated with the profile, where changes to the score may be tracked. The second account may include a second score assigned to the user, where, as further described below, increases or possible increases to the second score may be calculated based on updates to the first score or another field of the first account. As used in this disclosure, a score may indicate one or more types of a quantitative value, such as a quantified computing resource amount, a monetary amount, a credit score or estimate of a credit score provided by a credit rating agency, a digital asset amount, an amount to be repaid, an amount that is owed, or the like.

In some embodiments, the profile may include a set of scores obtained from an API that receives communication from external entities. For example, a profile may include scores associated with a user identified by the profile, where the scores may be updated by messages received by API and sent from a server controlled by a financial institute, ratings agency, government organization, or the like. Some embodiments may include a heartbeat routine to regularly request data from one or more external entities associated with a profile. For example, some embodiments may execute a routine that sends a request for a credit score, where a response to the request may be received at an API of a third-party verification entity, such as an API of a credit rating agency server.

In some embodiments, the process 300 may include determining a boundary based on the values stored in the profile or otherwise associated with the profile, as indicated by block 312. A may be a numeric boundary or set of confirmable values of the numeric boundary, where the numeric boundary may be used when displaying a UI that is provided to a client computing device. In some embodiments, the set of confirmable values may include the values of the boundary itself, and, as further described below, may correspond with values useable for updating a score in an account. Some embodiments may store the numeric boundary or set of confirmable values of the numeric boundary in an account and may store the numeric boundary or set of confirmable values in association with a profile. For example, some embodiments may store the boundary in the form of a list "[300, 900]" directly in a profile record. Alternatively, or in addition, some embodiments may store a boundary in association with a profile by storing the boundary or set of confirmable values within the boundary in a second account record associated with the profile.

Alternatively, or in addition, some embodiments may calculate a list or other set of values for use as a numeric boundary or set of confirmable values. For example, after determining a profile based on a web message comprising profile information, some embodiments may search through an account associated with the profile to determine a maximum score threshold. Some embodiments may then determine a set of confirmable values to display between a minimum value and the maximum score threshold, where the set of confirmable values may include a predetermined set of values. Some embodiments may determine a maximum score threshold based on an account value, such as by determining a maximum score threshold based on an amount repaid into a loan account that is indicated as repaying a principle account. For example, if a value for a first field of a first account is equal to a score of 2000, where the value of a second field of the first account indicates a total decrease of 951 to the value of the first field, some embodiments may set the maximum score threshold to be equal to the second field value of 951. Various other functions or data from an account may be used. For example, if the first field mentioned above is a loan principle amount and the second field mentioned above is a repayment amount, some embodiments may set the maximum score threshold based on determining the result of a step-wise function, square function, logarithmic function, other function, or combination of functions being applied on the second field or other field(s) of an account.

Some embodiments may determine the set of confirmable values based on a set of allowed score values between (either inclusively or exclusively) a minimum value and the maximum score threshold. For example, some embodiments may include a pre-existing set of values stored as an array "[50, 125, 200, 250, 400, 500, 750, 1000]." After a determination that the maximum score threshold for a score associated with a profile is equal to 537, some embodiments may provide the set of confirmable values in the form of an array [50, 125, 200, 250, 400, 500]," where the set of confirmable values includes all values from the pre-existing set of values less than the maximum score threshold. Alternatively, or in addition, some embodiments may determine a set of confirmable values based on a step size value or a boundary. For example, some embodiments may determine that a maximum value is 157. Some embodiments may then determine that the set of confirmable values to be provided in association with a UI is 0, 50, 100, and 150, based on each value of the set of confirmable values being less than 157.

Some embodiments may determine the set of confirmable values using a neural network or other predictive modeling system. For example, some embodiments may search through a history of other users with respect to a first user to determine a credit limit value associated with a maximum return value (e.g., highest rate of paying off a credit limit). The history of other users may be filtered by users having profile data matching or similar to data stored in the user's profile. Some embodiments may then use the predictive-model-found maximum credit limit to as part of a boundary value or base a determination of an upper limit to the boundary value based on the predictive-model-found maximum credit limit.

In some embodiments, the process 300 may include providing a UI having a selection element based on the boundary, as indicated by block 316. Some embodiments may provide a UI in the form of a web message, such as a web response, where the web message includes program instructions or other data that causes a computing device to display the UI. Some embodiments may provide the UI by providing program code to be interpreted and displayed on a web browser executing on a desktop computer, laptop computer, mobile computing device, augmented reality headset, or the like. Alternatively, or in addition, some embodiments may provide the UI by providing program code to be executed as native application on a computing device.

Some embodiments may provide a UI that includes a UI element that is manipulatable from a first configuration to a second configuration, where the first configuration corresponds with a lower limit and a second configuration corresponds to upper limit. In some embodiments, the lower limit may be equal to zero, a value stored in an account associated with a profile, a minimum of a set of confirmable values, or the like. In some embodiments, the lower limit may be or otherwise include a result of a function applied onto a value provided a server as a part of the UI or otherwise in association with the UI. For example, some embodiments may provide a UI element and a boundary represented by the list "[200, 650]," which includes a lower limit of 200 and an upper limit of 650. Some embodiments may display a UI element as a slidable element (i.e. "slider") that can be slid via a mouse drag or a touchpad from the left side to a right side of the slider, where the left side may correspond to the lower limit and the right side may correspond to the higher limit. Some embodiments may provide a UI element that displays the value corresponding with a UI element configured into the first configuration, second configuration, or other configuration. For example, a UI element of a UI set in a first configuration may cause a text box of the UI to display the value of 200, where the value of 200 corresponds with the first configuration. After the UI element is moved to a second configuration corresponding with the value 650, the text box of the UI may display the value 650. It should be noted that, while the above discloses the use of a slider, other some embodiments may use other UI elements, such as a text box entry or a rotatable element (e.g., a dial, a wheel, or the like). In addition, the UI may display a current value associated with an account, such as a credit limit value associated with a credit account associated with the user.

Some embodiments may provide a UI element that is configurable into having multiple configurations between two or more values of a set of confirmable values, where the UI element may then be automatically moved to a nearest value of the set of confirmable values. For example, some embodiments may provide a set of confirmable values represented by the list "[100, 150, 200, 250]" in association with a first UI element. The first UI element may include program code to be movable between a lowest configuration corresponding with the value of 100 and a highest configuration at value intervals of five, such that moving the slider may cause the UI to display or modify an internal state value to multiples of five such as 5, 10, 15, 20, the like. In some embodiments, the UI element may further include or be associated with program code that causes the slider to snap to a nearest value stored in the set of confirmable values. For example, some embodiments may provide program code to search for a nearest value in the list "[150, 200, 250]" for the initially-selected value 205 and determine that 200 is the nearest value in the list. In response, the UI element may be automatically set to an updated configuration corresponding with the value of 200 after the UI element is first set into an initial configuration corresponding with the initially-selected value 205.

An issue in sliding, rotating, or other movable UIs having discrete boundaries or discrete selectable intervals is either a configuration that causes a lack of responsiveness to micromotions or over-responsiveness. Additionally, some UI elements may be configured based on values allowing tens of thousands or more possible configurations, which may slow down operations to reconfigure the UI element to an allowed configuration or changing a data type being analyzed. Some embodiments may provide a second set of configurations for the UI element, where the second set of configurations may provide a greater number of configurations than the first set of configurations. By providing a second set of configurations, some embodiments may increase the number of configurations of the UI element to increase the smoothness and efficiency of a UI. By providing a UI element capable of moving through a set of intermediate configuration values, some embodiments may provide an interface experience emulating a continuous UI element while decreasing the time needed to determine a nearest value of an allowed list of values.

In some embodiments the process 300 may include obtaining an interface-selected value from an instance of the UI, as indicated by block 320. The interface-selected value may include a value corresponding to an initial configuration or updated configuration state of a UI element. For example, the interface-selected value may correspond to an updated configuration of a slider or other UI element of an instance of a UI executing on a client computing device after a confirmation button of the UI is clicked or tapped. Alternatively, some embodiments may receive an interface-selected value that is a transformation of the value corresponding to an updated configuration of the UI element. As further described below some embodiments may then update a profile value or value associated with the profile (e.g., a value stored in an account linked to the profile). For example, some embodiments may obtain the interface-selected value "200" via a request payload of a web request or other web message sent from a client computing device.

The interface-selected value may represent various types of values and be used to adjust or otherwise update a value associated with a profile. For example, as further described below, the interface selected value may include an interface-selected credit limit value usable increase a corresponding credit limit of a credit account, where the interface-selected credit limit may be greater than or less than a current credit limit. As described further below, some embodiments may encrypt an account value updated by the interface-selected value. Some embodiments may then store the encrypted value in persistent storage or send the encrypted value to a third-party API. In some embodiments, the adjustment of a value of an account may include adjusting a value of an account that has not been instantiated or otherwise made accessible, such as in adjustment of a credit limit value for a credit account that has not been created. In such cases, some embodiments may store the value in a first storage or temporary memory and retrieve the value for inclusion the account after the account has been created.

In some embodiments, the interface-selected value may include instructions to update one or more accounts. For example, some embodiments may receive an interface-selected value comprising, representing, or confirming instructions to deactivate an account. In response, some embodiments may determine whether an account is permitted to be deactivated based on one or more criteria, such as by determining whether a stored variable of the account satisfies an outstanding balance threshold. Deactivating an account may include updating a value associated with an account, where the updated value prevents the account from being further used or modified. Alternatively, deactivating the account may include permanently deleting the account. Some embodiments may perform one or more score updates as a part of deactivating an account or in response to a determination that an account is to be deactivated. For example, some embodiments may transfer an amount associated with a first account to a second account in response to a determination that an account is to be deactivated. Various criteria may be satisfied to confirm that an account is to be deactivated. For example, in response to receiving instructions to deactivate an account and a determination that a stored variable of the account satisfies an outstanding balance threshold, some embodiments may determine that the account is to be deactivated.

In some embodiments, the process 300 may include determining whether a new account or account card associated with the profile should be generated, as indicated by block 328. Some embodiments may determine that a new account or account card associate with the profile may be generated based on receiving instructions to generate the new account for account card or based on an existing set of criteria. For example, some embodiments may provide a UI having an option to generate a new account. Some embodiments may then receive a confirmation from a client computing device indicating that a user has selected the option to generate new account.

Some embodiments may include operations to determine whether the new account or account card is permitted for generation based on one or more criteria. Some embodiments may determine whether a number of updates satisfies a threshold number of updates. For example, some embodiments may determine whether a loan repayment count satisfies a threshold number of payments. If the threshold number of payments is three, then some embodiments may determine that a new account card is permitted based on a first account having been updated at least three times, and some embodiments may determine that a new account card is not permitted based on the first account having been updated only once. In response to a determination that a new account for account card associate with the profile should be generated, operations of the process 300 may proceed to block 332. Otherwise, operations of the process 300 may proceed to block 340.

In some embodiments, the process 300 may include sending an account generation request to an API based on data associated with the profile, as indicated by block 332. As discussed further below, some embodiments may encrypt data in a request sent to an API and may store or send data in a separate or otherwise isolated system or subsystem such as a virtual private cloud (VPC). For example, some embodiments may send account data including a username, a date of birth, identification number, to an address of a VPC after encrypting the account data. The VPC may then send the encrypted account data or other encrypted value(s) to an API of a third-party entity, where the entity may determine a new account identifier, cause the manufacture of a new physical card showing the new account identifier, or generate a counterpart account associated with the new account identified.

In some embodiments, the account generation request may include encrypted versions of profile data such as a name, an address, an image, another account identifier, or the like. In some embodiments, the account generation request may cause a server or other computing device of a third-party entity to generate a physical card and a corresponding card identifier. For example, as further described below, some embodiments may generate or cause the generation of a physical transaction card containing a name obtained from a user profile.

In some embodiments, the process 300 may include receiving a second set of web messages that includes the new account identifier from the third-party entity, as indicated by block 336. The second set of web messages may include a web response that indicates that a new account was confirmed, a physical card was queued for manufacture, or the like. In some embodiments, the new account identifier may include information associated with the new account, such as a security value, a digital signature, a card-specific model number, or the like. By receiving a card identifier or other information associated with a physical transaction card, some embodiments may update an account with the information and track account changes without necessitating continuously updating the third-party entity.

In some embodiments, the web message may include a card identifier corresponding to a physical transaction card. For example, some embodiments may receive a web message that includes a credit card number, where the web message was by a third-party server in response to a first web message received at an API of the third-party server. In some embodiments, a physical transaction card or another type of physical card may be generated by adding a record represented by the card identifier to a manufacturing device queue. After receiving a card identifier, some embodiments may associate an account with the card identifier, where use the card identifier during a transaction may cause a corresponding value of the account to change.

In some embodiments, the process 300 may include updating an account based on an interface-selected value or other data from a set of web messages, as indicated by block 340. Some embodiments may update an account with a value such as an interface-selected value or a new account identifier and associate the account with a profile. In some embodiments, the web message may include an interface-selected value that is then used to update one or more database records or other data structures storing data related to an account. For example, some embodiments may receive an encrypted web message that includes an interface-selected value representing an increased (or decreased) maximum credit limit. Some embodiments may then update one or more records of a database by decrypting the web message, determining a record based on the web message, and update one or more fields in the record based on the web message.

Some embodiments may then re-encrypt data in the updated record before storing the encrypted data in local persistent storage or in the storage of a VPC. As discussed further below, various encryption operations or methods may be used, where different types of encryption may be selected based on their efficiency, reliability, or the like. Furthermore, as described elsewhere in this disclosure, encrypting data in a record may include encrypting the specific field in the record, encrypting the record, encrypting the column of the field for the database storing the record, encrypting the entire database storing the record, or the like. Additionally, some embodiments may update an account based on an interface-selected value, new account information, or other data as it is received independently of other messages or data. For example, after receiving an interface-selected value as described for block 320, some embodiments may then proceed to update an account without waiting for additional account information such as a new account identifier described for block 336.

Figure 4:
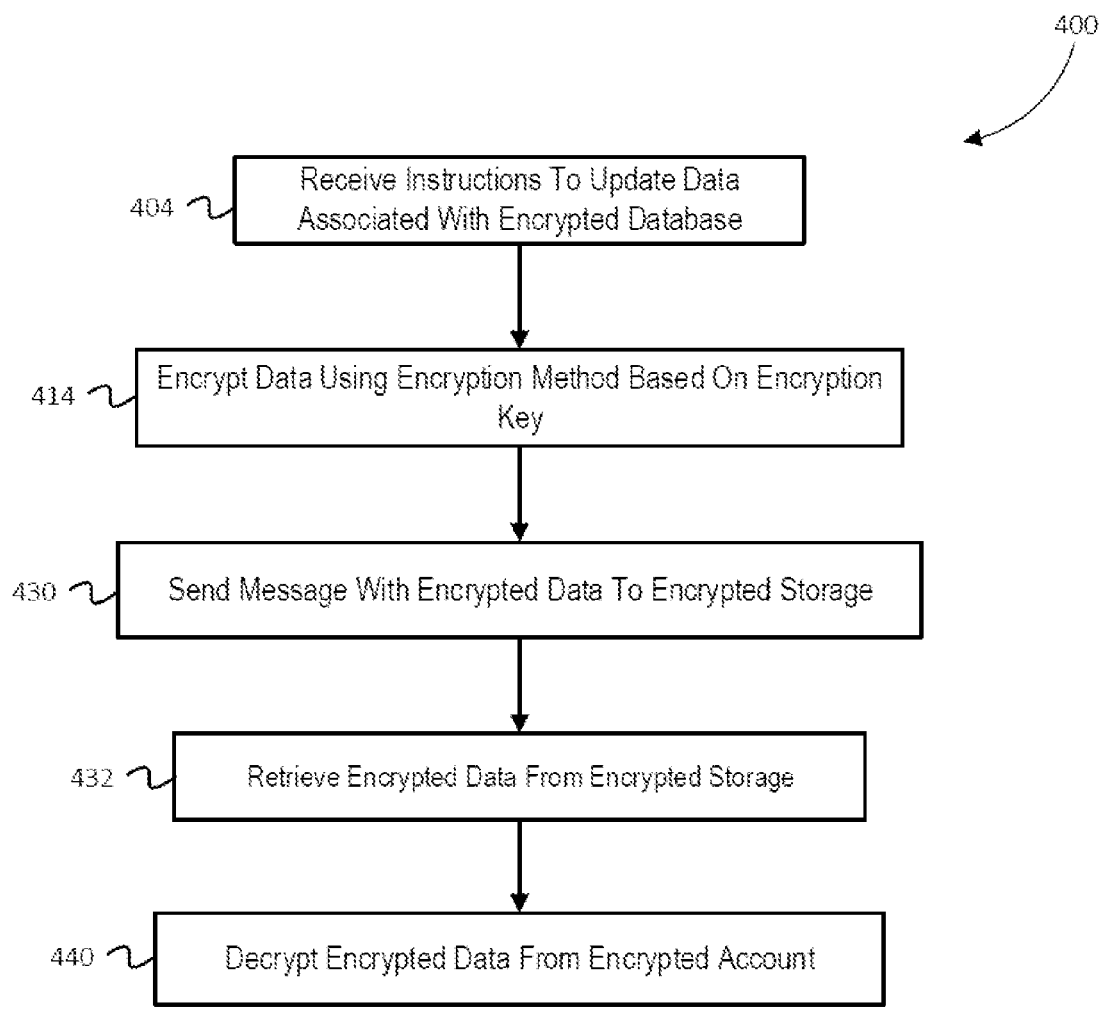
FIG. 4 is a flowchart illustrating a process to encrypt and decrypt data across accounts, in accordance with some embodiments of the present techniques.

FIG. 4 is a flowchart illustrating a process to encrypt and decrypt data across accounts, in accordance with some embodiments of the present techniques. In some embodiments, the process 400 may include receiving instructions to update data in an account, as indicated by block 404. Some embodiments may receive instructions to update an account in the form of routines activated by web messages. For example, some embodiments may receive instructions to update a loan payment parameter with a new quantitative number indicating payment of a portion of a loan, which may deduct a loan principle amount (which may have its own corresponding parameter). Alternatively, or in addition, some embodiments may receive instructions to update an account based on internal program code. For example, some embodiments may determine that a maximum value threshold associated with a specific profile may be increased and, in response, begin operations to update an account of the profile based on the maximum value threshold increase.

In some embodiments, the process 400 may include operations to update data associated with a database of encrypted values, as indicated by block 404. Some embodiments may include operations to store updates to data associated with an account, where the corresponding update values may be compressed into a single net update to account based on a threshold time interval. For example, some embodiments may receive a plurality of update requests that have occurred within a pre-determined time interval such as an interval less than a 1 minute time interval, less than a 10 minute interval, less than a 1 hour time interval, less than a 24-hour time interval, less than a 72-hour time interval, or the like. Some embodiments may then determine an arithmetic sum of the plurality of score changes and store the arithmetic sum of the plurality of score changes in an encrypted record, as further discussed below. For example, some embodiments may receive three update requests, each update request including an update value representing changes to an account score. Some embodiments may sum the three update values to compute a sum of the three update values (or other combined value of the three update values), each of the three update values having a timestamp within a same pre-defined time interval (e.g., within the same day).

In some embodiments, the process 400 may include encrypting data using an encryption method based on an encryption key, as indicated by block 414. In some embodiments, the encryption method may include one or more of various types encryption methods, such as a symmetric encryption method, an asymmetric encryption method, a hybrid encryption method, or a quantum encryption method. Some embodiments may use a symmetric encryption method, such as an encryption method based on the advanced encryption standard (AES), where a data encrypted with a symmetric encryption method using a single encryption key may be decrypted with the same encryption key. For example, some embodiments may implement AES encryption using 128-bit or 256-bit keys and 128-bit blocks, where using AES encryption may include encrypting a data using consecutive rounds of a substitution-permutation network (SPN). Various symmetrical algorithms may be used to encrypt or decrypt data, such as Twofish, RC6, Serpent, Mars, or the like, and may further be described by Rachmat et al. (Rachmat, N., 2019, March. Performance analysis of 256-bit AES encryption algorithm on android smartphone. In Journal of Physics: Conference Series (Vol. 1196, No. 1, p. 012049). IOP Publishing), which is hereby incorporated by reference.

Alternatively, some embodiments may use an asymmetric encryption method to encrypt or decrypt a value, where an asymmetric encryption method includes the use of a public key to encrypt a message and a private key to decrypt the encrypted message. One or more various types of asymmetric encryption algorithms may be used, such as a Rivest-Shamir-Adleman (RSA) encryption algorithm, an ElGamal encryption algorithm, a Diffie-Hellman key exchange protocol, an elliptic-curve cryptography method, or the like, where such algorithms may be described by Mahto et al. (Mahto, D. and Yadav, D. K., 2018. Performance Analysis of RSA and Elliptic Curve Cryptography. IJ Network Security, 20(4), pp. 625-635). For example, some embodiments may use an RSA encryption method by using a first encryption key to encrypt an account identifier and using a first decryption key that is different from the first encryption key to decrypt the encrypted account identifier. Some embodiments may implement an asymmetric encryption method in distributed computing environments, where different subsystems or services of an application may be independent of one another or not necessarily trusted.

Some embodiments may use a format-preserving cipher, where the encryption key for the format-preserving cipher may be protected in a different virtual or physical memory of a computer system than the data that it is used to encrypt. A format-preserving cipher may be used to convert a value into a same format (e.g., same number of fields), and may include various types of encryption methods such as block cipher encryption. For example, some embodiments may use a format-preserving cipher to convert a first account identifier to a second account identifier having the same number of digits. Various format-preserving cipher methods may be used, such as the Black and Rogaway encryption method, an encryption method using a Feistel network, another Feistel-based encryption method, another block cipher, or the like, where such encryption may be described in Bellare et al. 2009 (Bellare, M., Ristenpart, T., Rogaway, P. and Stegers, T., 2009, August. Format-preserving encryption. In International workshop on selected areas in cryptography (pp. 295-312). Springer, Berlin, Heidelberg), which is hereby incorporated by reference.

Use of a format-preserving cipher may preserve the uniqueness of each account number while reducing the amount of memory used to encrypt the data. For example, some embodiments may use a block cipher encryption method, such as an FFX encryption method, to encrypt a block (e.g., a number, a string, list, or the like), which is further described in Bellare et al. 2010 (Bellare, M., Rogaway, P. and Spies, T., 2010 The FFX mode of operation for format-preserving encryption. NIST submission, 20, p. 19), which is hereby incorporated by reference. Some embodiments using the FFX method may perform multiple encryption rounds of operations that include splitting an input value for the encryption method into to subsets. After dividing the block into two block sections, using the FFX method may including using the first block section as an input for a first half of an encryption round for a function that takes, as parameters, the encryption key and the second block section. Various functions may be used, and may include combinations of arithmetic operations, vector product operations, logarithmic operations, exponential operations, or the like. Some embodiments using the FFX method also perform an exclusive or (XOR) operation across elements (e.g., individual bits) between the function result and the second block section to produce an intermediate block that includes the encrypted first block section. Some embodiments using the FFX method may then switch the operations being performed on the first and second block sections in a second half of an encryption round by using the second block section as an input to a function using the first now-encrypted block section and the encryption key as function parameters. Some embodiments may then perform multiple encryption rounds to encrypt a block.

Some embodiments may encrypt or decrypt data using a lattice-based encryption method or other quantum-proof encryption method. For example, some embodiments using a lattice-based encryption method may obtain a path through a multi-dimensional lattice and, in response, encrypt or decrypt data based on an encryption key stored at a point in the multi-dimensional lattice along the path. Additionally, some embodiments may use quantum cryptography to encrypt or decrypt data. For example, some embodiments may distribute a quantum key between two databases, such as a profile database and an account database stored in a VPC.

In some embodiments, the process 400 may include sending the encrypted message to an encrypted persistent storage, as indicated by block 430. The encrypted persistent storage may be isolated from other data storage or systems of a computing environment. In some embodiments, data being sent to the encrypted persistent storage, stored in the encrypted persistent storage, or retrieved from the encrypted persistent storage may be in an encrypted state. The encrypted persistent storage may include a solid state drive, a spinning disk drive, or the like. In some embodiments, the encrypted persistent storage may be part of a VPC capable of isolating a database stored in the persistent storage from other components of the system.

In some embodiments, the encrypted message may be stored in a database of encrypted values, where various encryption methods may be used. Some embodiments may perform transparent data encryption (TDE), where an unencrypted database having multiple records and multiple columns may be encrypted to form an encrypted block(s) of data or decrypted from the encrypted block(s) of data into an unencrypted database. Various TDE operations may be used to encrypt a database. For example, while some embodiments may encrypt a database using one or more of the encryption methods described above such that the database may remain encrypted while being transmitted in a network or while at rest (e.g., while not being edited or moved). Alternatively, or in addition, some embodiments may perform a column-level encryption operation, where columns of a database may be separately encrypted with different encryption keys. Some embodiments may perform column-level encryption of account data, where commonly retrieved and less sensitive fields of the account data remains unencrypted, while sensitive fields are encrypted. In some cases, use of a column-level encryption may be increase the flexibility of data structures holding sensitive information (e.g., account identifiers) with respect to response times when retrieving unencrypted data. Alternatively, or additionally, some embodiments may perform field-level encryption of account data, where individual fields of data may be encrypted using methods such as probabilistic encryption methods. As used in this disclosure, a field of a record may be understood as the specific column for a single record (unless otherwise stated), whereas a column of a database may include each field having a shared field name in the database.

in some embodiments, the process 400 may include retrieving encrypted data from the encrypted persistent storage, as indicated by block 432. Some embodiments may retrieve encrypted data from an encrypted persistent storage in response to instructions to perform an action using data stored in an encrypted form. For example, some embodiments may receive instructions to increase a maximum score threshold based on a web message. In response, some embodiments may retrieve a verification number from an encrypted account to verify data in the request, where retrieving the verification number may include performing a decryption operation.

In some embodiments, the process 400 may include decrypting the encrypted data of the encrypted account, as indicated by block 440. The decryption method used to decrypt the encrypted data may be based on the encryption method used to first encrypted data. For example, some embodiments may use a block cipher decryption method to decrypt data encrypted by a block cipher encryption method. Some decryption methods may use a same key to encrypt and decrypt data, while other methods may use different keys to encrypt and decrypt data. After decrypting the data, some embodiments may then use the data to confirm a transaction, update an account, store additional data, or the like. For example, some embodiments may decrypt an account identifier stored in a database of encrypted values to update an account balance or update a loan repayment.

Some embodiments may use an FFX decryption method to decrypt a block that was encrypted with an FFX encryption method. For example, some embodiments may divide an encrypted block into two block sections, where using the FFX method may including using the first block section as input for a first half of a decryption round for a function that takes, as parameters, the encryption key and the second block section. Various functions may be used to produce an intermediate block that includes the (partially) decrypted first block section and the second block, where the function used may be based on an inverse function of the function used during FFX encryption. For example, if a modular addition operation based on the second block was used to encrypt data into an encrypted block, some embodiments may use a modular subtraction based on the second block to decrypt the data into a decrypted block. Some embodiments using the FFX method may then switch the operations being performed on the first and second block sections in a second half of a decryption round by using the second block section as an input to a function using the (partially) decrypted block section and the encryption key as function parameters. Some embodiments may then perform multiple decryption rounds to decrypt an encrypted block to its original form, where the number of decryption rounds is equal to the number of encryption rounds used to encrypt the decrypted block.

Figure 5:
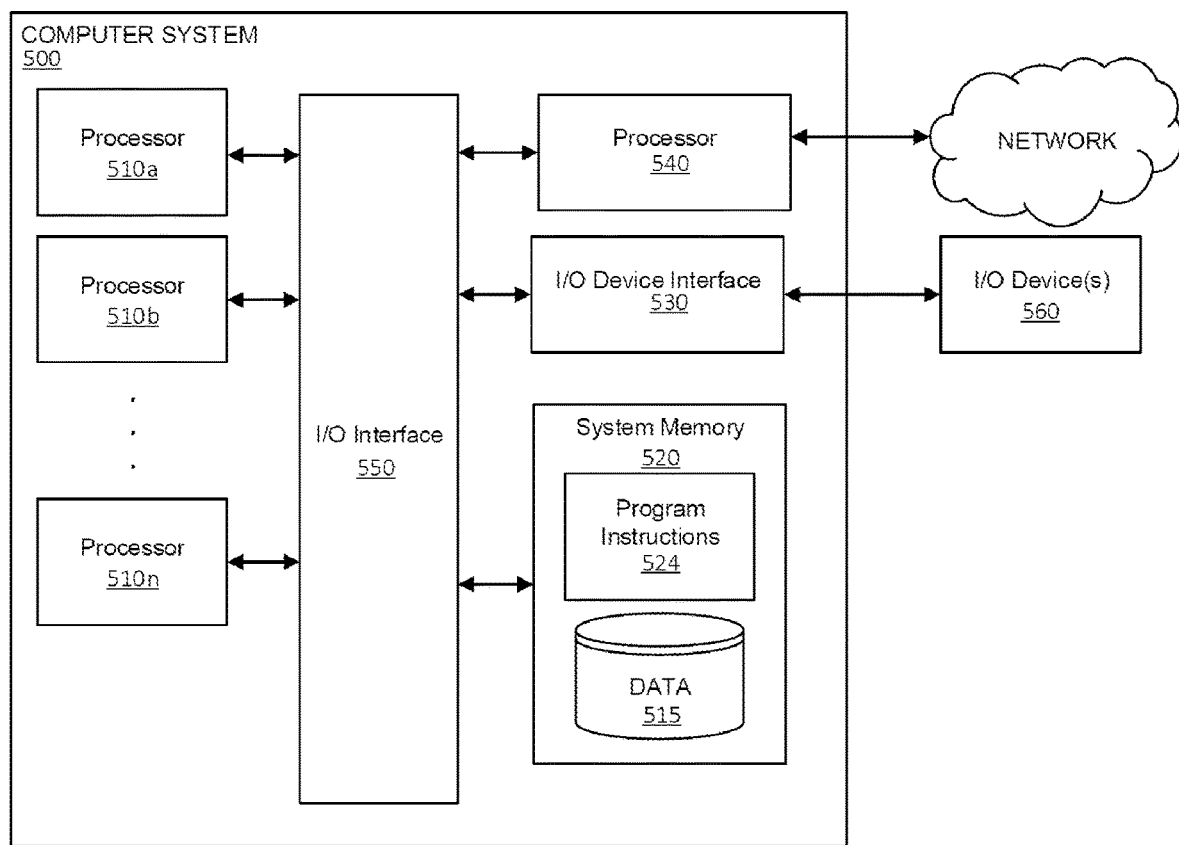
FIG. 5 shows an example of a computing device by which the present techniques may be implemented.

FIG. 5 shows an example of a computing device by which the present techniques may be implemented. FIG. 5 is a diagram that illustrates an exemplary computer system 500 in accordance with embodiments of the present technique. Various portions of systems and methods described herein, may include or be executed on one or more computer systems similar to computer system 500. Further, processes and modules described herein may be executed by one or more processing systems similar to that of computer system 500.

Computer system 500 may include one or more processors (e.g., processors 510a-510n) coupled to system memory 520, an input/output I/O device interface 530, and a network interface 540 via an input/output (I/O) interface 550. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computer system 500. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 520). Computer system 500 may be a uni-processor system including one processor (e.g., processor 510a), or a multi-processor system including any number of suitable processors (e.g., 510a-510n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computer system 500 may include a plurality of computing devices (e.g., distributed computer systems) to implement various processing functions.

I/O device interface 530 may provide an interface for connection of one or more I/O devices 560 to computer system 500. I/O devices may include devices that receive input (e.g., from a user) or output information (e.g., to a user). I/O devices 560 may include, for example, graphical UI presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 560 may be connected to computer system 500 through a wired or wireless connection. I/O devices 560 may be connected to computer system 500 from a remote location. I/O devices 560 located on remote computer system, for example, may be connected to computer system 500 via a network and network interface 540.

Network interface 540 may include a network adapter that provides for connection of computer system 500 to a network. Network interface may 540 may facilitate data exchange between computer system 500 and other devices connected to the network. Network interface 540 may support wired or wireless communication. The network may include an electronic communication network, such as the Internet, a local area network (LAN), a wide area network (WAN), a cellular communications network, or the like.

System memory 520 may be configured to store program instructions 524 or data 515. Program instructions 524 may be executable by a processor (e.g., one or more of processors 510a-510n) to implement one or more embodiments of the present techniques. Instructions 524 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 520 may include a tangible program carrier having program instructions stored thereon. A tangible program carrier may include a non-transitory computer readable storage medium. A non-transitory computer readable storage medium may include a machine-readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM or DVD-ROM, hard-drives), or the like. System memory 520 may include a non-transitory computer readable storage medium that may have program instructions stored thereon that are executable by a computer processor (e.g., one or more of processors 510a-510n) to cause the subject matter and the functional operations described herein. A memory (e.g., system memory 520) may include a single memory device or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 550 may be configured to coordinate I/O traffic between processors 510a-510n, system memory 520, network interface 540, I/O devices 560, or other peripheral devices. I/O interface 550 may perform protocol, timing, or other data transformations to convert data signals from one component (e.g., system memory 520) into a format suitable for use by another component (e.g., processors 510a-510n). I/O interface 550 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 500 or multiple computer systems 500 configured to host different portions or instances of embodiments. Multiple computer systems 500 may provide for parallel or sequential processing/execution of one or more portions of the techniques described herein.

Those skilled in the art will appreciate that computer system 500 is merely illustrative and is not intended to limit the scope of the techniques described herein. Computer system 500 may include any combination of devices or software that may perform or otherwise provide for the performance of the techniques described herein. For example, computer system 500 may include or be a combination of a cloud-computer system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 500 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

The techniques above may be implemented in combination with various combinations of the approaches described below under the capitalized headings.

Multiple Devices for Updating Repositories

Figure 6:
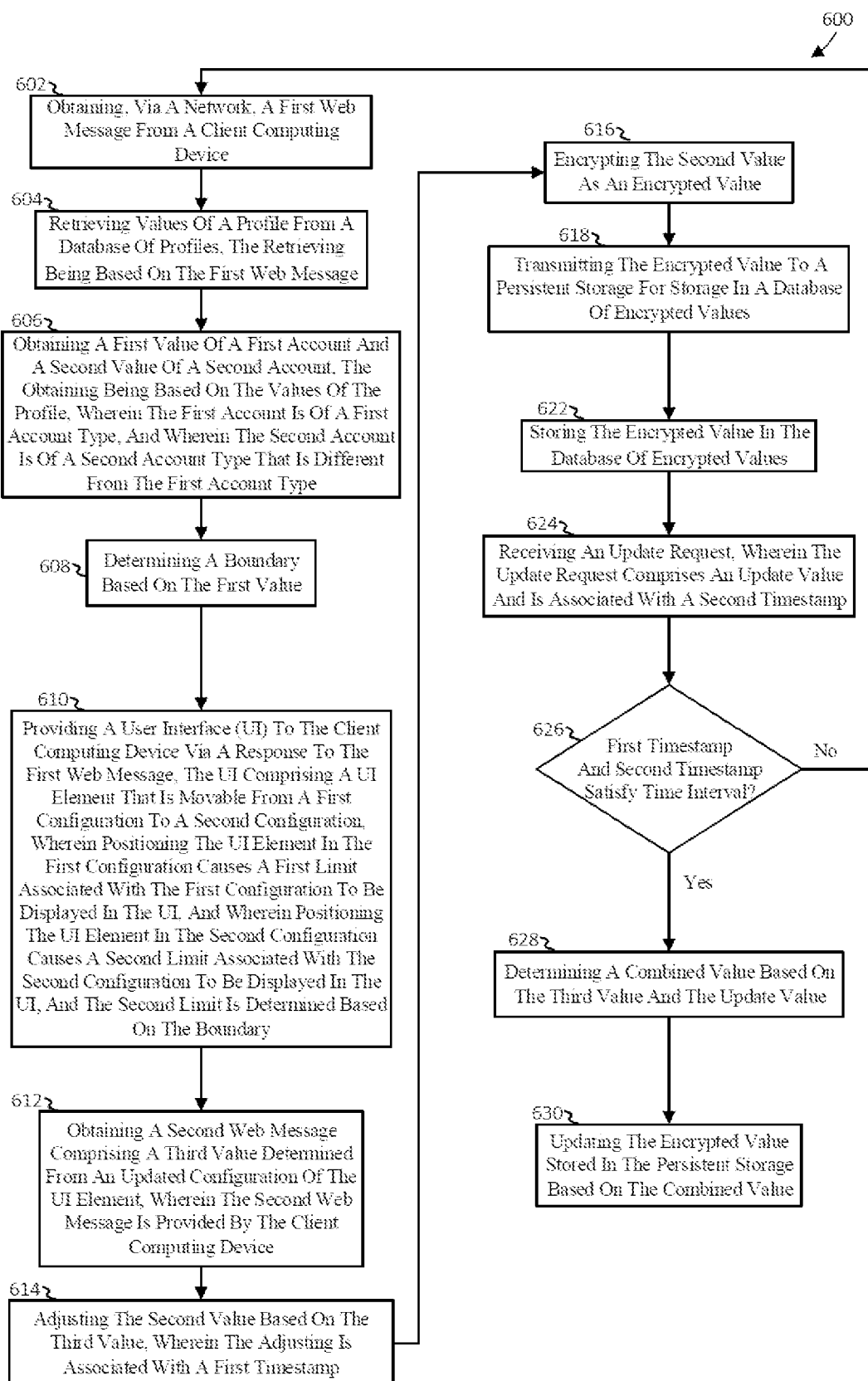
FIG. 6 is a flowchart of a process configured to update encrypted data, in accordance with some embodiments of the present techniques.

FIG. 6 is a flowchart of a process configured to update encrypted data, in accordance with some embodiments of the present techniques. In some embodiments, the process 600 may include operations to obtain, via a network, a first web message from a client computing device, as indicated by block 602. Operations to obtain the first web message may include a set of operations similar to, or the same as, a set of operations described for block 304. For example, some embodiments may obtain a web request via data packets sent according to an internet protocol, where the web request includes textual information divided into frames and includes cryptographically hashed account identifiers or passwords.

In some embodiments, the process 600 may include operations to retrieve values of a profile from a database, the retrieving being based on the first web message, as indicated by block 604. Operations to retrieve values of a profile may include a set of operations similar to, or the same as, a set of operations described for block 308. For example, some embodiments may use a query provided by a first web message or based on the first web message to retrieve values from a database of profiles, where the database may include a relational database such as a SQL database, a non-relational database, or another type of database. The values of a profile may include a name of a user, a set of permissions indicating what records the user may access, a set of account owners representing one or more entities that own the user's account(s) (use of the format "(s)" should not be read to imply that terms not using this format are limited to the singular or plural), or other values of fields identifying an individual user, an organization, or another entity.

In some embodiments, the process 600 may include operations to obtain a first value of a first account and a second value of a second account, the obtaining being based on the values of the profile, wherein the first account is of a first account type, and wherein the second account is of a second account type that is different from the first account type, as indicated by block 606. Operations to obtain a first and second value of a first and second account record, respectively, may include a set of operations similar to or the same as a set of operations described for block 308. As discussed elsewhere in this disclosure, records of different databases may store different types of values. Some embodiments may retrieve values of different records based on a profile record's references to the different records. For example, a first reference in a profile may be linked to a first account record, and a second reference in the profile may be linked to a second account record. Some embodiments may then obtain a first score stored in the first account record and obtain a second score stored in the second account record.

In some embodiments, the process 600 may include operations to determine a boundary based on the first value, as indicated by block 608. Operations to determine a boundary may include a set of operations similar to, or the same as, a set of operations described for block 312. For example, if a value for a first field of a first account record is equal to a score of 2000 and the value of a second field of the first account record indicates a total decrease of 951 to the value of the first field, some embodiments may set a maximum value of the boundary to be equal to the second field value of 951.

In some embodiments, the process 600 may include operations to provide a UI to the client computing device via a response to the first web message, the UI comprising a UI element that is movable from a first configuration to a second configuration, wherein positioning the UI element in the first configuration causes a first limit associated with the first configuration to be displayed in the UI, and wherein positioning the UI element in the second configuration causes a second limit associated with the second configuration to be displayed in the UI, and the second limit is determined based on the boundary, as indicated for block 610. Operations to provide a UI may be similar to or the same as those described for block 316. For example, some embodiments may provide a UI that includes a UI element that is manipulatable from a first configuration to a second configuration, where the first configuration corresponds with a lower limit and a second configuration corresponds to an upper limit.

In some embodiments, the process 600 may include operations to obtain a second web message comprising a third value determined from an updated configuration of the UI element, wherein the second web message is provided by the client computing device, as indicated by block 612. Operations to obtain the second web message may include a set of operations similar to, or the same as, a set of operations described for block 320. For example, a third value received via a web message may be an interface-selected value, and some embodiments may receive an interface-selected value having instructions to deactivate an account or an interface-selected value that is a transformation of a value corresponding to an updated configuration of the UI element.

In some embodiments, the process 600 may include operations to adjust the second value based on the third value, wherein the adjusting is associated with a first timestamp, as indicated by block 614. Operations to obtain the second web message may include a set of operations similar to, or the same as, a set of operations described for block 340 or block 404. For example, the third value may be an interface-selected value, and some embodiments may receive an encrypted web message that includes the interface-selected value. Some embodiments may then update one or more records of a database by decrypting the web message, determining a record based on the web message, and update a field in the record based on the interface-selected value, where the operation to update the field has an associated timestamp.

In some embodiments, the process 600 may include operations to encrypt the second value as an encrypted value, as indicated by block 616. Operations to encrypt the second value may include a set of operations similar to or the same as a set of operations described for block 414. For example, some embodiments may use a block cipher encryption method or another format-preserving cipher to encrypt the second value.

In some embodiments, the process 600 may include operations to transmit the encrypted value to a persistent storage for storage in a database of encrypted values, as indicated by block 618. Operations to transmit the encrypted value to a persistent storage may include a set of operations similar to or the same as a set of operations described for block 430. For example, some embodiments may encrypt a value using one or more of the encryption methods described above such that the value may remain encrypted while being transmitted in a network to a database.

In some embodiments, the process 600 may include operations to store the encrypted value in the database of encrypted values, as indicated for block 622. Operations to store the encrypted value in the database of encrypted values may include a set of operations similar to or the same as a set of operations described for block 430. For example, some embodiments may store the encrypted value in a VPC, where the VPC is capable of isolating a database stored in the persistent storage from other components of the system.

In some embodiments, the process 600 may include operations to receive an update request, wherein the update request comprises an update value and is associated with a second timestamp, as indicated by block 624. Operations to receiving the update request may include a set of operations similar to, or the same as, a set of operations described for block 340 or block 404. For example, some embodiments may receive an update request in the form of a second web request having a second interface-selected value after receiving a first web request having a first interface-selected value.

In some embodiments, the process 600 may include operations to determine whether the first timestamp and the second timestamp satisfy a time interval criterion, as indicated by block 626. Operations to determine whether the first and second timestamps satisfy a time interval criterion may include a set of operations similar to, or the same as, a set of operations described for block 404. For example, some embodiments may receive a first update request that at 1 PM and a second update request at 2 PM. Some embodiments may then determine whether the first and second update request satisfies a time interval criterion, such as a 1-day time interval criterion. If a determination is made that the first and second update requests do occur within the time interval, operations of the process 600 may proceed to block 628. Otherwise, operations of the process 600 may proceed to block 630.

In some embodiments, the process 600 may include operations to determine a combined value based on the third value and the update value, as indicated for block 628. For example, some embodiments may receive three update requests that satisfy a criterion that a plurality of update requests occur within a same pre-set time interval, where each update request includes an update value. Some embodiments may sum the three update values to compute a sum of the three update values as a combined value of the three update values.

In some embodiments, the process 600 may include operations to update the encrypted value stored in the persistent storage based on the combined value, as indicated by block 630. Operations to determine whether the first and second timestamps satisfy a time interval may include a set of operations similar to or the same as a set of operations described for block 340, block 404, or block 440. For example, some embodiments may decrypt a value of a field using a format-preserving cipher key, update the value based on the combined value, and re-encrypt the updated value.

Figure 7:
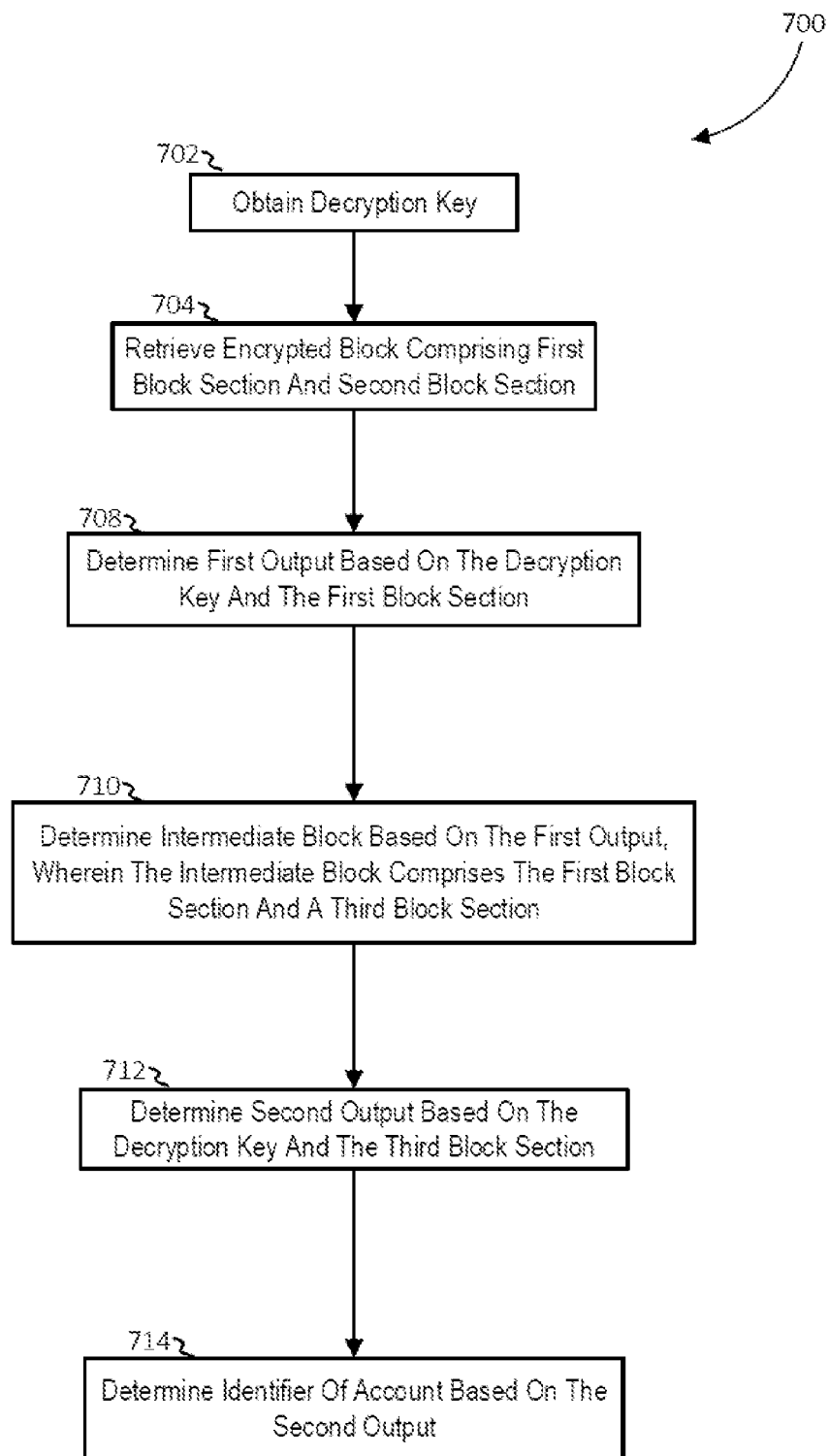
FIG. 7 is a flowchart of a process configured to determine an output based on a decryption key, in accordance with some embodiments of the present techniques.

FIG. 7 is a flowchart of a process configured to determine an output based on a decryption key, in accordance with some embodiments of the present techniques. In some embodiments, the process 700 may include operations to obtain a decryption key, as indicated for block 702. Operations to obtain a decryption key may include a set of operations similar to or the same as a set of operations described for block 414. For example, some embodiments may obtain a key for decryption operations corresponding with a symmetric encryption method, an asymmetric encryption method, or a hybrid encryption method with both symmetric and asymmetric portions of the protocol.

In some embodiments, the process 700 may include operations to retrieve an encrypted block comprising a first block section and a second block section, as indicated by block 704. Operations to retrieve an encrypted block may include a set of operations similar to or the same as a set of operations described for block 414. For example, some embodiments may retrieve an encrypted block of a database, where the encrypted block is determined based on an unencrypted database.

In some embodiments, the process 700 may include operations to determine a first output based on the decryption key and the first block section, as indicated by block 708. Operations to determine a first output based on the decryption key and the first block section may include a set of operations similar to, or the same as, a set of operations described for block 414. For example, some embodiments may divide an encrypted block into two block sections, where using the FFX method may including using the first block section as input for a first half of a decryption round for a function that takes, as parameters, the encryption key and the second block section.

In some embodiments, the process 700 may include operations to determine an intermediate block based on the first output, wherein the intermediate block comprises the first block section and a third block section, as indicated by block 710. Operations to determine an intermediate block based on the first output may include a set of operations similar to, or the same as, a set of operations described for block 414. For example, some embodiments may use a function to produce an intermediate block that includes a partially decrypted first block section and a second block section. In some embodiments, the function used may be based on an inverse function of the function used during an FFX encryption operation that was used to generate the encrypted second block section.

In some embodiments, the process 700 may include operations to determine a second output based on the decryption key and the third block section, as indicated by block 712. Operations to determine a second output based on the decryption key and the third block section may include a set of operations similar to, or the same as, a set of operations described for block 440. For example, some embodiments using a FFX method may use the second block section as an input to a function using a partially decrypted block section and the encryption key as function parameters. Some embodiments may perform multiple decryption rounds (e.g., where nested encrypted layers are used) to decrypt an encrypted block to an original decrypted form, e.g., from a ciphertext format to a plaintext format.

In some embodiments, the process 700 may include operations to determine an identifier of the second account based on the second output, as indicated by block 714. Operations to determine a second output based on the decryption key and the third block section may include a set of operations similar to, or the same as, a set of operations described for block 440. For example, after using a format-preserving cipher to convert a first account identifier to a second account identifier having the same number of digits, some embodiments may use a decryption operation to retrieve the second account identifier.

Figure 8:
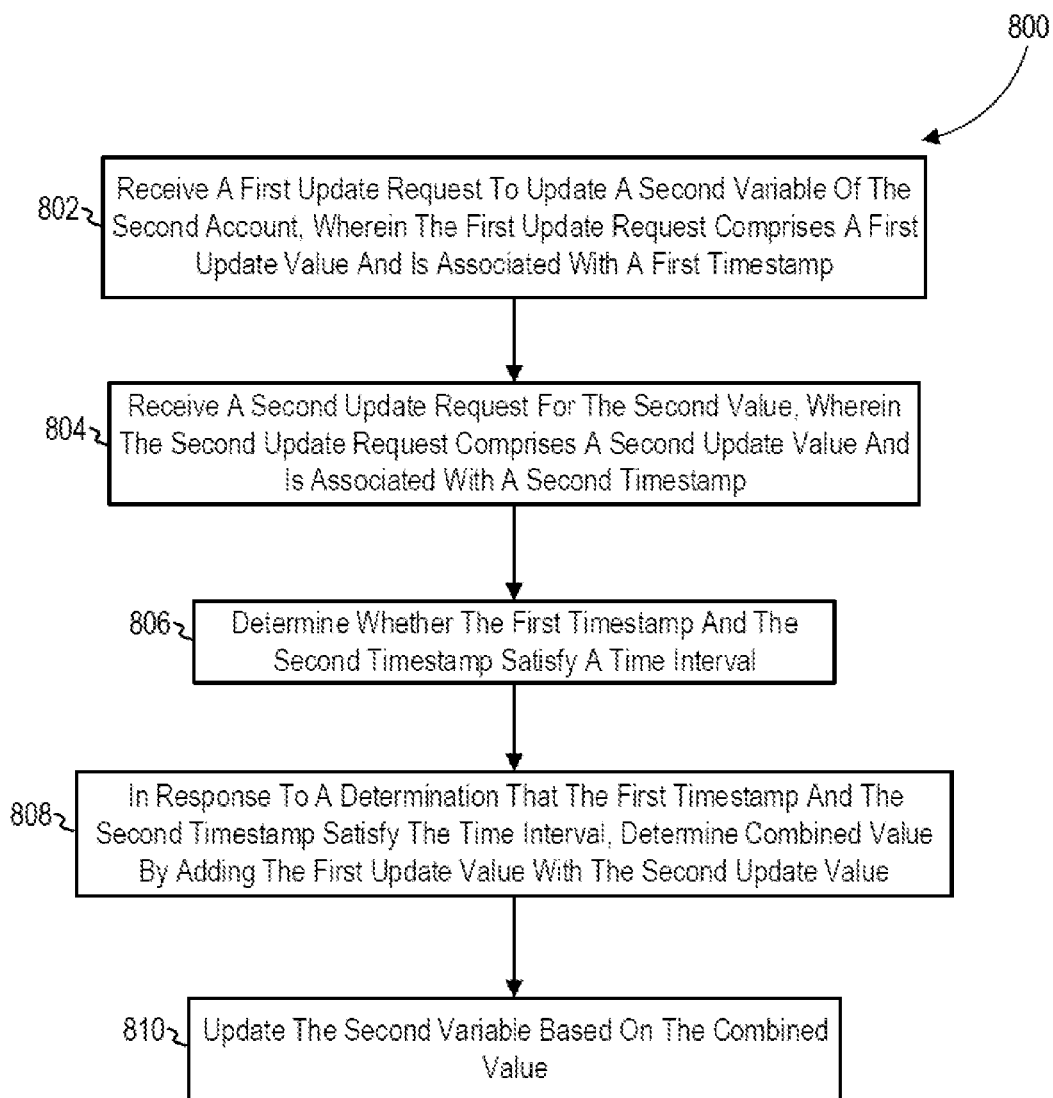
FIG. 8 is a flowchart of a process configured to update a variable based on a combined value, in accordance with some embodiments of the present techniques.

FIG. 8 is a flowchart of a process configured to update a variable based on a combined value, in accordance with some embodiments of the present techniques. Operations of the process 800 may begin at block 802. In some embodiments, the process 800 may include operations to receive a first update request to update a second variable of the second account, wherein the first update request comprises a first update value and is associated with a first timestamp, as indicated by block 802. Operations to receiving a first update request may include a set of operations similar to, or the same as, a set of operations described for block 340 or block 404. For example, some embodiments may receive an interface-selected value as an update value via a web message, and some embodiments may receive an encrypted web message that includes the interface-selected value, where the web message may be associated with a first timestamp.

In some embodiments, the process 800 may include operations to receive a second update request for the second value, wherein the second update request comprises a second update value and is associated with a second timestamp, as indicated by block 804. This may include a set of operations similar to, or the same as, a set of operations described for block 340 or block 404. For example, some embodiments may receive a second interface-selected value as a second update value via a second web message, and some embodiments may receive a second encrypted web message that includes the second interface-selected value, where the second web message may be associated with a second timestamp.

In some embodiments, the process 800 may include operations to determine whether the first timestamp and the second timestamp satisfy a time interval, as indicated by block 806. Operations to determine whether the first timestamp and the second timestamp satisfy a time interval may include a set of operations similar to, or the same as, a set of operations described for block 404. For example, some embodiments may determine whether update requests are within a time interval based on timestamps associated with each request.

In some embodiments, the process 800 may include operations to determine a combined value by adding the first update value with the second update value in response to a determination that the first timestamp and the second timestamp satisfy the time interval, as indicated by block 808. Operations to update the second variable based on the combined value may include a set of operations similar to, or the same as, a set of operations described for block 404. For example, some embodiments may sum a set of three update values to compute a sum of the three update values as a combined value of the three update values.

In some embodiments, operations of the process 800 may include updating the second variable based on the combined value, as indicated by block 810. Operations to update the second variable based on the combined value may include a set of operations similar to, or the same as, a set of operations described for block 340, block 404, or block 440. For example, some embodiments may decrypt a value of a field using a format-preserving cipher key, update the value based on the combined value, and re-encrypt the updated value.

In some scenarios, attempts by a user to initiate the review or adjustment of a score stored in different records may cause the system to access of different records. This exposure may trigger the concurrent access of a record value via multiple applications or multiple devices. Examples include a user using a first application executing on a mobile computing device to scan a QR code with a device camera, where the QR code encodes a uniform resource locator (URL). Alternatively, or additionally, a computing device may be directed to a URL based on wireless signals received from a near field communication (NFC) component of the computing device. For example, some embodiments may receive a URL encoded in a NFC signal via an antenna, where an NFC signal may be transmitted at a frequency near 13.56 Megahertz (Mhz), such as 13.54 MHz to 13.58 MHz. Accessing the uniform resource locator causes the installation of a second application on the mobile computing device to display a UI permitting the user to adjust a record score. Furthermore, a user may access or update a value of a record using different interaction types. For example, a user may use a natural language speech platform to provide audio instructions to a recording device to access or adjust a credit limit displayed on a smartphone. However, increasing the ease and convenience of accessing a shared record may result in duplicative database queries or increase hacking or fraudulent activity risks, which is not to suggest that any approaches are disclaimed.

To mitigate these risks, some embodiments may perform operations to increase the security of updating a record by selecting devices for authentication based on device locations and network performance based on the plurality of devices during unverified access operations. Some embodiments may obtain a set of queries from a first application executing on a first computing device for a first set of record values associated with a user, where the record values may be used to determine a boundary. Some embodiments may use the boundary to generate and provide a UI to the first computing device. After obtaining an interface-selected value provided by a user's interaction with the UI element, some embodiments may obtain a set of locations of other computing devices associated with the user using a second set of queries. Based on distance measurements between the first computing device and the other devices and network performance metrics, some embodiments may select a second device for an authentication operation. Some embodiments may then determine whether an authentication value is received from the second computing device and, in response to receiving the authentication message, update a record based on the interface-selected value.

Some embodiments may intelligently determine which device to select or otherwise display the information by determining whether the first device is close to the second device. For example, some embodiments may use location-specific or network-specific information when selecting a second application or second device for authenticating a request to update a record. Some embodiments may collect network performance metrics, such as bandwidth or latency, for devices associated with a user and determine which of the devices satisfies a network performance threshold to determine a subset of connected devices. Some embodiments may further determine which of the subset of connected devices is closest to a user or closest to the update-initiating device and select the closest device for authentication. After a determination that an authentication value was received by the closest device or that an authentication message sent to the closest device was provided to the update-initiating device, some embodiments may then update a record based on an interface-selected value.

Some embodiments may perform one or more of the UI mediated information exchanges described in this disclosure using a natural language speech platform. For example, some embodiments may provide integration with the Google Assistant™, Amazon Alexa™, Apple Siri™, or the like to view or access a record value. In some use cases, voice-based access to sensitive information, such as financial information or medical information, may create privacy challenges due to the relative ease of reproducing a voice. Some embodiments may perform operations to verify voice-based instructions to access a record by using a second device to authenticate the instructions, providing the UI to update the value to a second device, or otherwise prevent single-application or single-device record retrieval or record modification.

Some embodiments may implement one or more operations described in this disclosure using cloud computing infrastructure. For example, some embodiments may include a set of applications to provide a UI or perform other operations described in this disclosure that hosted on an Amazon Elastic Compute Cloud (EC2) service or another set of cloud computing services. The cloud computing services may include compute scaling services or a set of Postgres databases to store records of user data, group data, organization data, or the like. Some embodiments may use other databases or may use a plurality of databases having different capabilities with respect to storage space or data retrieval efficiency. For example, some embodiments may store data in a relatively slower but higher-volume data store and cache data in a relatively faster but lower-volume data store service (e.g., an in-memory managed Memcache) such as Amazon Elasticache™, where the data store service may implement an in-memory database such as Memcached™, Redis™, or the like.

Some embodiments may use an in-memory database to cache data that is predicted to be accessed by a computer device. For example, some embodiments may cache a number of times that a record is accessed, a credit limit, or an available allocation. After receiving a request from a first computing device for a record value, some embodiments may store the record value and display record value on the first computing device when an authentication value is provided by a second computing device. Furthermore, as discussed elsewhere in this disclosure, some embodiments may cache temporary data to increase the speed and efficiency of data retrieval. For example, some embodiments may cache requests for a credit limit in an in-memory database such as Redis. In some cases, data may be retrieved by hashing a key (e.g., with distributed consistent hashing), and selecting among a set of sharded servers based on the hash value. The hash of the key or another hash may then be used to access a value in a hash table that points to or is the requested data, which in some cases is a cached copy of data stored in another, often less performant (e.g., in-storage rather than in-memory) database.

Figure 9:
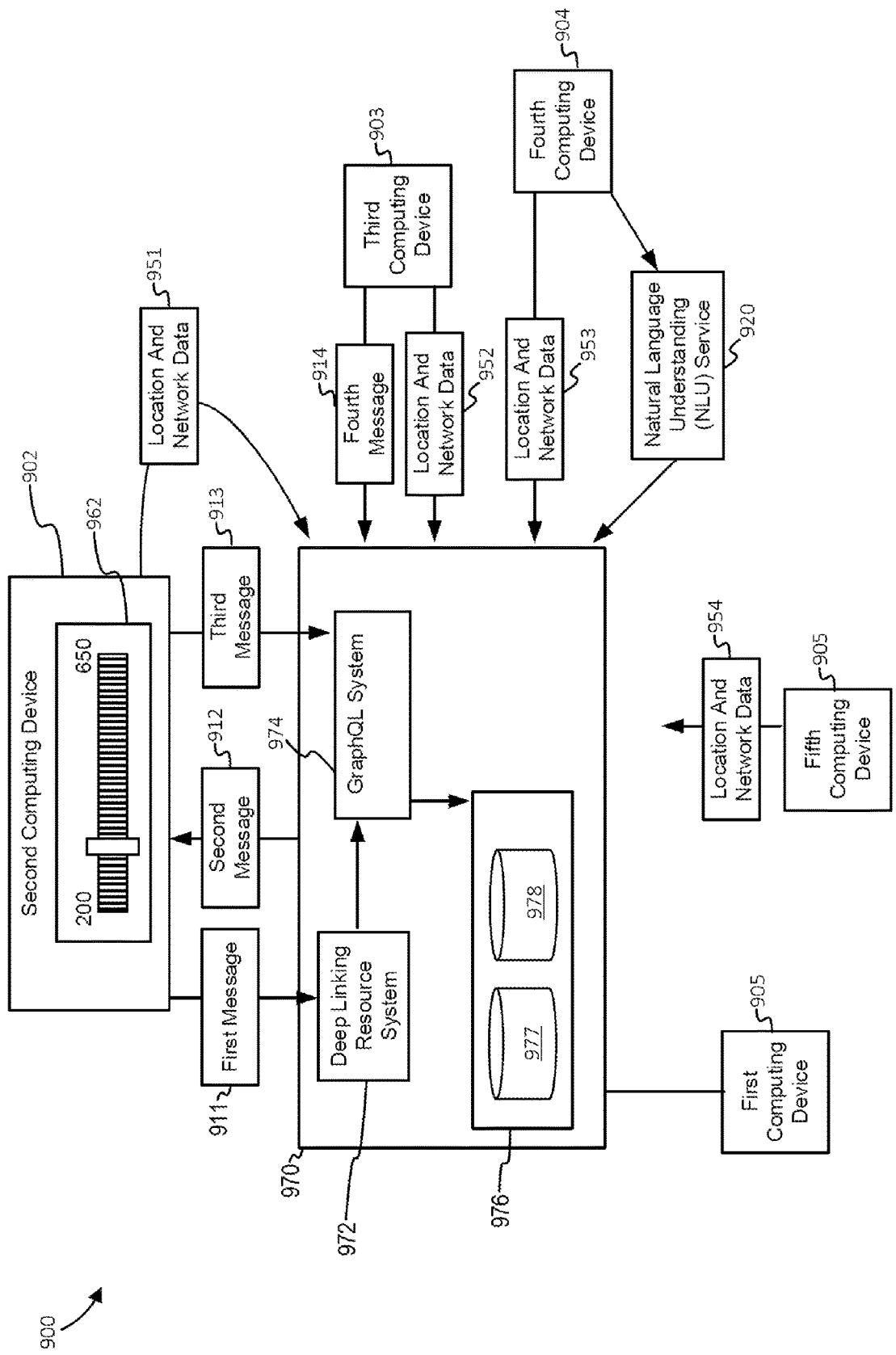
FIG. 9 is a schematic diagram of a first computing environment in which a score stored in an account may be updated, in accordance with some embodiments of the present technique.

FIG. 9 is a schematic diagram of a first computing environment in which a score stored in an account may be updated, in accordance with some embodiments of the present technique. The computing environment 900 may include a computer system 970 that receives a first web message 911 from a second computing device 902. In some embodiments, second computing device 902 may send the first web message 911 after being prompted to visit a network address resolved by a domain name system responsive to an Internet uniform resource locator or a uniform resource identifier (e.g., by scanning a QR code with a camera). The data stored in the first web message 911 may cause the computer system 970 to determine whether or not the second computing device 902 has a first application installed on the second computing device 902. Furthermore, the computer system 970 may collect location and network data 951 from the second computing device 902, location and network data 952 from the third computing device 903, and location and network data 953 from the fourth computing device 904. In some embodiments, the computer system 970 may be controlled by remote computing device 901.

The computer system 970 may provide a UI to the second computing device 902 via a second web message 912. Providing a UI may include providing all of the code and data with which the UI is constructed or merely providing data to populate a template stored client side, e.g., in a native application. In some cases, the UI may evolve over time, e.g., responsive to user inputs, while still being said to be the same UI. As described elsewhere in this disclosure, in the case that the computer system 970 detects that a first application is not installed on the second computing device 902, providing the UI to the second computing device 902 may include providing program code that relies in part on one or more libraries or frameworks on the second computing device 902 to activate. For example, the second web message 912 may cause the presentation of an iOS™ App Clip or an Android™ Instant App to display a UI element 962 on the second computing device 902. In some cases, these formats for applications may afford elevated privileges relative to web applications useful for things like engaging with hardware of a mobile device (like cameras, secure elements, location sensors, etc) without the friction of a full install of a native application.

Alternatively, in response to a determination that the first application is installed on the second computing device 902, the second web message 912 may include values that cause the native application to present the UI element 962. Alternatively, some embodiments may present a UI directly in a web browser, where updates to a UI may occur via updates to a document object model (DOM) (or shadow DOM) or to a canvas element (e.g., canvas-based rendering of a web application). In some embodiments, updating a canvas element of a web application may include using program code to render shapes or text in the canvas element without re-rendering non-canvas elements of the web application. For example, some embodiments may generate a set of server-side values with an application or service executing on a server, where the set of server-side values may then be used to update a canvas element of a web application. Some embodiments may engage a graphics processing unit of the mobile device to this end, e.g., with WebGL commands. In some cases, repeating graphical elements may be pre-rendered in an off-screen canvas to expedite their display in the on-screen canvas element. Some embodiments may implement layered canvases and dispose UI elements that move (e.g., in animated sequences) on one canvas element and static UI elements on another to expedite processing when elements of the UI move by limiting the number of UI elements that are redrawn as the display updates.

As described elsewhere in this disclosure, some embodiments may use information provided by the first web message 911 or another web message (e.g., a third web message 913) to determine one or more identifiers for deep linking operations. In some cases, selection of a deep link may cause a native application to open in a state that is specified by the deep link and is different from a default state of the native application, e.g., to a specific UI state showing account balance, or the above-described slider in a specified position. The computer system 970 may obtain identifiers, authentication values, or other values provided by the first web message to determine a UI state for a UI to provide to the second computing device 902 via the second web message 912. For example, the first web message 911 may include a plurality of key-value pairs that will be used to determine a UI state that characterizes a UI displayed on the second computing device 902, where the UI state may include a slider value that determines a configuration of the slider element displayed as UI element 962. Furthermore, in some embodiments, the second web message 912 may include values of the UI state, where the values may also include a plurality of other values that represent previous UI states corresponding with a same or different screen.

Some embodiments may receive a third web message 913 from the second computing device 902, where the third web message 913 may include a query for values of a record or a request to modify a value of the record. In some embodiments, the third web message 913 may be sent as an HTTP POST request to be received by a GraphQL system 974 of the computer system 970. In some embodiments, providing the second web message as an HTTP post request may increase the amount of data sent in the second web message 912. The GraphQL system 974 may use the query provided in the third web message 913 to retrieve or modify one or more values from the set of data stores 976. For example, a query provided via the third web message 913 may be sent to the GraphQL system 974, where the query may be used to obtain a set of record values from either or both the in-memory database 977 or the persistent memory 978.

As described elsewhere, information security or privacy concerns may cause some embodiments to use an additional application or device to authenticate a request to view or update a record value. In some embodiments, the additional application or device may be selected based on network data or device data and may be randomly or pseudo-randomly selected for request authentication. Some embodiments use the location and network data 951-954 to select a computing device from the set of computing devices 903-905 having a network connection to the computer system 970 that satisfies a network performance criterion. For example, the network performances of the third computing device 903 and fourth computing device 904 may be measured and determined to satisfy a network performance criterion that requires that the latency between computing devices and the computer system 970 be less than 10 milliseconds (ms), less 50 ms, less than 100 ms, less than 1000 ms, or less than some other duration. Some embodiments may select either the third or fourth computing devices 903-904 for authentication based on which device is indicated to be closer to the second computing device 902. For example, the third computing device 903 may be determined to be closest to the second computing device 902, and some embodiments may require that an authentication message is received by the fourth message 914 before a record value of the set of data stores 976 is updated.

As discussed elsewhere in this disclosure, some embodiments may obtain voice data. For example, some embodiments may permit a user to use a voice record collected by the fourth computing device 904. The voice recording may be sent to the natural language service 920, where the natural language service 920 may determine one or more values (e.g., text tokens in English or intermediate representations) based on the voice recording. The values determined by the natural language service 920 may include an intent value of a user, a quantitative value recognized by the natural language service 920, and a corresponding action to be performed based on the intent value and the quantitative value. The intent value, quantitative value, or action value may then be sent to the computer system 970 to obtain record value, modify a record value to the quantitative value, or perform some other operation. Alternatively, or in addition, some embodiments may determine whether a voice recording collected by the fourth computing device 904 satisfies a set of voice identification criteria associated with a record. For example, after receiving a request to update a database record of the set of data stores 976, some embodiments may wait for a voice signature value to be provided by the fourth computing device 904.

Figure 10:
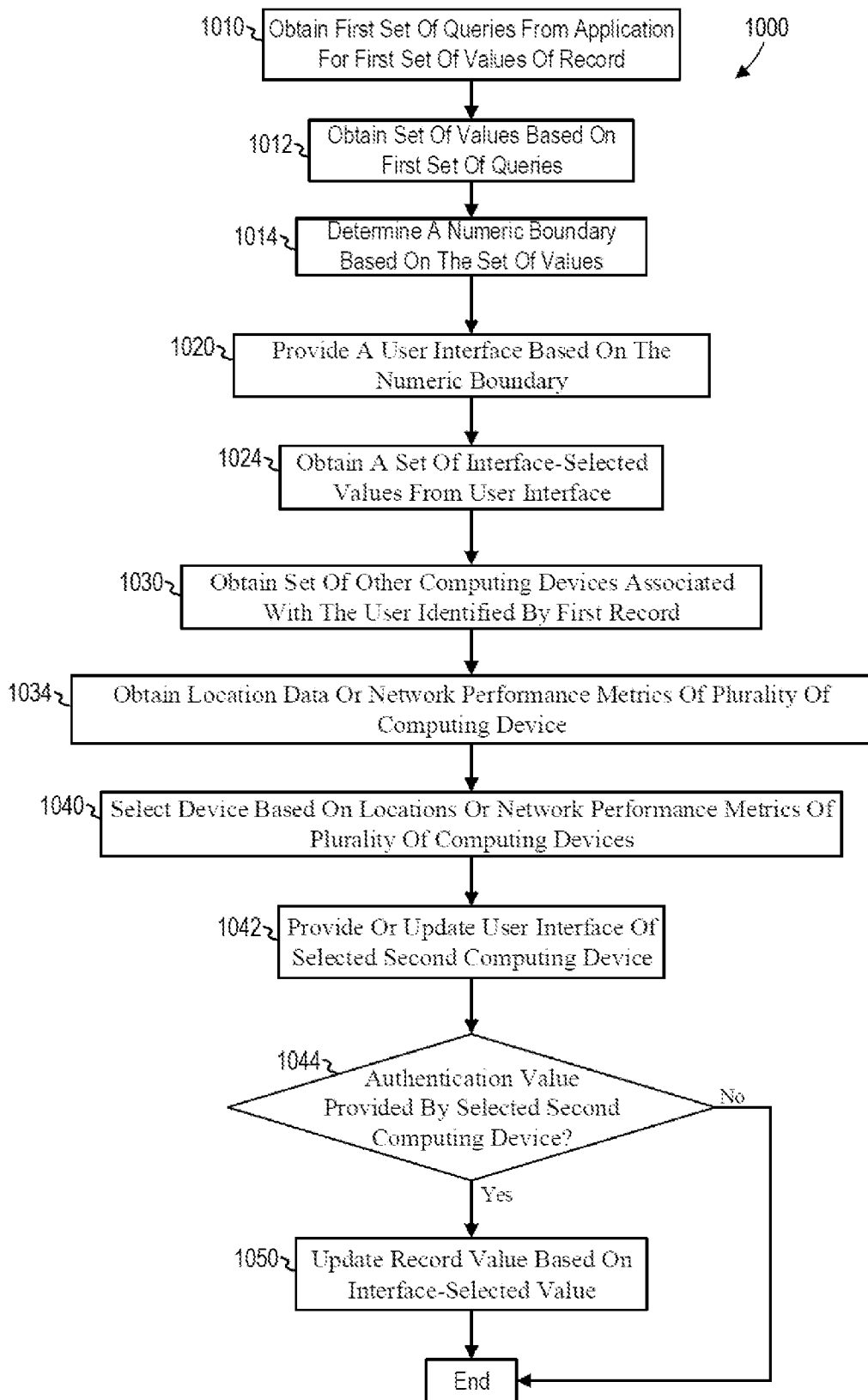
FIG. 10 is a flowchart of a process configured to provide and obtain data via a combined interface in a cloud-based environment.

FIG. 10 is a flowchart of a process configured to provide and obtain data via a combined interface in a cloud-based environment. Operations of the process 1000 may begin at block 1010. Some embodiments, operations of the process 1000 may include obtaining a first set of queries from an application for a first set of values of a record, as indicated for block 1010. The first set of queries may include a query obtained via a web message, where the values of the query were provided via a UI. Alternatively, or in addition, the first set of queries may include one or more machine-generated queries, where the machine-generated query may determine an identifier (e.g., a user identifier, a group identifier, a record identifier) based on a voice identifier value.

In some embodiments, the application used to provide the set queries may be executing as a native application on a mobile computing device. Alternatively, or in addition, the application may include a web application executing on a native web browser via instructions to update a DOM, shadow DOM, or canvas element (which is often part of the DOM) of a webpage. Alternatively or additionally, the application may include other values. Alternatively or additionally, the application may be executing on an audio device such as an Internet-connected speaker and microphone device executing the Amazon Alexa™ platform, Google Home™ platform, Apple Siri™ platform, Microsoft Cortana™ platform, or the like.

In some embodiments, a query to retrieve a set of values of a record may be triggered by an update to a related record that is associated with the record. For example, some embodiments may detect an attempt by a user to make a purchase that exceeds a credit limit. Some embodiments may then prevent one or more transactions that would exceed the credit limit and cause a computing device, such as a smartphone, augmented system, or virtual reality headset to display a notification that includes a uniform resource locator. In some embodiments, a user's interaction with the uniform resource locator may cause a computing device to send a web request to a server, where requests to the server specified by the URL (and query strings thereof) may cause different interactions between the server and the computing device based on the web request or other data provided by the computing device. As described elsewhere in this disclosure, some embodiments may provide program code to execute a web application displaying a UI based on a determination that a specified native application is not installed on the computing device or open a native application based on a determination that the specified native application is installed.

In some embodiments, the first set of queries may be first obtained as a single query from an application. Alternatively, or in addition, the first set of queries may include multiple queries. Some embodiments may obtain the first set of queries via a HTTP GET web request. Alternatively, or in addition, some embodiments may obtain the first set of queries as a POST HTTP web request. Some embodiments may use a graph-based query language such as GraphQL to obtain data from a set of data stores to retrieve values of a record. In some embodiments, performing a search based on graph-based query may generate duplicative queries for the same data. For example, some embodiments may obtain a first query to obtain a set of records that include user identifiers satisfying a first set of user criteria and a set of credit amount values satisfying a credit amount criterion. Some embodiments may then generate a plurality of queries based on the first set of records.

Some embodiments may perform operations that reduce the number of duplicative requests on data by using a set of locking and caching operations. Some embodiments may include an application or programmed service that receives a plurality of requests for a set of values stored in a record. Some embodiments may then store a portion of the requests (e.g., request promises) on a database and prevent a majority of the plurality of requests from causing multiple database transactions with the database. For example, after receiving a first request of the plurality of requests, some embodiments may lock a record or a set of values of the record for a duration. Before or during the duration, some embodiments may permit a single request of the duplicative queries to search through the database to retrieve or modify the set of values, where return values of the query are stored on local cache memory, an in-memory database, or another high-speed data store. After determining that a duration threshold has been satisfied, some embodiments may send a request to the database storing the record based on the obtained plurality of requests.

For example, some embodiments may use a GraphQL-generated query to retrieve a set of record values of a database. As described elsewhere in this disclosure, some embodiments may obtain a plurality of queries having a shared set of parameters, where each query may retrieve a set of quantities or identifiers stored in an account record. The plurality of queries may be generated during a query resolution operation of an initial query, and may retrieve values such as the number of times a record is accessed, a maximum credit value, a set of device identifiers, or the like. Some embodiments may fulfill the plurality of promises of the plurality of queries storing the plurality of promises in an in-memory data store (e.g., Redis database) and use a single query of the plurality of queries to retrieve values from the database to retrieve the quantity from the record. For example, some embodiments may store an indicator for each promise of a set of three promises corresponding with a set of three queries, where each query of the set of queries indicates a request for the same set of values. The set of promises may be stored in an in-memory data store, such as a Redis™ database. After receiving the first promise in association with a record value, some embodiments may lock the record of the record value and permit access to a single application thread to query the record. Some embodiments may lock the record for a pre-set duration, where the pre-set duration may be a duration such as a value that is more than one second, more than five seconds, more than 10 seconds, more than one minute, more than one hour, or the like. For example, the duration may be 100 seconds. At the conclusion of the duration, the retrieved value of the query may be used to fulfill each promise of the set of three promises. In some cases, the database may be implemented with index-free adjacency, which is expected to be more performant than index-based databases that rely on precomputed indexes to respond to queries and often slow considerably when a query implicates a relationship for which an index is not precomputed, which is not to suggest that such databases or any other subject matter is disclaimed. In some cases, operations may be expedited by having graph pointers, or directed edges, that identify adjacent nodes by RAM address (e.g., physical RAM address, or address in a virtual address space).

Some embodiments may use a cloud-based natural language speech platform to generate and provide a query or, as described elsewhere in this disclosure, perform other operations, such as modifying one or more values of a record. Some embodiments may provide a JSON-encoded response to a natural language speech platform, where the natural language speech platform may be associated with an interaction model. The interaction model may include an invocation action, a set of intents, or a set of utterances. The interaction model may use one or more model schemas to associate invocation actions, intents, and utterances. For example, the interaction model may associate an invocation action having the invocation name "determine credit limit" with a set of intents, such as an intent to handle increasing a credit limit, an intent to handle a user's declining to change a credit limit, an intent of the user to get a credit limit report, or an intent to perform another operation. One or more of the intents may have an associated utterance, where the utterance may be stored in the form of text. Some embodiments may use a set of audio processing operations to convert audio data into text data. After receiving audio data from a user, some embodiments may use the cloud-based natural language speech platform to map the audio data to an utterance, map the utterance to an intent, and generate a query based on utterances, intents, and values associated with a user record.

In some embodiments, operations of the process 1000 may include obtaining a set of values based on the first set of queries, as indicated for block 1012. As discussed elsewhere in this disclosure, some embodiments may obtain a set of values of one record or of a plurality of records. For example, the set of values may include a user identifier, user address, maximum credit value, and utilized credit value, where each value of the set of values is obtained from a record indicated to represent a maximum credit record. Some embodiments may search a local cache or local persistent storage for values before retrieving values from a cloud-based cache memory (e.g., a Redis database operating via a cloud-based service) or persistent storage.

In some embodiments, operations of the process 1000 may include determining a numeric boundary based on the set of values, as indicated for block 1014. For example, some embodiments may determine a numeric boundary using one or more of the operations described elsewhere in this disclosure. For example, some embodiments may obtain a set of values, including a current credit limit, a maximum credit limit, or the like, and then provide the set of values to a range determination function. The range determination function may determine a boundary based on the set of values. For example, some embodiments may include a set of rules indicating that a user is permitted to change a credit value from a lower range value to a higher range value, where the lower range value may be equal to zero or may be equal to another default minimum amount alternatively, or in addition, some embodiments may set a minimum amount to the current maximum credit score. Some embodiments may then determine a maximum credit amount scratch that some embodiments may then determine a new maximum credit amount based on an amount paid into a record, as indicated elsewhere in this disclosure.

In some embodiments, operations of the process 1000 may include providing a UI based on the numeric boundary, as indicated for block 1020. Providing the UI may include determining a UI state on a server or providing the UI state to a client computing device, where the UI state indicates that a UI element indicates the numeric boundary. As described elsewhere in this disclosure, some embodiments may require a set of authentication criteria to be satisfied before providing the UI. For example, some embodiments may require that operations similar to or the same as one or more operations described for blocks 1030, 1034, 1040, or 1044 be performed to authenticate a request to view data provided in the UI. Alternatively, some embodiments may provide the UI without requiring that a set of authentication criteria be satisfied but require a set of authentication criteria be satisfied to modify a record value based on an interface-selected value of the UI.

Some embodiments may compile program code into a bytecode form and send the bytecode to a web browser or another application executing on a client computing device. As described elsewhere in this disclosure, some embodiments may obtain a set of web messages as a web request or as a sequence of values in a data stream indicating one or more changes to a UI displayed on the client computing device. Some embodiments may update a UI state on a server based on the set of web messages. Some embodiments may generate a bytecode representation of a UI, where the bytecode may be written in the WebAssembly ("Wasm") format or another binary code (e.g., at the application layer) format. Some embodiments may then send the bytecode representation to a client computing device, where the client computing device may use the bytecode representation to present a UI having one or more UI elements that display or is otherwise configured based on a numeric boundary. As described elsewhere in this disclosure, some embodiments may have access to a plurality of Wasm files corresponding with different types of computing devices or different statuses of an incoming message. Some embodiments may first detect the status of a computing device or operating system of the computing device and then select one or more bytecode versions based on the device features.

In some cases, UI code may be implemented in WebAssembly sent from the server (which includes responses from associated content delivery networks) to the client in response to a webmessage. In some cases, WebAssembly code may be received by mobile devices in the form of binaries that are faster to process and download (e.g., in virtue of being smaller) than JavaScript in need of local interpretation into bytecode before that bytecode can be executed by a browser's virtual machine. In some cases, such code may manually manage garbage collection, which may make performance more predictable that systems relying on native garbage collection to release reserved memory. In some cases, such code may be statically typed, which may reduce processing time relative to JavaScript code that may involve steps where the browser infers what type is used. And in some cases, such code may be optimized for execution before being received by the mobile device, rather than during interpretation of received JavaScript or compilation of corresponding bytecode. None of which is to suggest that techniques involving JavaScript, or any other techniques, are disclaimed.

In some embodiments, a determination that a specified native application is not installed on a computing device may cause a server to provide a lesser-memory application to the computing device based on results of a query. A lesser-memory application may include an application requiring less than 50 megabytes (MB) of computing device storage space, less than 10 MB of storage space, less than 5 MB of storage space, or the like. In some embodiments, the lesser-memory application may use or otherwise include an application module of a greater-memory application. For example, the lesser-memory application may be stored as an Android Instant App™ or an iOS App Clip™, where the lesser-memory application may use one or more APIs used by a greater-memory application sharing an identifier with the lesser-memory application. For example, some embodiments may determine that an Android computing device is attempting to access a uniform resource locator that links to a plurality of application modules, where some of the application modules correspond with lesser-memory application and other application modules are modules of a greater-memory application module. As used in this disclosure, a uniform resource locator may be stated to link to an application module if program code triggered by an attempt to access the uniform resource locator (a term which is used broadly herein so as to be generic to a uniform resource locator and a uniform resource identifier) may cause the download or execution of the application module. Some embodiments may determine that the computing device does not have a specified native application installed on the Android device. Some embodiments may then download a lesser-memory application that uses one or more application modules used by the specified native application and display a UI of the lesser-memory application on the mobile computing device.

Alternatively, or in addition, providing a UI may include providing a voice user interface (VUI). Some embodiments may be able to interact with voice assistant devices or other audio devices capable of projecting and receiving audio. For example, some embodiments may provide a set of instructions to an Amazon Alexa™ device that causes the device to emit a natural language question, such as "Your credit limit is currently at 8999 and you may raise to 9001, would you like would you like to raise your credit limit?" As discussed elsewhere in this disclosure, some embodiments may then determine an intent value based on the user response, where the intent value may represent an intent such as an intent to check a limit, increase a limit, decrease a limit, or the like. Some embodiments may use one or more cloud-based services to interpret a user intent value based on an audio message. For example, some embodiments may determine that a user has an intent to modify a record value. In some embodiments, an audio recording or audio stream may then be sent to a third-party server capable of performing one or more natural language processing operations. Alternatively, or in addition, some embodiments may perform one or more natural language operations using a server executing one or more machine learning operations to determine an intent value or quantitative value from an audio file.

In some embodiments, performing the operations may include sending one or more messages to an endpoint of a cloud-based service, where the endpoint may include another cloud-based service or an API of a database. For example, after determining that a user has an intent to increase a credit limit to 5000, some embodiments may send a web request to an API of a database that includes the value 5000 and a record identifier, where the web request may cause a record identified by the record identifier to be set to the value 5000.

In some embodiments, providing the UI may include performing one or more operations to generate a plurality of UI states, where the plurality of UI states may represent a simulated history of previous UI states. The plurality of UI states may include a set of previous UI states, where each respective UI state of the set of previous UI states may include one or more values indicating a previous configuration of a UI. A UI configuration may be rendered as a UI screen having UI elements positioned in different positions. Alternatively, or in addition, a configuration of a UI may represent a completely different screen of the UI. For example, a first UI state may represent a UI configuration having a black background and three white slidable elements, and a second UI state may represent a UI configuration having a blue background and no slidable elements.

Some embodiments may be prompted to generate the plurality of UI states after receiving a web request comprising a plurality of key-value pairs. For example, a user device may display a web link on a mobile device screen, where the web link may include link data that is used to indicate the user identifier and other values. The link data may include a set of key-value pairs, where the set of key-value pairs may include a user identifier, selections based on interactions with a UI element, other collected data such as voice data or gaze tracking data, or the like. Some embodiments may then parse the web message to obtain the set of key-value pairs and retrieve one or more values.

In some embodiments, operations of the process 1000 may include obtaining a set of interface-select values from the user interface, as indicated for block 1024. As described elsewhere in this disclosure, operations to obtain a set of interface-selected values may include obtaining the set of interface select values based on interactions with one or more interactive UI elements. For example, some embodiments may obtain a set of UI elements based on an interaction with a slider, where a slidable element may be moved along a horizontal axis. Alternatively, or in addition, some embodiments may update a set of UI elements to indicate a slider position along a vertical axis.

In some embodiments, the set of interface-selected values may include values uttered by a user or determined using machine learning operations based on a recording of a user's voice. For example, the set of interface-selected values may include numeric values, names, categories, actions, or other values that are directly uttered by a user. For example, the set of interface-selected values may include "credit limit" based on a voice recording of a set of user utterances that form the natural language statement, "I would like to change my credit limit." The set of interface-selected values may also include intent values or actions mapped to the intent values. For example, some embodiments may determine that an intent value of a response based on a question "I would like to change my credit limit."

Some embodiments may perform natural language processing operations on a voice recording, such as automatic speech recognition and intent value determination, where natural language operations may be performed using one or more neural networks. For example, some embodiments may use a recurrent neural network, such as a long-short-term-memory (LSTM) neural network, or another type of neural network, such as a transformer neural network, to determine an intent value based on a voice recording. Some embodiments may execute a text-to-speech engine that converts text to audio or vice versa. In some cases, natural language utterances by the user may be sensed with a microphone of their mobile device and locally or remotely, server side, transformed into text with Wav2vec, e.g., with two multilayer convolutional neural networks in a pipeline, with an upstream CNN converting audio into vectors in a first latent encoding space corresponding to specified spans of audio time (e.g., 30 ms), and with a downstream CNN converting sequences of such vectors corresponding to longer time spans (e.g., 1 second) into vectors in a second latent encoding space. These vectors may then be fed into a model trained to make self-supervised predictions, e.g., of natural language text. Some embodiments may implement multi-headed attention-based encoder-decoder architectures in the speech to text engine. In some cases, a voice UI may be triggered by detection of a wake word performed by the client device. Some embodiments may provide the voice recording (a term which is used broadly to encompass both a file and a stream) to a third-party natural language service, such as Amazon Alexa Voice Services™ or Google Cloud Natural Language™ service, to retrieve intent values or other values that may cause the retrieval or modification of a record value. Some embodiments provide the voice recording to a natural language processing service that determines an intent and sends operation instructions to a server. After receiving the operation instructions outputted by the natural language service, some embodiments may then retrieve or update a record value identified by the instructions.

In some embodiments, operations of the process 1000 may include obtaining a set of computing devices associated with the user identified by the first record, as indicated for block 1030. As described elsewhere in this disclosure, some embodiments may increase the security of record updating operations by sending an authentication message to a user via a second device, where the second device may be selected from a plurality of devices. In some embodiments, the plurality of devices may be stored in a record associated with a user that identifies the first device. For example, some embodiments may access a record based on a first device, where a data session between the first device and a server may be used to determine an account identifier. Some embodiments may then access a record based on the account identifier, where the record includes a list of devices registered with the user and their corresponding network addresses.

As described elsewhere in this disclosure, some embodiments may obtain the set of computing devices using a set of queries, where the set of queries may include a single query that is converted into a plurality of queries using a GraphQL library. Some embodiments may perform operations to store a plurality of promises of the plurality of queries for the set of computing devices. Some embodiments may then send one query based on the plurality of queries to a data store that includes identifiers of the set of computing devices and provide the set of computing devices to the data store.

In some embodiments, operations of the process 1000 may include obtaining a set of locations or set of network performance metrics of the set of computing devices, as indicated for block 1034. In some embodiments, operations to obtain location data or network data of a set of devices may include obtaining a message over a representational state transfer (REST) API that includes the location or network data from a set of devices. For example, an application executing on a computing device may cause the computing device to provide a server with a device location using geolocation API. Alternatively, or in addition, some embodiments may measure network performance metrics for a computing device based on timestamps of outgoing and incoming devices with respect to the computing device.

Some embodiments may obtain location data of a device via a global positioning system (GPS) sensor of the device. For example, a computing device may include a smartphone provided with a UI using operations described elsewhere in this disclosure, where some embodiments may receive a location of the computing device provided by the GPS sensor of the smartphone. Alternatively, or in addition, some embodiments may indicate a device location based on an indicated Wi-Fi connection, sensed SSID, Bluetooth beacon, cell tower transmission, or a manual entry of an address. In some cases, location or dwells may be obtained from a corelocation framework on iOS™ devices or the CLLocationManager class in Android™ devices.

Some embodiments may determine a device location based on a default location or a general location. For example, some embodiments may determine that a smartwatch is at a shared location with a mobile computing device based on a determination that the smartwatch has sent signals to the mobile computing device via a Bluetooth signal or another short-range wireless communication signal. Some embodiments may determine that a distance between two devices is equal to a default value based on a determination that one or both of the devices have locations assigned to a default location or has a location that is determined based on another device. For example, some embodiments may set the distance between an audio device and a mobile computing device equal to zero based on a determination that the mobile computing device is receiving a Bluetooth signal from the audio device.

In some embodiments, operations of the process 1000 may include selecting a second device based on the set of locations or set of network performance metrics of the set of computing devices, as indicated for block 1040. Some embodiments may filter a plurality of computing devices based on their corresponding network performance metrics to determine a subset of computing devices that satisfies one or more network performance criteria. In some embodiments, satisfying a network performance criterion may include satisfying a criterion that a device is capable of establishing a communication session. For example, some embodiments may perform a transport layer security (TLS) handshake between a server and a device to determine whether the device is capable of establishing a communication session. During a TLS handshake session with a computing device, some embodiments may exchange a set of client random values and server random values, authenticate an SSL certificate, generate session keys, or perform other operations that permit data exchange with the computing device.

In some embodiments, satisfying a network performance criterion may include satisfying a criterion that a device satisfy a latency threshold, bandwidth threshold, or the like. For example, some embodiments may determine that a device satisfies a network performance criterion based on a determination that latency of a connection between a device and a server is less than or equal to a pre-set latency threshold, such as 60 ms or that the bandwidth of a connection of a device is greater than or equal to 5 megabits per second (Mbps). Various network performance criteria may be applied to a set of computing devices to determine a subset of the computing devices. For example, some embodiments may obtain a record indicating that a user of a first device has a total of five registered devices. Some embodiments may then perform operations to determine which devices of the five devices are associated with network performance metrics that satisfy a set of network performance criteria and determine that three of the five devices satisfy the set of network performance criteria. Some embodiments may then select a device of the three devices based on their locations for use as a second device for authentication operations, as described elsewhere in this disclosure.

Some embodiments may select a second device for authentication operations based on a set of distances, where each distance may be the distance between a first location associated with a first device and a set of locations of a set of other computing devices. As described elsewhere in this disclosure, a distance between a first computing device and other devices may be determined based on GPS coordinates collected from the devices. For example, some embodiments may determine a distance between a first and second computing device based on a root of the sum of squared differences of the latitude and longitude of the respective GPS coordinates of each of the devices.

As described elsewhere in this disclosure, some embodiments may assign a location to a second device that is approximated based on a user entry or a default location assigned to a second device. For example, some embodiments may assign a location to an audio device that is the same location as a mobile computing device in response to a determination that the audio device is within the Bluetooth range of the mobile computing device. Some embodiments may determine that the distance between the audio device and the mobile computing device is equal to zero or another pre-set default value such as one meter, two meters, or some other numeric value.

Some embodiments may use a set of distances to select the closest device to a first computing device, where the closest device may be used as a second device for performing authentication operations. By selecting a device that is closest, some embodiments may prevent attempts to circumvent multifactorial authentication through text message spoofing or other attempts to simulate the existence of a second device for device authentication. Some embodiments may use an additional set of criteria to filter out one or more non-compatible devices or one or more devices that may not necessarily be the closest device. For example, some embodiments may select a device based on a determination that both devices provide GPS data, where the distance between the two devices is determined based on the respective locations of the pair of devices. Some embodiments may remove or otherwise ignore devices that have an approximated distance or may de-prioritize these other devices such that they are only considered in cases where no other devices able to provide its own GPS location is within a range of a first device.

Some embodiments may identify a plurality of computing devices, where only a subset of the plurality of computing devices is associated with an authentication category. An authentication category may indicate one or more methods used to authenticate instructions to modify a record value. For example, some embodiments may associate a mobile computing device with a first authentication category indicating a text message authentication, a second authentication category indicating vocal authentication, a third authentication category indicating third-party authentication, or the like. Some embodiments may associate a voice device with second authentication category and not the first or third authentication category. Some embodiments may then determine which of the set of devices to select based on a determination that a user authentication category is satisfied, where a user authentication category may represent a user's preferred manner of authentication. For example, some embodiments may select a second computing device based on a determination that the second computing device is associated with the authentication method "voice authentication" indicating that the user's preferred authentication method is a third-party authentication program.

In some embodiments, operations of the process 1000 may include updating a user interface of the selected second computing device, as indicated for block 1042. In some embodiments, a selected second computing device may include a screen or other visual projection system to display a UI that is updated based on an update to a record or an attempted update to a record. Updating a UI may include providing a new UI or adjusting the values of a UI that is already being displayed. Some embodiments may determine a set of updated UI states that include or is otherwise based on an interface-selected value and an initial value that populated the field of the first record before the field is updated by the interface-selected value. Some embodiments may then send an updated UI to the second computing device used for authentication operations.

In some embodiments, the UI provided to the second computing device used for authentication may include an animation indicating a proposed update to a record. For example, after receiving a network address of a second computing device and an interface-selected value representing an increase to a credit limit, some embodiments may send an updated UI state to the second computing device that shows an animation of a slider that moves from a configuration representing a current credit limit to a second configuration representing the interface-selected value. In some embodiments, the animation may include a plurality of values representing intermediate configurations of the slider or another UI element, where the plurality of values may be determined using an indicated refresh rate of a canvas element. For example, in some embodiments, providing a UI element to the second computing device may include determining a sequence of intermediate values of a UI, where each value of the sequence of intermediate values is associated with a frame of an animation of the UI element. Once the UI element is displayed on the second device, the UI element may be animated to progress from an initial configuration state to each of the intermediate configurations corresponding with the sequence of values until the UI element indicates the interface-selected value provided by the first computing device. In some embodiments, the sequence of intermediate values may be determined as a function of the interface-selected value. For example, if an interface-selected value is 129 and indicates an increase from an initial value equal to 79 units to the interface-selected value for a credit limit, some embodiments may determine a set of intermediate values between 79 to 129. Furthermore, in some embodiments, the UI element may be sent as an animated effect, where the animated effect may be sent to an internet messaging interface, such as Apple iMessage™, Android Rich Communication Services™ messaging, or the like.

In some embodiments, operations of the process 1000 may include determining whether an authentication value was provided by the selected second computing device, as indicated for block 1044. The authentication value may be a numeric value, a categorical value, a question, or the like. In some embodiments, the authentication value may be sent as a text message to a phone via short messaging service (SMS) messaging network or multimedia messaging service (MMS) messaging network, where text sent via a SMS or MMS network may be sent via cell phone signals. Alternatively, or in addition, the authentication value may be sent as a biometric measurement, such as a fingerprint or quantization of a fingerprint. Alternatively, or in addition, the authentication value may be determined from an audio recording provided by an audio device, where the audio recording may be processed to determine words or other values usable as an authentication value.

In some embodiments, operations to authenticate an authentication value may include randomly selecting a device within range and requesting that a user use the selected device. For example, some embodiments may select a smartwatch to perform an authentication during a first session. Some embodiments may then perform one or more operations described in this disclosure to modify a record value again during a second data session, where an authentication message is sent to an Amazon Alexa™ device, and a criterion that the authentication value is provided by the Amazon Alexa™ device is satisfied. Some embodiments may require that an authentication value include a value (e.g., a quantitative value) that was used to update a record, such as an interface-selected value. If a determination is made that the authentication value is provided by the selected second computing device, operations of the process 1000 may proceed to block 1050. Otherwise, operations of the process 1000 may end or return to a previously-described set of operations (e.g., operations described for block 1010).

In some embodiments, operations of the process 1000 may include updating the record value, as indicated for block 1050. Operations to update the record may include operations similar to or the same as those described for block 340. For example, some embodiments may update a record by using a set of SQL requests to update a record value or a set of GraphQL mutations to update a set of records.

After a record is updated, some embodiments may notify a user that the record has been updated. For example, some embodiments may provide a notification to the second computing device indicating that the record has been updated, where the notification may display or otherwise include the interface-selected value used to update the record. In some embodiments, a notification may include causing a symbol to be displayed on a screen of a mobile computing device. For example, some embodiments may display an animation indicating a credit score increase. Some embodiments may provide notifications via SMS text messaging, email, a notification API of an operating system, or the like. Some embodiments may use a messaging service to provide a confirmation that a record has been updated. For example, some embodiments may use Firebase Cloud Messaging™ to concurrently generate a notification of a record update across multiple platforms to notify a user identified by a record that the record has been updated.

Asynchronous Database Caching

The use of graph database query interface languages, such as graphQL, has expanded the viability of performing complex searches to support the analysis of complex relationships in various endeavors, such as natural language processing, control systems, and data science. However, the naïve use of a graph database query language may result in the generation of a plurality of queries for the same set of values of a query, where the queries themselves may span multiple, heterogeneous database systems. Resolving these queries may result in duplicative searches or modifications, which may increase latency in attempts to retrieve values from a database. This is particularly true in client-server architectures, where web applications, web-page scripting, or native applications may send requests that each cause multiple queries to be serviced server-side to update or create a new instance of a user-interface on a client computing device or persist new data server-side. For example, in some cases, a single front-end request may cause five or more queries to be serviced by a backend data store in a microservices architecture, where different services submit similar or fully duplicative queries to the data store. That said, none of the preceding should be take as a disclaimer of subject matter.

Some embodiments may perform operations that reduce the number of backend duplicative queries by using a set of asynchronous caching and locking operations performed between the server receiving requests and the data store servicing those requests, thereby shielding the data store from duplicative operations. Some embodiments may include an application or service that receives a plurality of queries for a set of values stored in a record. Some embodiments may then store a portion of the request (e.g., request promises) on a local database and prevent the plurality of requests from causing multiple database transactions with a database storing the record. After receiving a first request of the plurality of requests, some embodiments may lock (e.g., with a mutex lock, semaphore, spinlock, or other synchronizing objects to synchronize access to data shared by more than one process or thread operating concurrently) a record or a set of values of the record. After determining that a duration threshold has been satisfied, some embodiments may send a request to the database storing the record based on the obtained plurality of requests.

Various types of data may be obtained using the set of caching and locking operations described in this disclosure. For example, some embodiments may use a graphQL query to retrieve a set of record values that include quantities stored in user records, device identifiers, or categorical information. Some embodiments may obtain a plurality of queries for a quantity stored in an account record, such as a bank account balance, a maximum credit value, age, or any other quantity, where the plurality of queries may share query parameters. Some embodiments may store a respective identifier, indicator, or other value for each respective query of the plurality of queries in an in-memory data store, such as a local cache memory or a distributed memory and send a single query to the database to retrieve the quantity from the record.

Some embodiments may be implemented as a middleware layer, where the middleware layer may receive a first query and perform operations such as batching, caching, or other operations related to processing a query before the query is provided to an endpoint of a server. For example, after receiving a first query, a middleware layer may be used to detect whether the plurality of queries generate duplicative queries, which databases will be accessed by a query, validate a query, cache a query, cache a query result, or the like. Some embodiments may then act as an integration layer connecting a client computing device to one or more database systems, such as a database system accessible via a third-party API, a microservice, or a legacy data system, such as a legacy data system such as a TOPs database, a mainframe-specific database, or the like. Alternatively, or additionally, some embodiments may be hosted as an application or service executing on a server that includes or is in direct connection with a database, where communication between the application and a database may be sent via one of various types of transport, such as a transmission control protocol (TCP), a protocol that includes frame headers such as Web Sockets, or the like. The database may include a SQL database such as Amazon Aurora™, Google Cloud SQL™, or Microsoft Azure SQL™. Alternatively, or additionally, the database may include a NoSQL database, such as MongoDB™ or Cassandra™.

In some embodiments, the first query may be sent in association with an identifier of a data session. A data session may represent a specified interval of uninterrupted activity between an application executing on a first computer device and a second computer device may occur. In some embodiments, a data session may be based on one or more actions performed by a user. For example, a user may initiate a data session by logging into an account of an application on a client-side computing device and may terminate the data session by locking out of the account. Alternatively, or additionally, some embodiments may automatically a data session based on metadata that is being provided by a client-side application. For example, some embodiments may obtain user data stored in a memory accessible to an application and automatically establish a data session.

As described elsewhere in this disclosure, some embodiments may use sessions to determine whether or not to treat multiple queries as being part of a same data session, where the multiple queries may be reduced into one query. For example, a set of queries indicating instructions to query a same set of values of a set of records may be reduced to one queries based on a determination that the set of queries are all associated with a shared data session. Alternatively, or additionally, some embodiments may perform operations to generate the query based on a plurality of queries that do not obtain a data session identifier. Furthermore, as used in this disclosure, a query may include instructions to retrieve data, instructions to modify data, instructions to subscribe to a set of records, or the like. For example, a query may include a graphQL query to retrieve data or a graphQL mutation to modify data. As described elsewhere in this disclosure, some embodiments may store multiple queries to modify data such that the multiple queries may be reduced to one query to modify data stored in a record.

In some embodiments, the database operations required from duplicative queries or near-duplicative queries may be mitigated using the operations described in this disclosure. For example, some embodiments may store a first set of queries in an in-memory data store at a first time point. Some embodiments may then receive a second set of queries at a second time point, where the first and second set of queries are identical. For example, some embodiments may receive a first graphQL query, generate a first plurality of SQL queries based on the first graphQL query, and store the first plurality of SQL queries in an in-memory data store in association with a retrieved query result. Some embodiments receive a second graphQL query, generate a second plurality of SQL queries based on the second graphQL query, and determine whether the second plurality of SQL queries match the first plurality of queries with respect to their corresponding query parameters (e.g., criteria to select data in a data store). In response to a determination that the second plurality of SQL queries matches the first plurality of queries with respect to their corresponding query parameters, some embodiments may then provide the query results as results for the second set of queries. In some embodiments, the first and second graphQL queries may be associated with a same data session. Alternatively, in some embodiments, the first and second graphQL queries may be associated with different data sessions.

As used in this disclosure, a data store may include a database, a set of files, documents, or the like. Furthermore, as used in this disclosure, an in-memory data store may include a data store that stores data on the RAM of a computer system. As described elsewhere in this disclosure, caching a query that causes the generation of a plurality of other database queries or caching data based on the query in an in-memory data store may decrease the response time needed to provide a query response for the query. Such data may include an abstract syntax tree (AST) based on the query, a second AST generated from the first AST, or a second query generated based on the second AST.

FIG. 1 is a schematic diagram of a first computing environment in which a score stored in an account may be updated, in accordance with some embodiments of the present technique.

FIG. 2 is a logical and physical architecture block diagram illustrating a computing environment in which various learning infrastructure may be implemented with the present techniques in accordance with some embodiments.

FIG. 3 is a flowchart illustrating a process to provide and obtain data via a UI, in accordance with some embodiments of the present techniques.

FIG. 4 is a flowchart illustrating a process to encrypt and decrypt data across accounts, in accordance with some embodiments of the present techniques.

FIG. 5 shows an example of a computing device by which the present techniques may be implemented.

FIG. 6 is a flowchart of a process configured to update encrypted data, in accordance with some embodiments of the present techniques.

FIG. 7 is a flowchart of a process configured to determine an output based on a decryption key, in accordance with some embodiments of the present techniques.

FIG. 8 is a flowchart of a process configured to update a variable based on a combined value, in accordance with some embodiments of the present techniques.

FIG. 9 is a schematic diagram of a first computing environment in which a score stored in an account may be updated, in accordance with some embodiments of the present technique.

FIG. 10 is a flowchart of a process configured to provide and obtain data via a combined interface in a cloud-based environment.

Figure 11:
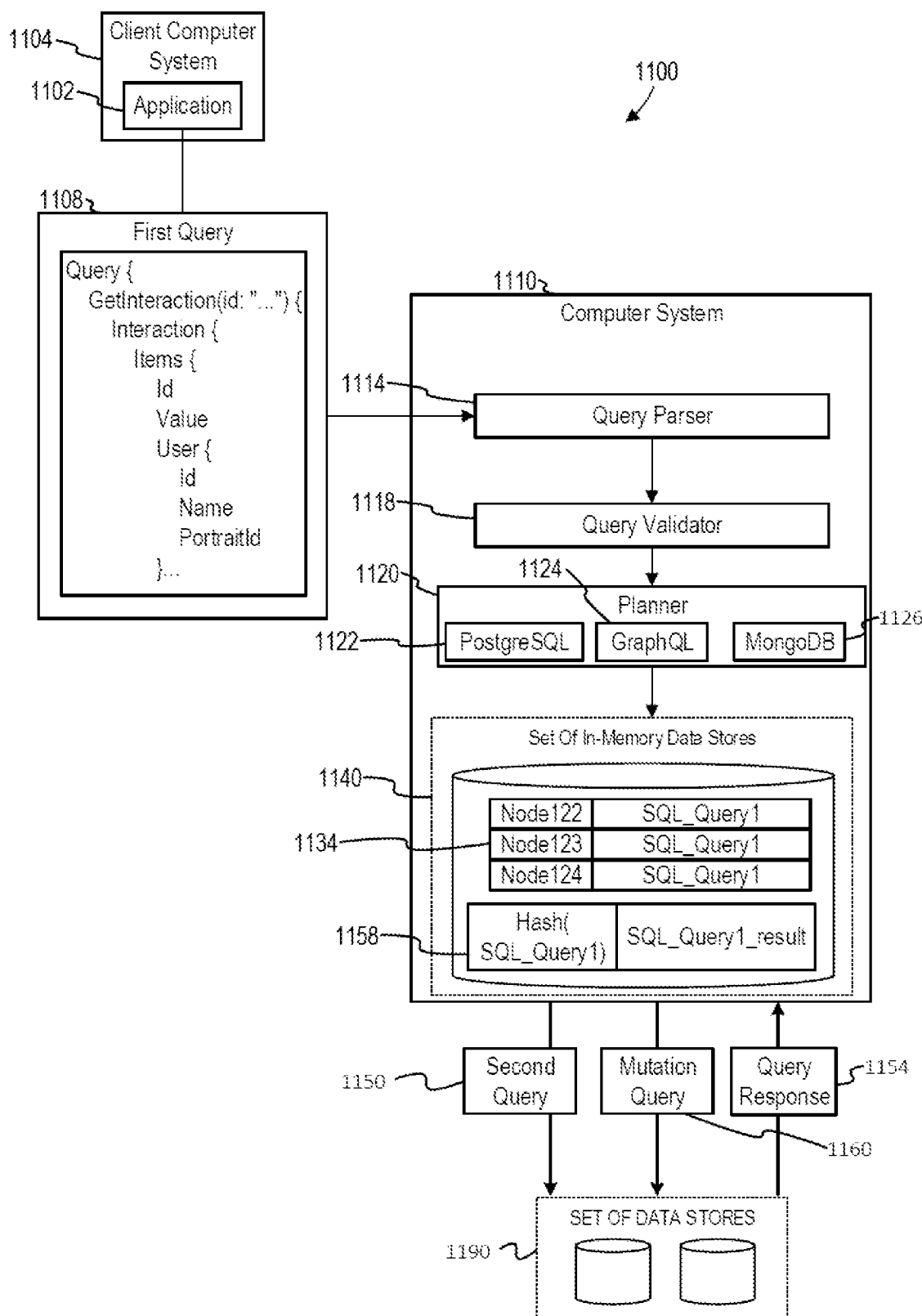
FIG. 11 is a logic and physical architecture block diagram illustrating a computing environment in which the asynchronous query caching may be implemented with the present techniques, in accordance with some embodiments.

FIG. 11 is a logic and physical architecture block diagram illustrating a computing environment in which the asynchronous query caching may be implemented with the present techniques, in accordance with some embodiments.

Figure 12:
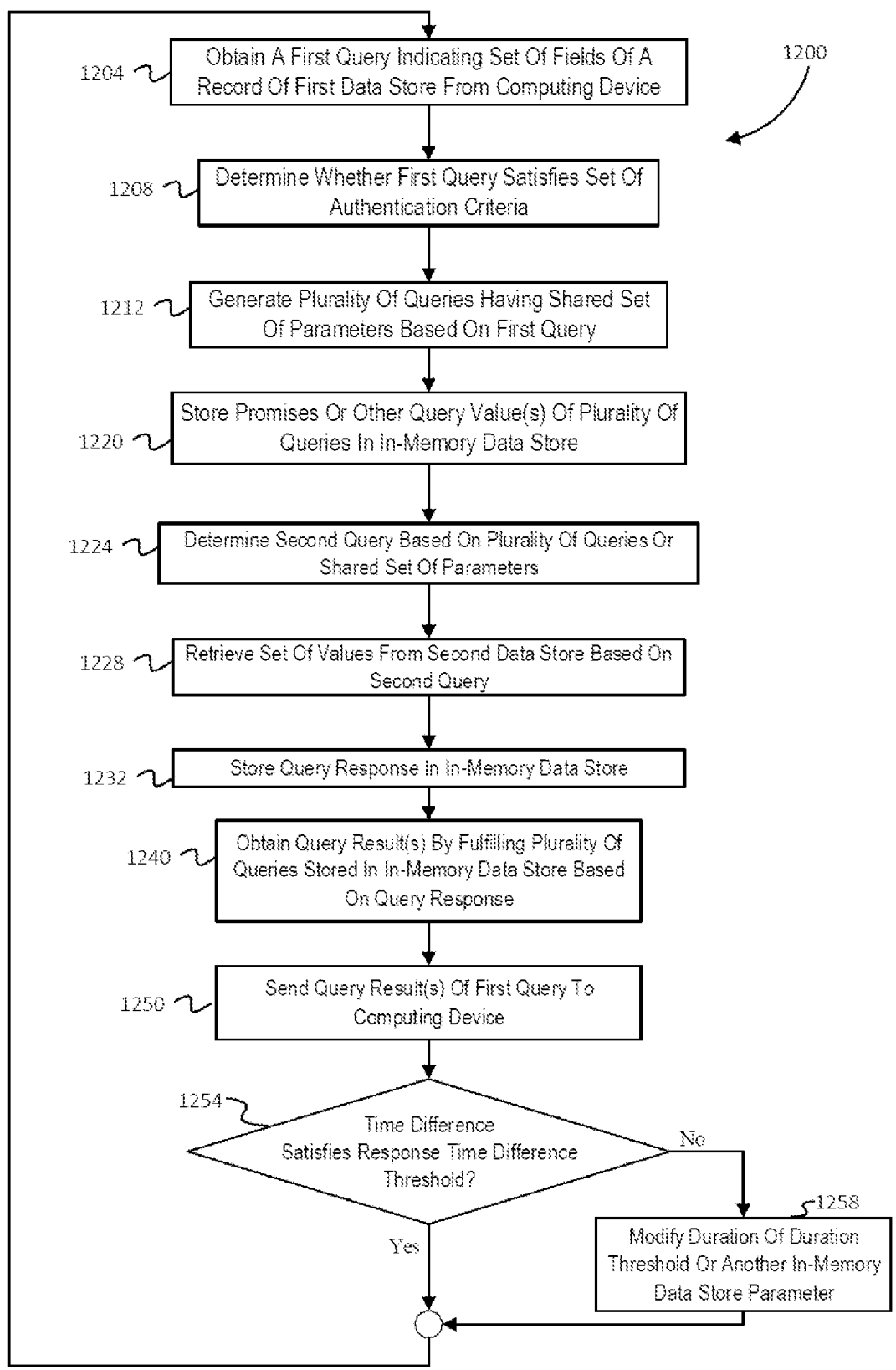
FIG. 12 is a flowchart of a process configured to cache queries, in accordance with some embodiments of the present techniques.

FIG. 12 is a flowchart of a process configured to cache queries, in accordance with some embodiments of the present techniques.

Figure 13:
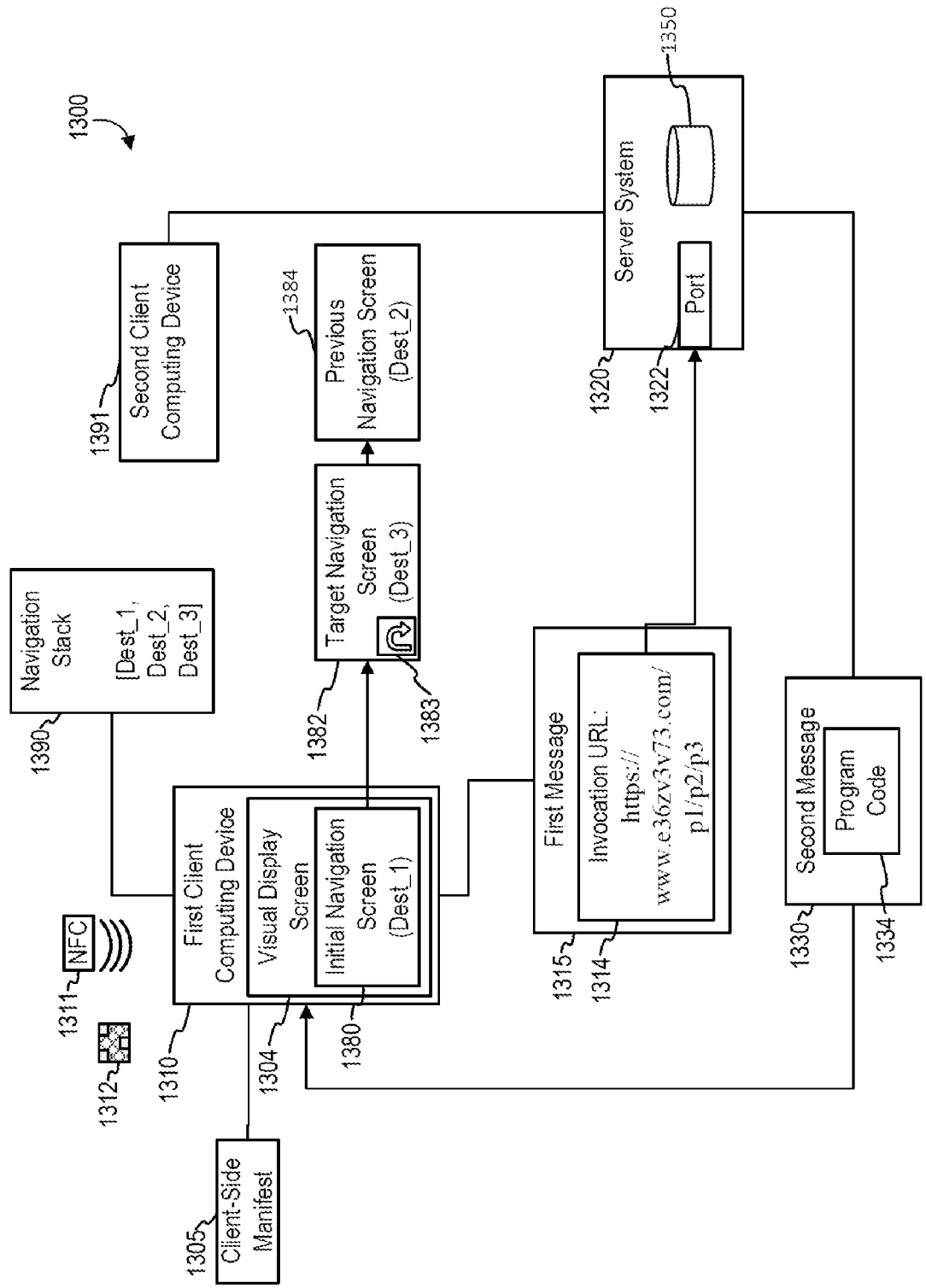
FIG. 13 is a logic and physical architecture block diagram illustrating a computing environment in which navigation path generation may be implemented, in accordance with some embodiments of the present techniques.

FIG. 13 is a logic and physical architecture block diagram illustrating a computing environment in which navigation path generation may be implemented, The architecture 1100 may include an asynchronous query-caching system. A user may interact with an application 1102 executing on a client computer system 1104 (the term "computer system" is used generically to refer to both individual computing devices and collections of such devices that cooperate to execute distributed applications) to send a first query 1108 to a first computer system 1110. The application 1102 may be a native web browser, a native application of the client computer system 1104, a lesser-memory application such as an iOS app clip or an android instant app, or the like. The first query 1108 may be sent in the form of an HTTP post request for a REST API or may be sent as part of a subscription message to communicate with a data subscription API. In some cases, the first query is encoded as a graphQL request, a SOAP (Simple Object Access Protocol) request, or a gRPC (remote procedure call using protocol buffers as an interface) request. Requests need not be labeled as "queries" to qualify as such, provided that the request causes access to a data store, and in some cases, a request may cause a query and several other operations to be performed server-side to service the request. The first query 1108 may indicate (e.g., expressly, or by reference to other values) a database of a set of data stores 1190 (which may be persistent data stores, including databases, files, or the like with our without a database management system), where a first data store of the set of data stores 1190 may include a set of values for fields identified by the first query 1108.

As described elsewhere in this disclosure, a single query received server-side may be used to generate a plurality of queries that cause a corresponding set of duplicative operations on a data store. For example, some embodiments may interpret the query 1108 as instructions to search each record of the "interaction" data table, for each interaction record, retrieve data from a 'user' record identified by the interaction record. To fulfill this query, some embodiments may generate a plurality of queries for the same user record using one or more operations described in this disclosure. For example, if item 123 is provided by user "x14" and item 124 is also provided by user "x14," some embodiments may generate at least two queries each indicating a request to retrieve data for the fields "id," "name," and "portraitId."

Records are not limited to a single row in a single table in a relational database or other data store. A record can be a single row in a single table of a relational database, a dispersed set of values spread across multiple tables in such a database, a collection of adjacent or dispersed values in one or more documents in a document database or other noSQL database, a set of key-value pairs in a key-value database, or the like. Different records can at least partially share the same fields and values of those fields, and in some cases, and some records may not share any fields with at least some other records. Records need not be designated as such in program code or a database schema to qualify as such. In some cases, the records are structured data.

Some embodiments may generate an AST based on the first query 1108 using a query parser 1114. In some embodiments, the query parser 1114 may be an application or service executing program code, such as program code obtained from a GraphQL library or other graph database library. In some embodiments, the AST may include a heavily nested structure that represents the query instructions that are to be used to navigate through a graph data structure to obtain data for a graph data model. Some embodiments may provide the AST to a query validator

1118. In some embodiments, the query validator 1118 may perform operations to validate and AST to determine whether the AST is semantically correct based on a set of semantic criteria. Alternatively, or additionally, the query validator 1118 may perform operations to determine whether one or more authorization values of a user permits the user to obtain data requested by the first query. For example, some embodiments may determine that a first user having the authorization value "1" is permitted to access a set of databases associated with the authorization value "1" and not permitted to access a second set of databases associated with the authorization value "2." The query validator 1118 may also be used to perform other validation operations, such as validating that any arguments of the first query 1108 are one of an allowed set of values or that the first query 1108 is interpretable a downstream subsystem, such as a planner subsystem 1120.

Some embodiments may provide the AST validated by the query validator 1118 to the planner subsystem 1120, where the planner subsystem 1120 may convert the query AST into a query of another database system, such as a SQL database. The AST of the first query may indicate that the execution of a search based on the first query may result in a plurality of queries 1134, where some or all of the queries of the plurality of queries 1134 may be duplicated with respect to the actual records or record fields being accessed. Some embodiments may determine a set of databases that will be searched based on the first query, where one or more of the databases may be different from each other with respect to their database systems. For example, a first database of the set of data stores 1190 may be a PostgreSQL database and a second database of the set of data stores 1190 may be a MongoDB database. Some embodiments may determine that a first query will request data from the first database and generate a query that will be interpretable by the PostgreSQL database using a PostgreSQL subsystem 1122. Alternatively, or additionally, some embodiments may determine that a second query will request data from the second database and generate a query that will be interpretable by the MongoDB database using a MongoDB subsystem 1126. Alternatively, or additionally, some embodiments may generate another query using a graphQL subsystem 1124, where the generated query may be written in the graphQL database query language. A graphQL query may include an operation type, an operation name, a set of variable definitions, nested set of fields and a set of arguments corresponding with the nested fields. In some embodiments, the set of fields may include one or more types of data being requested by a query, and the set of arguments may include one or more key-value pairs attached to an associated field of the set of fields.

In some embodiments, the planner subsystem 1120 may store the graphQL AST or portions of the graphQL AST in a set of in-memory data stores 1140, where the set of in-memory data stores 1140 may be part of an on-site server application, a cloud-based in-memory service, or the like. As described elsewhere in this disclosure, the set of in-memory data stores 1140 may host a key-value database such as Redis™, where the keys of the key-value pairs may be a stringified version of a query, a query AST, or the like. Alternatively, or additionally, the planner subsystem 1120 may store the AST of another database system, such as a SQL AST, in the set of in-memory data stores 1140. Alternatively, or additionally, the planner subsystem 1120 may store a stringified version of an output SQL query or a hash of an output SQL query in a set of in-memory data stores 1140.

Some embodiments may store the plurality of queries 1134 in the set of in-memory data stores 1140, where the plurality of queries 1134 may be stored as key-value pairs. In some embodiments, storing the plurality of queries 1134 may include storing stringified versions of the queries in the plurality of queries 1134. Alternatively, or additionally, storing the plurality of queries 1134 may include storing identifiers or other query values of the queries, such as promises of the queries, or the like. In some cases, the query values are content-addressable identifiers, like hash digests of query parameters (e.g., shared query parameters) that distinguish non-duplicative queries from one another and index into a hash table. For example, storing a query of the plurality of queries 1134 may include storing a promise generated from an execution of the query represented by the identifier "SQL_Query1." In some embodiments, a key of the key-value pairs of the plurality of queries 1134 may include a node address of an AST node (e.g., "Node122", "Node123", "Node124") of an AST generated from a first query of a first database query language. Some embodiments may then generate a second query in another database query language based on the AST node and store the second query or a value based on the second query as a value of the key-value pair.

Some embodiments may determine a second query 1150 from the set of in-memory data stores 1140, where the second query shares one or more query parameters with the plurality of queries 1134 of the set of in-memory data stores 1140. Some embodiments may then search the set of data stores 1190 in order to determine a set of query results 1154 from the set of data stores 1190. During the search, some embodiments may lock one or more records of a data store of the set of data stores 1190 to permit the second query to obtain the set of query results 1154. The second query 1150 may be written in a database query language that is interpretable by a database system stored in the set of data stores 1190. For example, the second query 1150 may be written in SQL, where a SQL database stored in the set of data stores 1190 may retrieve a set of values based on the SQL instructions provided by the second query 1150. As described elsewhere in this disclosure, some embodiments may selectively generate queries in a database query language based on the databases identified by a first query. Generating a query does not require creating a new instance of a query. Generating a query can include selecting among extant stored queries or creating a new query.

After receiving the set of query results 1154, some embodiments may store the set of query results 1154 in the set of in-memory data stores 1140 as a key-value pair 1158, where the key of the key-value pair 1158 may be based on the plurality of queries 1134 (e.g., being based on a hash of a shared set (e.g., equal full sets or intersecting subsets) of parameters of the plurality of queries). Some embodiments may then use the set of query results 1154 to fulfill the plurality of queries 1134, permitting the satisfaction of the plurality of queries 1134 without requiring a corresponding number of searches through the set of data stores 1190. For example, if the values of the plurality of queries 1134 include promises associated with the plurality of queries, some embodiments may fulfill the promises based on the set of query results. Some embodiments may store the plurality of queries 1134 for a duration threshold, where the duration threshold may be less than five seconds, less than 10 seconds, less than 30 seconds, less than 60 seconds, less than 10 minutes, less than one hour, less than 24 hours, or the like. Some embodiments may keep the plurality of queries 1134 in the set of in-memory data stores 1140 in association with a data session identifier, where an indication that the session has been terminated may cause the deletion of the plurality of queries 1134. Alternatively, some embodiments may keep the plurality of queries 1134 in the set of in-memory data stores 1140 for a period of time, where queries of other data sessions may also use the set of query results.

As described elsewhere in this disclosure, some embodiments may receive one or more data-modifying queries of a database, where the data-modifying queries may be labeled differently from a data-retrieving query. For example, some embodiments may receive mutation query 1160 from the application 1102 that is labeled as a graphQL mutation, where the mutation query 1160 includes instructions interpretable by a graphQL service to modify one or more values of a set of records stored in the set of data stores 1190. Some embodiments may receive a plurality of such mutation queries, where each mutation query includes instructions to modify the one or more values of the set of records stored in the set of data stores 1190. Some embodiments may store data-modifying queries in the set of in-memory data stores 1140 and update a sum of the values of the plurality of mutation queries (e.g., by adding a query parameter of a data-modifying query). Some embodiments may then generate a database-modifying combined query that includes the sum of the values and use the database-modifying combined query to update the set of records in the set of data stores 1190. Some embodiments may perform operations for the generation and use of the database-modifying combined query at periodic or semi-periodic intervals, such as part of a batch job. By reducing the number of data-modifying queries, some embodiments may accelerate the speed of database operations by reducing the total number of hits to a database to modify one or more records of the database.

In some embodiments, the set of query results may then be sent to the application 1102 for display on a graphical user interface (GUI) or use to execute one or more client-side operations. For example, some embodiments may provide a credit score increase as part of a set of query results to the application 1102, where the application 1102 may then update a GUI to indicate the credit score increase.

In some embodiments, the set of query results may be stored in a tamper-evident, distributed ledger encoding records of a plurality of previous handoffs in a directed acyclic graph of cryptographic hash pointers. In some embodiments, the cryptographic hash pointers may include a plurality of blocks arranged in a chain, with each block including a cryptographic hash pointer to a previous block. The blocks may be arranged sequentially, such as in an order of creation. In some embodiments, each block may include a Merkel tree, such as a binary tree of cryptographic hash pointers with leaf nodes storing records of previous sets of query results or other values. In some embodiments, each cryptographic hash pointer may include a cryptographic hash value determined by a cryptographic hash function, such as MD-5, SHA-2, or SHA-3. In some embodiments, the cryptographic hash values may be based on a content of a node, or a plurality of nodes, to which the cryptographic hash pointer point. In some embodiments, the content of each node may include its respective cryptographic hash pointer hash values.

In some embodiments, the system of FIG. 11 may execute a process 1200 shown in FIG. 12, though embodiments of the process 1200 are not limited to that implementation, which is not to suggest that any other feature described herein is limiting in all embodiments. In some embodiments, the functionality of the process 1200 and the other functionality described herein, may be implemented as computer code stored on a tangible, non-transitory, machine-readable medium and executable on one or more processors, such that when that computer code is executed, the corresponding functionality is effectuated. In some embodiments, the described operations may be executed in a different order, additional steps may be inserted, some steps may be executed concurrently, some steps may be omitted, some steps may be repeated multiple times before advancing to other steps, steps may be performed serially, and the process may otherwise be varied, which again is not to suggest that any other description herein is limiting.

Figure 14:
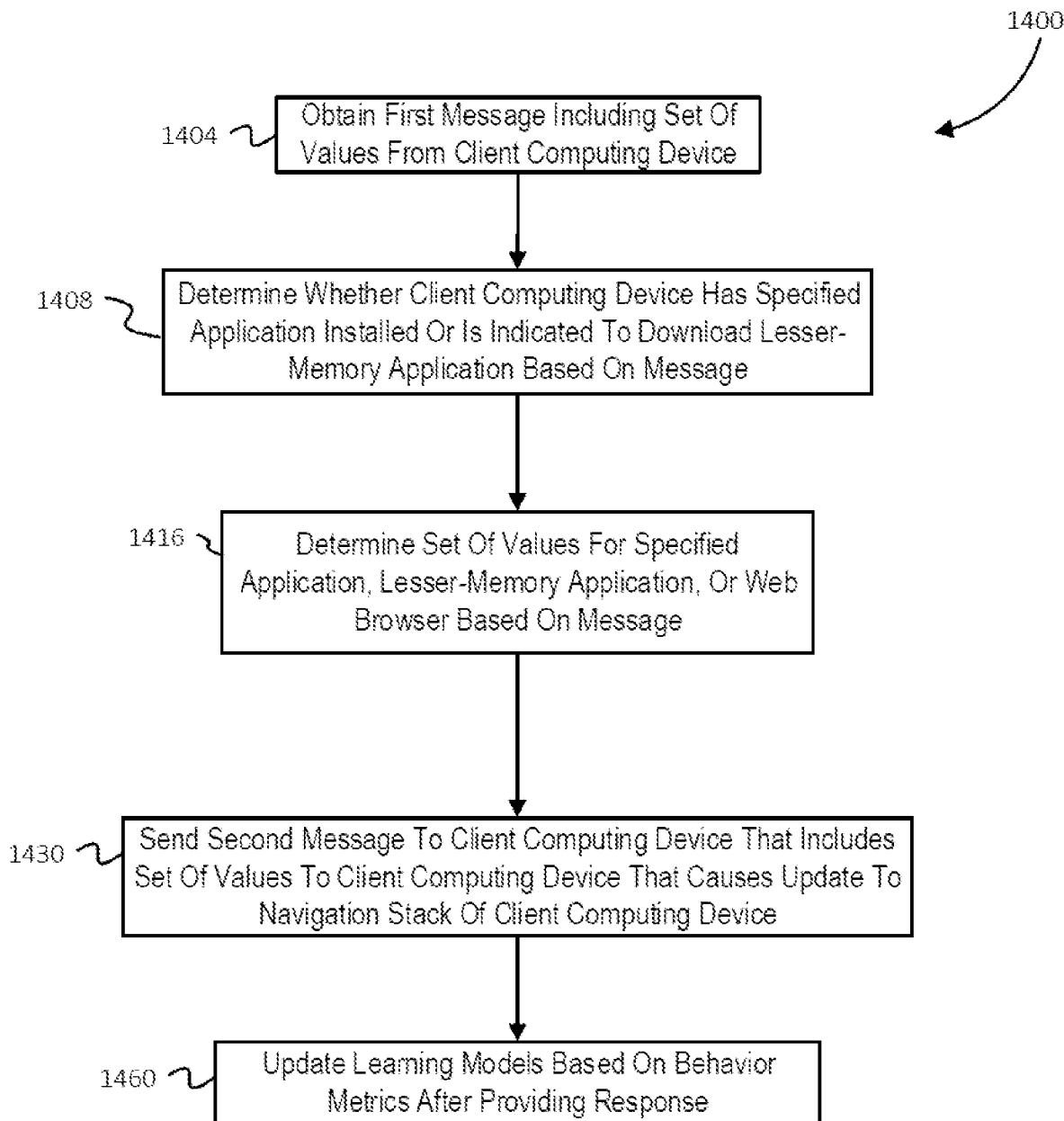
FIG. 14 is a flowchart of a process to provide data that updates a navigation stack, in accordance with some embodiments of the present techniques.

FIG. 14 is a flowchart of a process to provide data that updates a navigation stack, in accordance with some embodiments of the present techniques. Operations of the process 1200 may begin at block 1204. In some embodiments, operations of the process 1200 may include obtaining a first query from a computer device indicating a set of fields of a record of a first data store, as indicated by block 1204. Some embodiments may receive an HTTP post request at an endpoint mounted onto a graphQL server. For example, a graphQL server mounted on the URI httpX://localhost:9991/gql may receive a first graphQL query in the form of an HTTP post request, where the request may include query parameters stored in the form of a JSON document. (The string "httpX" should be read as "http." The "X" is inserted to comply with the prohibition against including browser-executable code in the specification of patent applications in 37 CFR 1.52.) A graph database query such as a graphQL query may itself include a plurality of fields of a set of records. For example, a first graphQL query may include "{query {users {name email}}}" to indicate that a graph database query is to retrieve the fields "name" and "email" from each record in the "user" database.

As described elsewhere in this disclosure, some embodiments may use deep-linking operations to access different GUI screens of a native application or web application executing on a client computing device. For example, after obtaining a first web message directed to a universal resource locator, some embodiments may then parse the link data of web message to obtain a set of key-value pairs, where the set of key-value pairs may include identifiers, authorization values, location data, or other data. Some embodiments may then use the set of key-value pairs parsed from link data to determine one or more query parameters and construct a query based on the query parameters. For example, after tapping on a link being displayed on a graphical user interface of an application executing on a mobile computing device, a user may cause the application to access a universal resource indicator via a first HTTP post request. Some embodiments may then use the HTTP post request to determine a user's location, a device identifier, or other values to generate a query to determine a number of compatible charging locations stored in a data store.

Furthermore, some embodiments may provide or use a lesser-memory application to provide users with an interface to obtain a query or a set of query parameters for the query. For example, some embodiments may receive a request at a first universal resource locator (URL) and, in response, determine whether the device that sent the request has a specified application installed on the device based on one or more values encoded in the request. In response to a determination that the device does not have the specified application installed, some embodiments may provide program code to the device. In some embodiments, the program code may cause the execution of a lesser-memory application, where the lesser-memory application may fetch one or more user values associated with a user of the device. Some embodiments may increase the speed of retrieving the set of values by using the asynchronous methods described in this disclosure. For example, some embodiments may generate a first query that is then used to generate a plurality of other queries, where the plurality of other queries each request device identifiers. Some embodiments may then use the retrieved values to load a version of a lesser-memory application with fields displayed on a UI of the lesser-memory application, where the fields may be pre-populated with the retrieved values.

Some embodiments may use a text generation model to generate a first query that is then used to generate a plurality of other queries. For example, some embodiments may predict future queries using a text generation model, such as an abstractive text summarization model that comprises a transformer learning model. A future query may be determined based on a previous plurality of queries, here some embodiments may generate queries based on previous queries associated with a user or a demographic category associated with the user. For example, some embodiments may determine that a previous plurality of queries having a shared set of parameters is associated with a first type of user. Some embodiments may then use a text generation model to generate a new query that includes the shared set of parameters and other parameters, where some embodiments may then generate a plurality of queries based on the first query.

In some embodiments, operations of the process 1200 may include determining whether the first query satisfies a set of authentication criteria, as indicated by block 1208. In some embodiments, one or more authentication values associated with the first query may be tested with a set of authentication criteria to determine whether or not a user that provided the first query has the appropriate authentication values to execute the first query. For example, a user may have a user record that stores one or more authentication values, and providing a query may include providing values of the user record in association with the query. Some embodiments may then determine whether the authentication value satisfies a set of authentication criteria, where satisfying the set of authentication criteria may include matching with a known authentication value or being within a quantitative range of the authentication criteria. For example, the authentication value may be a category that has the label "auth1," where some embodiments may determine that the set of authentication query are satisfied based on a determination that the category labeled "auth1" matches with a known authentication value of the authentication criteria.

in some embodiments, operations of the process 1200 may include generating a plurality of queries having a shared set of parameters based on the first query, as indicated by block 1212. In some embodiments, a graph-based query may be processed by a graph-based query language function used for populating data of a field. For example, a graphQL query may be processed by a graphQL resolver used to populate the data for a field of a graphQL schema. A resolver function may return data of a requested type corresponding with the schema indicated by a query or a promise that, upon fulfillment, provides data of the requested type. Some embodiments may generate a plurality of queries based on the first query, where the plurality of queries may retrieve or modify a value for a same field of a same record.

In some embodiments, the plurality of queries generated may each share a set of query parameters. The shared set of parameters may include identifiers of different fields, filters that indicate what values to select for or remove, operators, or the like. For example, a first query and a second query may be generated to interact with a SQL database, where the first and second query each include the SQL statement "SELECT*FROM DATABASE1 WHERE 'CAT1'>3". In some embodiments, the plurality of queries generated from a first query may be executed after generation, where the executed plurality of queries may return a corresponding plurality of promises. Some embodiments may then use the values used to fulfill the promises to determine a result for the first query. In some embodiments, each promise of a query of the plurality of queries may be fulfilled based on query results retrieved from a data store, as described elsewhere in this disclosure. As described elsewhere in this disclosure, some embodiments may fulfill these promises with query results stored in an in-memory data store instead of query results directly obtained from an interaction with an API of a persistent data store used to store the values of the query results. Furthermore, some embodiments may store the promises or other query values of queries and the query results in the same in-memory data store. Alternatively, some embodiments may store the query values of a query in another in-memory data store.

As described elsewhere in this disclosure, some embodiments may convert a graph query to an AST. The AST may be represented as a set of nested objects, where the nested objects may be parsed into field identifiers, an array of fields representing the group of fields that are being traversed when navigating the AST, a path value that tracks parent fields leading to a branch being navigated, or an operation associated with a query. Each branch may include a set of field names, where the order of the set of field names may indicate navigation through a set of data tables. As described elsewhere in this disclosure, parsing the query into an AST may provide a method of analyzing instructions for fields of a record and prevent duplicative requests for a field from propagating. For example, some embodiments may perform operations such as schema stitching, query enrichment, layered abstraction, or the like.

Some embodiments may filter out or transform one or more fields of an AST. For example, some embodiments may implement a directive to modify a query generated from a vocal instruction to conform one or more words or phrases into a set of known words or phrases. Additionally, some embodiments may determine that an authentication value of a user permits the user to access some of the fields identified by the AST while not accessing other fields identified by the AST. In response to a determination that the authentication value of a user permits the user to identify some but not all of the fields identified by the AST, some embodiments may reconstruct an AST to search only the permitted fields.

As described elsewhere in this disclosure, the plurality of queries generated from a first query may be expressed in a different database query language from the first query. For example, the first query may be written in association with a typed schema, such as being written in graphQL, and the plurality of queries generated from the first query may be written in a database query language that is disassociated with the typed schema, such as a SQL or SQL-based database query language. Some embodiments may convert a graph database query, such as a GraphQL query, to a set of queries for other database systems, such as a set of SQL queries, set of NoSQL queries, or the like. For example, some embodiments may use one or more functions of a graphQL library to convert a GraphQL query into a graphQL AST, convert the graphQL AST into a SQL AST, and then generate a set of SQL queries based on the SQL AST. Converting an AST of a first type (e.g., a graphQL AST) into an AST another type (e.g., a SQL AST) may include performing a depth-first search through each node of the AST of the first type to generate a corresponding node of a SQL AST of a second type. Some embodiments may then use the generated SQL query to query one or more SQL databases. Similar operations may be used to obtain data form a NoSQL database, such as a MongoDB™ database. In some embodiments, the first query and the queries generated based on the first query may share a set of field names, where operators, brackets, or nesting order may differ between the queries.

In some embodiments, the plurality of queries may include a large number of queries, such as more than five queries having the same shared set of query parameters, more than ten queries having the same shared set of query parameters, more than twenty queries having the same shared set of query parameters, or the like. Storing multiple instances of the same query that may differ only with respect to the node they correspond to in an AST may permit a system that is concurrently executing more than 1000 searches, more than 1 million searches, or more than 1 billion searches over a large data store to execute the searches with greater speed and efficiency by reducing the number of duplicative queries that share a set of query parameters.

Some embodiments may receive a first query that includes the query instructions to modify one or more values of a set of records. Furthermore, some embodiments may combine multiple queries to update a value into a single value. For example, some embodiments may receive a first data-modifying query that modifies a quantitative value of a field of a record. Some embodiments may store the first data-modifying query in an in-memory data store and start a duration threshold, where the first data-modifying query is prevented from updating or otherwise accessing the field until the conclusion of a duration indicated by the duration threshold. Some embodiments may then receive a second data-modifying query that modifies the quantitative value of the field. Some embodiments may determine whether a timestamp associated with the second data-modifying query satisfies the duration threshold. Based on a determination that the second data-modifying query was sent at a time that was within the duration of the duration threshold, some embodiments may determine that the duration threshold is satisfied. In response to a determination that the duration threshold is satisfied, some embodiments may prevent the second data-modifying query from updating the field or otherwise accessing the field until the conclusion of the duration. Some embodiments may add the modification values corresponding with the field of the first data-modifying query and the second data-modifying query to generate a third data-modifying query that would update the field by the sum of the modification values.

In some embodiments, operations of the process 1200 may include storing a set of promises or another set of query values of the plurality of queries in an in-memory data store, as indicated by block 1220. The in-memory data store may include a local cache memory or RAM (random access memory, in a physical memory address space as defined by a memory bus of a system board connecting a processor's memory controller to RAM) of an on-site server (e.g., in a data center remote from a population of client devices). Alternatively, or additionally, the in-memory data store may include an in-memory data store hosted on a cloud server, where communication with the cloud server may be performed via one or more APIs of the cloud server. The in-memory data store may include a key-value database such as Redis™ or Memcached™. In some embodiments, the duration required to by operations to retrieve data stored in an in-memory data may be less than 1 milliseconds (ms), 2 ms, 3 ms, 5 ms, 10 ms, 50 ms, or the like).

In some embodiments, storing the query in a key-value database may include storing a query or a set of parameters related to a query as a value, where the corresponding key for the value may be the query or values related to the query. For example, storing a query in a key-value database of an in-memory data store may include generating a hash value using a hashing algorithm based on a stringified version of a graphQL query or a graphQL query AST, where the hash value may be used as a key of a key-value pair. In some embodiments, the value of a key-value pair may include the body of a query and a query source, where the query source may include an identifier of the application or service executing the query. As described elsewhere in this disclosure, after receiving a query response, some embodiments may store a query response as a value for a key-value pair having the query or a value based on the query as a key of the key-value pair.

In some embodiments, storing a query may include storing the query in association with a data session identifier, where the data session identifier may identify a data session between a user logged into a computing device and a server. For example, a user may be logged into their user account in a first computing device and submit a query from the first computing device to be received by a server. Some embodiments may associate the query with a data session identifier that identifies the data session between the computing device and the server while the user is logged into their user account during the first time interval.

In some embodiments, operations of the process 1200 may include determining a second query based on the first query, the plurality of queries, or the shared parameters, as indicated by block 1224. In some embodiments, the second query may be selected from the plurality of queries stored in an in-memory data store. For example, the second query may be a copy of a first query of the plurality of queries. Alternatively, or additionally, a second query may be different from any of the plurality of queries. For example, the second query may be modified with respect to any query of the plurality of queries stored in an in-memory data store to obtain more fields than indicated.

In some embodiments, operations of the process 1200 may include retrieving a set of values from a second data store based on the second query, as indicated by block 1228. As described elsewhere in this disclosure, the query used to retrieve query results from a data store may be written in commands interpretable by a database, such as MySQL, PostgreSQL, MongoDB, Redis, MariaDB, or the like. Some embodiments may send the selected or generated query to an API the database from an application and receive a set of query results from the database. For example, some embodiments may select a query written in a query command interpretable by a MariaDB system, such as "SELECT*FROM table1 INNER JOIN table2 ON table1.x=table2.y" to select all records having a common value between the tables "table1" and "table2.

Some embodiments may lock one or more records or lock one or more fields of a set of records to prevent operations that may break the consistency of a database. However, by reducing the number of queries sent to a database API, some embodiments may reduce the time that a first query provided by a client computing device will lock a record. Furthermore, in the case of multi-database queries, some embodiments may prevent a plurality of databases identified by the multi-database query from being locked concurrently. Instead, the plurality of queries generated based on the first query may be used to query databases one at a time, leaving other databases unlocked for additional operations.

In some embodiments, operations of the process 1200 may include storing the query response in the in-memory data store, as indicated by block 1232. As described elsewhere in this disclosure, the query response may be stored in a same in-memory data store as the data store used to store the queries. Alternatively, or additionally, the query response may be stored in a different in-memory data store. For example, some embodiments may store a set of query identifiers, hashed stringified queries, or other query values on a first Redis server and store a set of query results on a second Redis server.

After retrieving a query response from a data store based on a query, some embodiments may store the retrieved query response in the in-memory data store in association with the query used to retrieve the query response. The association between the query result and the query may be made by generating a key-value pair, where the key of the key-value pair may include a value based on the query parameters of a query (e.g., a hash of a stringified query), and where the value of the key-value pair may include the query response. For example, some embodiments may generate a key based on a cryptographic hash of a SQL query obtained from a plurality of queries, where each of the plurality of queries may be identical with respect to their corresponding query operators and names, and where the corresponding value of the key may include the query response obtained from a remote data store.

In some embodiments, operations of the process 1200 may include obtaining a set of query results by fulfilling the plurality of queries stored in the in-memory data store system based on the query response, as indicated by block 1240. Some embodiments may provide a query response stored in a local, in-memory data store to each of the plurality of queries during or after storing the response result in the in-memory data store. For example, after obtaining a set of device identifiers based on a query selected from a plurality of queries, some embodiments may then provide the set of device identifiers to each of the nodes on an AST associated with the plurality of queries.

Some embodiments may use the fulfilled promises of a fulfilled plurality of queries to determine a query result of the first query. Some embodiments may provide the duplicated values of the promises to satisfy one or more portions of the first query, where the duplicated values may then be used to determine a final query result for the first query. For example, a first query may require a set of user identifiers, where the request for the set of user identifiers may be duplicated multiple times after parsing the first query into an AST. Some embodiments may use one or more operations described in this disclosure to satisfy each of the query results requesting the set of user identifiers using a same set of identifiers stored in a same record of an in-memory data store. Once the plurality of queries are fulfilled, some embodiments may then finalize the resolution of the first query that was used to generate the plurality of queries.

After retrieving a query response from a data store based on a query, some embodiments may store the retrieved query response on the in-memory data store in association with the query used to retrieve the query response. Some embodiments may associate the query result and the query by generating a key-value pair, where the key the key-value pair may be a hash based on the query parameters of a query, and where the value of the key-value pair may include the query response. For example, some embodiments may generate a key based on a cryptographic hash of a SQL query obtained from a plurality of queries, where each of the plurality of queries may be identical with respect to their corresponding query operators and names, and where a corresponding value of the key may include the query response obtained from a remote data store.

In some embodiments, operations of the process 1200 may include sending a set of query results of the first query to the computing device, as indicated by block 1250. In some embodiments, a set of query results may be sent to a client computing device, such as a smart phone, a smart watch, augmented reality glasses, or the like. As described elsewhere in this disclosure, the query results may then be displayed on a GUI, used to control a component of the client computing device, used to actuate an actuator, or the like.

In some embodiments, the set of query results may be sent to a peer-to-peer network for distributed file storage, where the peer-to-peer network may include A block chain network such as the interplanetary file system (IPFS). For example, after retrieving the query result for a user indicating a score change (e.g., A credit increase, an account value increase, or the like), some embodiments may store the result in a persistent storage with an address to the persistent storage recorded on the IPFS network. By recording changes to a value on a block chain network, some embodiments increase the transparency and reduce the likelihood of fraudulent attacks.

In some embodiments, operations of the process 1200 may include determining whether a time difference satisfies a time difference threshold, as indicated by block 1254. In some embodiments, a time difference may represent a response time, where modifications to the parameters of the operations by which queries or query responses are cached may affect the time difference. In some embodiments, the duration of a duration threshold may be modified to increase or otherwise change the speed at which data is retrieved from a graph database or other database. For example, some embodiments may obtain a response time reported by an application executing on a client computing device. The response time may indicate the amount of time that a query is first made and a response to the query is received with respect to a client computing device. For example, some embodiments may determine a client-side response time difference based on the difference between the time when a client computing device sends a first query and the time when the client computing device receives a response to the first query. For example, some embodiments may determine the client-side time difference based on a first timestamp and a second timestamp provided by an application executing on the client computing device, where the first timestamp may indicate when a first query is provided, and where the second timestamp may indicate when the application receives results for the first query.

Alternatively, or additionally, some embodiments may determine a server-side response time difference based on the difference between the time when an application or service executing on a server sends a query to a data store and receives a result to the query from the data store. For example, some embodiments may determine a server-side response time for a query based on a difference between a third timestamp and a fourth timestamp. The third timestamp may indicate when a first query is received by an application or service executing on a server. The fourth timestamp may indicate when the server receives a result to the first query, where operations such as fulfilling (e.g., resolving, or otherwise answering) a plurality of queries that were generated based on the first query may be performed during the time difference between the third and fourth timestamps. In response to a determination that a time difference satisfies a time difference threshold, operations of the process 1200 may proceed to block 1258. Otherwise, operations of the process 1200 may stop or return to block 1204.

In some embodiments, operations to the process 1200 may include modifying a duration of a duration threshold or another parameter of the set of in-memory data stores used to store queries or query responses, as indicated by block 1258. Some embodiments may perform one or more operations to decrease a response time based on a response time threshold. For example, some embodiments may determine whether a time difference, such as a server-side response time difference or a client-side response time difference, satisfies a time difference threshold. Determining that a time difference satisfies a time difference threshold may cause a server to increase the duration for which queries are permitted to be stored in an in-memory data store. For example, some embodiments may store queries in their corresponding query results in a Redis database for a first duration, such as one second, 20 seconds, 30 seconds, 60 seconds, or some other duration. In response to a determination that a query that provided the response had a longer response time than indicated by a response time threshold, some embodiments may increase the storage time of queries in the Redis database to a second duration that is longer than the first duration. For example, some embodiments may increase the duration for which a record of a query is kept to a pre-set amount that is greater than the first duration, such as 10 seconds, 20 seconds, 30 seconds, one minute, or the like.

Alternatively, or additionally, some embodiments may increase the memory capacity allocated to storing records of queries or a number of entries. For example, some embodiments may increase the memory capacity of a Redis database allocated to storing a query or type of query in response to a determination that a client-side response time is greater than a client-side response time threshold. Increasing the memory capacity may include directly increasing a memory capacity or increasing a count of records that the in-memory database may store with respect to a query or type of query. For example, some embodiments may use a first node having 30 GB allocated to store queries and their corresponding query results that are used to obtain data from a data store. In response to a determination that a response time is greater than a response time threshold, some embodiments may allocate additional memory to storing queries, such as by increasing the amount of RAM allocated to the first node or activating a second note.

Navigation Path Generation

In the context of web-based navigation in mobile computing devices, deep links may be used to carry context from various channels (e.g., webpages, emails, sms messages, and other content bearing such links) into an initial state of a mobile app, with a user without requiring the user to navigate to the state from a default starting state of the mobile app. For example, deep linking, in some use cases, permits a user to bypass a home screen of a native application. These deep linking operations may be useful when presenting users of an application with a set of UI views that represent different steps of a workflow represented by a sequence of navigation destinations, where each navigation destination may include one or more views on a screen or other type of visual display of a device. Some embodiments may skip starting destinations, pre-populate values that would otherwise be provided by the user via UI elements of a navigation destination, or perform other operations of the workflow using deep linking.

However, many deep linking operations put the user's computing device in a state that can lead to non-intuitive behavior when the user requests to revert "back" to a previous UI state of the native app (e.g., by selecting a "back" UI element presented by the OS). To the OS, the step "back" from the UI state targeted by a deep link is often different from what a user cognitively would regard as the prior state to the that UI state, particularly for an intermediate stage of a sequence of UI states in a workflow. The user often has in mind the earlier stage in that sequence, while the OS may map a "back" operation onto a context switch to the application in which the link was selected.

For example, a user that taps on a deep link of a client computing device may cause a first application displaying the deep link on a destination screen to open a second application. Once opened, the second application may then present a non-default navigation destination of the second application (e.g., carrying forward context from the deep link), where the navigation destination is one of four navigation destinations of a data entry workflow. Many existing deep link implementations configure a navigation stack of an operating system (in which the destination native app runs) such that a first layer characterizing a destination that provided a link used for deep linking operations is adjacent to a second layer characterizing a destination associated with a middle step of a workflow. An intentional or accidental user interaction with the client computing device may then cause the operating system of the client computing device to execute a 'back' command. Executing the "back" command may cause a computing device to navigate through its OS's stored navigation stack and present a destination of the first application instead of a more intuitive previous destination page of the data entry workflow through various UI states of the native application. Such an order of operations may cause data loss by deleting data entered by the user into a UI element of the middle destination and generating user frustration. None of which is to suggest that these approaches are disclaimed or that any other subject matter is disclaimed.

To mitigate these issues, some embodiments may update a navigation stack of an application (or an OS in which it runs) match (e.g., fully or at least partly) a sequence in a UI workflow. Some embodiments may insert into such a stack a sequence of navigation destination values while presenting a navigation screen having properties characterized by of a navigation path through the navigation destinations of the UI. Some embodiments may update the navigation stack while concurrently causing an application to display a target destination of an application. By updating the navigation stack with the sequence of navigation destination values, some embodiments may provide the users with a way to edit pre-populated data in a workflow without exiting a planned path through a navigation graph.

Some embodiments may obtain a message, such as a hypertext transport protocol (HTTP) request (or collection of such request collectively performing a task), from a client computing device. The destination uniform resource locator (URL) (a term which, as used herein, may include query string parameters as well, and which is used generically to also refer to uniform resource identifiers and their path components) of the message may be used to perform deep linking operations and determine a set of values. The set of values may include a navigation destination identifier that maps to a navigation destination of an application representing an intermediate (or final) step of a workflow. The set of values may also include a set of other navigation destination identifiers associated with a set of other navigation destinations representing workflow steps that are positioned before or after the intermediate step of the workflow. Each navigation destination or their respective navigation destination identifier may be associated with a respective navigation screen by being used to present the respective navigation screen on a client computing device. Some embodiments may then send the set of values to the client computing device via a web message (a term which is not limited to messages to or from web browsers and can include messages to or from native applications, and which also encompasses messages addressed with IP addresses in place of host names in URLs or URI's) to cause the client computing device to display a target navigation screen characterized by or otherwise associated with a target navigation destination object. Once the web message is received by a client computing device, the client computing device may then update the sequence of navigation layers of a navigation stack. A navigation layer may map to a different navigation destination or a same application or a different navigation destination of a different application. Updating the navigation stack may include inserting an identifier or another value associated with a previous navigation screen to be adjacent with an identifier or another value associated with the target navigation screen.

FIG. 1 is a schematic diagram of a first computing environment in which a score stored in an account may be updated, in accordance with some embodiments of the present technique.

FIG. 2 is a logical and physical architecture block diagram illustrating a computing environment in which various learning infrastructure may be implemented with the present techniques in accordance with some embodiments.

FIG. 3 is a flowchart illustrating a process to provide and obtain data via a UI, in accordance with some embodiments of the present techniques.

FIG. 4 is a flowchart illustrating a process to encrypt and decrypt data across accounts, in accordance with some embodiments of the present techniques.

FIG. 5 shows an example of a computing device by which the present techniques may be implemented.

FIG. 6 is a flowchart of a process configured to update encrypted data, in accordance with some embodiments of the present techniques.

FIG. 7 is a flowchart of a process configured to determine an output based on a decryption key, in accordance with some embodiments of the present techniques.

FIG. 8 is a flowchart of a process configured to update a variable based on a combined value, in accordance with some embodiments of the present techniques.

FIG. 9 is a schematic diagram of a first computing environment in which a score stored in an account may be updated, in accordance with some embodiments of the present technique.

FIG. 10 is a flowchart of a process configured to provide and obtain data via a combined interface in a cloud-based environment.

FIG. 11 is a logic and physical architecture block diagram illustrating a computing environment in which the asynchronous query caching may be implemented with the present techniques, in accordance with some embodiments.

FIG. 12 is a flowchart of a process configured to cache queries, in accordance with some embodiments of the present techniques.

FIG. 13 is a logic and physical architecture block diagram illustrating a computing environment in which navigation path generation may be implemented, in accordance with some embodiments of the present techniques. In some embodiments, the computing environment 1300 may include a first client computing device 1310, which may present visualizations of data in the visual display screen 1304. After receiving an initial URL, e.g., by executing an event handler responsive to a user selecting a link with the URL in a displayed document, by decoding a signal from an NFC device 1311 or decoding the initial URL from a camera scan of a QR code 1312, the first client computing device 1310 may generate (e.g., lookup, access a copy of, compose, or pass-through from the obtained URL as) an invocation URL 1314 based on the initial URL. Alternatively, or in addition, some embodiments may receive an invocation URL based on geolocation data of the first client computing device 1310. For example, based on a determination that the first client computing device 1310 is within a specified geofence, a map application executing on the first client computing device 1310 may display an initial URL. Furthermore, some embodiments may receive the initial URL via a link displayed on a web browser, a pdf viewer, a native mobile app, a document editor, a text messaging application, or the like.

In some embodiments, the invocation URL 1314 may be the same as the initial URL obtained from the NFC device 1311. Alternatively, the invocation URL 1314 may include the initial URL and additional values. Some embodiments may process the invocation URL 1314 to determine whether the invocation URL 1314 is associated with a specified application. As described elsewhere in this disclosure, some embodiments may send then messages to a server system 1320 using the invocation URL 1314 to perform one or more operations. As described in this disclosure, a message may include a set of sub-messages sent in the form of one or more data packets sent according to an internet protocol. The message may be provided in the form of a HTTP web request or a response to the web request ("web response") sent over the Internet. For example, a message may include a web request including information encoded in the ASCII format and divided into chunks of data ("frames").

In some embodiments, the first client computing device 1310 may compare the invocation URL 1314 with a stored set of links to determine if the invocation URL 1314 matches with any of the stored set of links associated with a specified application. For example, the first client computing device 1310 may be operating an Apple iOS™ operating system and may compare the invocation URL 1314 with a client-side manifest 1305, where the client-side manifest 1305. In some embodiments, the client-side manifest 1305 may indicate associations between a set of stored links and a set of applications, where the client-side manifest 1305 may be globally accessible to background processes of an operating system executing on the first client computing device 1310. Alternatively, the client-side manifest 1305 may be specific to a specified application and include the links associated with the specified application. In response to a determination that the invocation URL 1314 matches with a link included in the client-side manifest 1305, some embodiments may route the invocation URL 1314 to the specified application. Variations may exist between different embodiments based on the operating system of the first client computing device 1310. For example, a client computing device that executes applications on the Android platform may search an "AndroidManifest.xml" file to determine whether the invocation URL matches with at least a part of a set of URLs.

In response to a determination that the invocation URL matches with at least a part of the set of URLs associated with a specified application, some embodiments may then activate the specified application send messages based on the invocation URL. For example, some embodiments may provide program code to a client computing device that triggers a method in the "AppDelegate" class of an iOS device, where the method may cause the specified application to perform one or more operations based on the invocation URL. Some embodiments may send a first message 1315 to a server system 1320. The first client computing device 1310 may send the first message 1315 to a port 1322 of the server system 1320, where the port 1322 may be a port of a domain identified by the internet domain identifier of the invocation URL 1314 (e.g., "e36zv3v73" in the example introduced below).

Once the first message 1315 is received by the server system 1320, the server system 1320 may execute program code to perform operations based on the first message 1315 and the invocation URL 1314. For example, some embodiments may confirm whether the server is an authenticated destination of the first message 1315 based on whether the web message includes a permission value that matches a value on a stored set of permission values stored on a memory of the server system 1320 or accessible to the server system 1320. Furthermore, while the server system 1320 may be a physical, on-site server in some embodiments, some embodiments may use a set of cloud computing services as the server system 1320. For example, some embodiments may perform one or more operations described in this disclosure using a set of Amazon AWS™ services, Google Cloud™ services, Microsoft Azure™ services, or the like.

In some embodiments, the invocation URL 1314 may include parameters usable to identify the client computing device, values of a record stored on or otherwise accessible to the client computing device. Some embodiments may use the invocation URL 1314 to obtain the parameters using parsing operations. For example, some embodiments may parse an invocation URL by a separator "I" to obtain individual parameters of an invocation URL. In some embodiments, the set of parsed parameters may be used to perform operations such as selecting a set of values representing a navigation path for a native application executing on a parameter-determined type of client computing device or a web application.

Before or while sending the first message 1315, an initial screen may be displayed on the visual display screen 1304, where the initial screen may be associated with the destination identifier "Dest_1." Once the first message 1315 is received at the port 1322, some embodiments may parse the invocation URL 1314 of the first message 1315 to determine a URL and additional parameters associated with the URL. For example, the invocation URL is shown in FIG. 13 to include the string "httpXs://www.e36zv3v73.com/p1/p2/p3" Some embodiments may then parse the invocation URL into a destination URL httpXs://www.e36zv3v73.com" and a set of parameters "p1," "p2," "p3." Some embodiments may use the set of parameters to determine whether the first client computing device 1310 has a specified application installed on a persistent memory of the first client computing device 1310. For example, based on a determination that the invocation URL includes the value "p1," some embodiments may determine that the first client computing device 1310 has a specified application installed on the first client computing device 1310. Alternatively, or in addition, some embodiments may use data stored in the body of the first message 1315 to perform a set of operations described in this disclosure.

In response to a determination that the first client computing device 1310 has a specified application installed on the first client computing device 1310, the server system 1320 may provide the first client computing device 1310 with a set of program code 1334 interpretable by the specified application via a second message 1330. After receiving the set of program code 1334, the first client computing device 1310 may provide values for the specified application identified by the set of program code 1334. Some embodiments may provide program code (or data that is operated upon by locally installed program code) that causes a client computing device to display a screen of a UI on the first client computing device 1310. In addition to updating the UI displayed on the first client computing device 1310, the program code (which may be data that is operated on by locally installed program code) may modify a navigation stack 1390 to include a plurality of destination identifiers or other navigation destination values. For example, as described elsewhere in this disclosure, the navigation stack 1390 may be updated from an ordered list that ends with destination identifier "Dest_1" to a list that ends with the destination identifier "Dest_3," where the destination identifier "Dest_2" may be inserted between "Dest_1" and "Dest_3" in the navigation stack.

In response to a determination that a first client computing device 1310 does not have a specified application installed on the client computing device content, the message provided by the server system 1320 to the first client computing device 1310 may differ. In some embodiments, the message may include program code for a lesser-memory application, such as program code for an iOS App Clip or an Android Instant App. As described elsewhere in this disclosure, a lesser-memory application may include applications using less than 10 megabytes (MB) of memory, less than 5 MB of memory, less than 4 MB, less than 1 MB memory, or the like, where the application may use one or more methods or functions of a greater-memory application. For example, some embodiments may generate or obtain program code that causes an instance of the lesser-memory application to use a same view controller class as used by a greater-memory application that was associated with a domain of the invocation URL 1314 in the client-side manifest 1305. The program code may then cause the first client computing device 1310 to call a function of the lesser-memory application or an operating system of the client computing device to show one or more navigation screens of a UI.

In some embodiments, the server system 1320 may send web browser-compatible data, where the data may include images or values such as text, program code, encrypted information, or the like. For example, some embodiments may determine that the second message 1330 should not include data for a specific native application or lesser-memory application and, in response, send web-browser compatible data. Alternatively, the server system 1320 may send web-browser compatible data to the first client computing device 1310 by default, where the program code 1334 may include program code interpretable by a web browser compiler. In some embodiments, the program code may provide JavaScript code interpretable by a JavaScript™ engine (e.g., v8, Nitro, SpiderMonkey, etc.). Furthermore, some embodiments may send intermediate program code that is provided in a binary format, such as WebAssembly program code that has been compiled into bytecode format targeting the virtual machine in use.

In some embodiments, the server system 1320 may determine a set of values associated with different navigation destinations that, when rendered on a client computing device, presents different navigation screens of a workflow. The set of values representing navigation destinations may be determined in various ways and may depend on whether the navigation destinations are to be presented in a specific native application, a lesser-memory application, or a web browser. For example, some embodiments may include a sequence of state configurations or state configuration identifiers in the set of values, where one or more values of the set of values is retrieved from a record stored in the data store 1350 of the server system 1320. Alternatively, some embodiments may determine that a specified application is installed on the first client computing device 1310 or that a lesser-memory application is to be sent to the first client computing device 1310. In response, some embodiments may include a set of application-specific destination identifiers interpretable by a view controller of the specified application or lesser-memory application.

As described above, some embodiments may determine a sequence of state configurations to the first client computing device 1310. Each respective state configuration may represent a different destination and be used to render a corresponding navigation screen, where a state configuration may include a set of state values indicating UI element properties, such as shapes, dimensions, text, animations, or the like. Alternatively, or in addition, the set of values represented by the server system 1320 may include a set of webpage identifiers (e.g., in the form of URLs), where each webpage may represent a destination for a workflow step associated with a different navigation screen.

Once the set of values representing a sequence of navigation destinations to a target destination is determined, some embodiments may send a second message 1330 to the first client computing device 1310. The second message 1330 may include program code 1334. While the second message 1330 is shown as including a set of program code 1334, other embodiments are possible. For example, the second message 1330 may be sent without program code. A web message sent from a server to a client computing device may include a set of commands interpretable by an application executing on the client computing device, program code for a lesser-memory application, program code for a web application that uses a JavaScript™ engine of a web browser, or the like.

As described elsewhere in this disclosure, the second message 1330 causes the first client computing device 1310 to display a target navigation screen 1382 after displaying the initial navigation screen 1380. Furthermore, some embodiments may update the navigation stack 1390 to include one or navigation layers in addition to the navigation layer representing a target destination. For example, the navigation stack 1390 may include an ordered list of identifiers that may be updated by a set of values included in the second message 1330. Updating the navigation stack 1390 may include updating the destination identifiers "Dest_2" and "Dest_3," where "Dest_2" may identify the destination represented by the target navigation screen 1382, and where "Dest_3" may identify the destination represented by the navigation screen 1384. A user attempting to return to a previous navigation layer may press a UI element, such as a 'back' button 1383. In response to detecting the interaction with the UI element represented by the 'back' button 1383, some embodiments may then will then navigate through the navigation stack 1390 to update the visual display screen 1304 to display the navigation screen 1384 instead of the initial navigation screen 1380. Some embodiments may then remove a navigation stack value representing a most-recent navigation layer (e.g., by popping a navigation stack value sorted in a sequence of navigation stack values representing a sequence of navigation layers). Furthermore, some embodiments may include a button or other UI element permitting a user to return to an initial activity that occurred before the navigation stack was updated. For example, after a navigation stack of a client device is updated with five new destination identifiers by an HTTP web response, the client device may display a navigation screen that includes a "return to previous activity" button. After a user taps on the "return to previous activity" button, the client device may then delete all five destination identifiers from the navigation stack of the client device.

Furthermore, a version of the second message 1330 may also be sent to a second client computing device 1391 in response to a determination that the second client computing device 1391 is within a geographic range of the first client computing device 1310.

FIG. 14 is a flowchart of a process to provide data that updates a navigation stack, in accordance with some embodiments of the present techniques. In some embodiments, operations of the process 1400 may include obtaining a message from a client computing device, as indicated by block 1404. As described in this disclosure, a message may include a web message, such as a HTTP web request, where the message may include a destination address of the message. For example, some embodiments may obtain, at a port of a server, a web request addressed to an invocation URL. Some embodiments may use the invocation URL to generate an object that includes a plurality of properties parsed from the invocation URL.

As described elsewhere in this disclosure, the client computing device may detect the presence of other computing devices within range of a wireless signal, where the wireless signal may be a Wi-Fi signal, a Bluetooth™ signal, a cell signal, another type of radio a frequency signal, or the like. A client computing device may then send an indicator of a detected device in the web message or in association with the web message sent to the server. For example, the client computing device may detect the presence of a smart watch and send an identifier of the smart watch in association with a web request to a server that performs one or more operations described in this disclosure.

The invocation to send the web message to the invocation URL may be caused by a visual marker, such as a QR code. For example, a client computing device may scan a QR code with a camera of the client computing device, where the QR code the URL "httpXs://www.example.v38v73.com/" using a QR code interpreter. Alternatively, or in addition, some embodiments may obtain a URL from a NFC device, a user interaction with a hyperlink, or the like. For example, some embodiments may obtain a URL from a wireless communication device, such as a NFC device operating at wireless signals centered around 13.56 MHz or another frequency between 13 MHz and 14 MHz. Alternatively, or in addition, some embodiments may obtain a URL based on a geolocation, a UI element of an application, or a direct link displayed over the internet.

Some embodiments may generate a web message addressed for an invocation URL, where the invocation URL may include the first URL. Alternatively, the web message may be addressed to a URL that includes the first URL and a set of additional values. For example, after obtaining the URL "httpXs://www.e36zv3v73.com/", some embodiments may generate the invocation URL "httpXs://www.e36zv3v73.com/p1/p2/p3" to provide the properties "p1", "p2," and "p3" to a server.

In some embodiments, operations of the process 1400 may include determining whether the client computing device has a specified application installed or is indicated to download a lesser-memory application, as indicated by block 1408. After obtaining a message from a client computing device, some embodiments may authenticate the web request to determine whether the request includes one or more expected values. For example, some embodiments may receive a web request from an iOS-based client computing device. As described elsewhere in this disclosure, some embodiments using the iOS operating system may use the Apple Universal Links protocol to perform deep linking operations. For example, some embodiments may open a JSON object that includes a list of application identifiers and URL paths that may be included or excluded as deep linking URLs, where the JSON object may be hosted on a domain identified by the invocation URL. Based on a determination that a web message includes the application identifier or another permission value, some embodiments may determine that the client computing device has the specified application installed.

In some embodiments, a determination may be made that the client computing device does not have the specified application installed. In response, some embodiments may determine whether the client computing device is to download a lesser-memory application. As described elsewhere in this disclosure, a lesser-memory application may include an Apple App Clip or an Android Instant App. For example, after receiving a web message having an invocation URL "httpXs://USPT0.pat.3x4mp13/has_app=no," some embodiments may determine that the property "has_app" indicates that the client computing device does not have a first application installed on the client computing device. As described elsewhere, some embodiments may generate or obtain program code of a lesser-memory application in response.

In some embodiments, operations of the process 1400 may include determining a set of values for a specified application, lesser-memory application, or web browser based on the first message, as indicated by block 1416. Some embodiments may determine a set of values associated with a sequence of navigation destinations. Values of the sequence may include identifiers of navigations screens or parameters used to characterize the navigation screens. For example, the parameters may be used to characterize the orientation, size, shape, color, or other visual features of a UI element of a navigation screen associated with a navigation destination.

The set of values may include a plurality of subsets of values, where each respective subset of values may be associated with a respective navigation destination or associated respective navigation screen. For example, some embodiments may determine a first subset of navigation destination values that is associated with a first navigation screen and a second subset of navigation destination values that is associated with a second navigation screen. Values of the first subset may include an identifier of the first navigation screen or dimensions of UI elements used in the first navigation screen, and values of the second subset may include an identifier of the second navigation screen or dimensions of UI elements used in the second navigation screen.

Some embodiments may store and retrieve different versions of the set of values based on an invocation URL or another element of a first web message sent to the invocation URL. For example, the invocation URL may be parsed to indicate that the client computing device does have a specified application installed on a memory of the client computing device. Some embodiments may then determine a set of values that are formatted to be interpretable by an application program interface (API) of the specified application. For example, some embodiments may retrieve a set of values from a record associated with the specified application, where the set of values may include a set of identifiers of navigation destinations and a directed array linking the set of identifiers.

Some embodiments may provide a set of values for a lesser-memory application. In response to a determination that a client-computing device is indicated by a web message to download a lesser-memory application, some embodiments may determine a set of values compatible with the lesser-memory application. In some embodiments, the set of values may be the same as the set of values for a specified application that is associated with the lesser-memory application in a manifest file of the client computing device or a server. For example, a lesser-memory application and a greater-memory application may share the same set of program modules to display three navigation screens for a workflow, where the format for identifiers of the navigation screens may be the same. After receiving a first message from a first client computing device indicated as having a specified application installed, some embodiments may provide a first set of values to the client computing device, as described elsewhere in this disclosure. After receiving a second message from a second client computing device indicated as a lesser-memory-downloading device, some embodiments may then provide the same first set of values to the second client computing device.

In some embodiments, a lesser-memory application may use different modules or data formats compared to a specified application associated with the lesser-memory application. Some embodiments may generate a differently-formatted set of values for these types of lesser-memory applications. For example, some embodiments may determine a first sequence of navigation destinations for a specified application and a different sequence of navigation destinations for a lesser-memory application associated with the specified application in a manifest file. Similarly, some embodiments may generate a same or different set of values for a web application or web browser-based workflow. For example, some embodiments may determine a set of values representing navigation destinations as a sequence of URLs or as a sequence of state configurations.

In some embodiments, determining the set of values may include retrieving a set of records from a data store based on data provided via a message from the client computing device. The set of records may include one or more types of records, such as a user record having data associated with a specific user, a device record having data associated with a specific type of computing device, an application record having data associated with a specific type of application, or the like. For example, some embodiments may obtain a record from a data store based on a set of key-value pairs provided via a web request from client computing device. The record obtained from a data store based on the web message may include one of various types of records. For example, some embodiments may obtain an account record that identifies or is otherwise associated with a specific user, a record of identifiers of navigation destination, other values, or the like. For example, some embodiments may obtain one or more subsets of navigation destination identifiers based on a set of values of a web message that indicate that a client computing device is a first type of device. Some embodiments may then retrieve a set of values from a record associated with the first type of device, where the record may be associated with a set of navigation screens associated with the first type of device.

As described elsewhere in this disclosure, the set of screens or other views of a UI characterized by navigation destination values may be responsive to the data sent in a web message. For example, some embodiments may retrieve a set of values of a record based on a first key-value pair provided via a web message from a client computing device, where receiving a second key-value pair may have caused the retrieval of a different set of values of a different record. The retrieved set of values may then be used to determine a first subset of navigation destination values that characterize a first screen of a UI and determine a second subset of navigation destination values that characterize a second screen of a UI. For example, the retrieved set of values may include a first subset of navigation destination values that include the value "John" to indicate that a first button should have the text "John" within its borders when the first screen is displayed. The retrieved set of values may also include a second subset of navigation destination values that include the value "50" to indicate that a slider should display a maximum value of 50 when the second screen is displayed.

Some embodiments may receive a message indicating a user record. For example, a first client computing device may receive an invocation URL from a second client computing device, where the invocation URL includes an identifier of a user record or other type of record associated with the second client computing device. Some embodiments may retrieve a record value from the record and send the record value to the second client computing device, where the second client computing device may display the value for user viewing. Alternatively, or in addition, some embodiments may perform one or more operations to determine whether the record matches with a set of anomalous records, has a value flagged as anomalous, or otherwise satisfies a set of anomaly-related criteria. For example, some embodiments may determine that a user identifier of a record is one of a set of user identifiers indicating fraud. In response to a determination that the record matches with a set of anomalous records or otherwise satisfies the set of anomaly-related criteria, some embodiments may send a warning message to the first computing device indicating an anomaly associated with the record.

Some embodiments may use a machine learning model to predict a set of previous navigation destination values. For example, some embodiments may use a neural network model to determine whether a set of previous navigation destination values includes a first screen or a second screen. The neural network model may be one of various types of neural network models, such as a feedforward neural network model, a recurrent neural network, or the like. In some embodiments, the neural network model may have been trained using a training dataset, where the training dataset may be scored by a set of criteria. For example, some embodiments may generate a trained neural network model by updating the weights or biases of a set of neurons of the neural network model to determine an output. Some embodiments may use the output to select the sequence of navigation destination values or navigation screens characterized by navigation destination values based on the sequence that causes the greatest number of downloads of an application. Some embodiments may update the set of neural network model parameters based on a measured behavior of users. For example, some embodiments may train a neural network model based on a training dataset. The training dataset may indicate that a first sequence of previous state values is associated with greater number of interactions with the application in comparison to the number of interactions associated with a second sequence of previous state values. Some embodiments may then update the trained neural network model based on an additional set of measurements obtained from data provided by client computing devices.

In some embodiments, operations of the process 1400 may include sending a second message to the client computing device that includes the set of navigation destination values to the client computing device, as indicated by block 1430. Sending the response may include sending the set of values determined using one or more operations described in this disclosure, where the set of values may be sent in association with program code or data for a native application or a web application. In some embodiments, the program code or data may be interpretable by a native application executing on the client computing device. For example, some embodiments may send a second message to the client computing device that includes a sequence of identifiers representing navigation destinations. After receiving the sequence of identifiers at an API of a native application executing on a client computing device, the client computing device may update a navigation stack of the client computing device to include the sequence of identifiers.

In some embodiments, the update to the navigation stack may cause the addition of a plurality of navigation destination values used to characterize a plurality of screens of the UI to the navigation stack. Alternatively, the program code may be interpretable by a web browser application executing on the client computing device, where the navigation stack of the web browser application may be updated by the set of navigation destination values. In some embodiments, the web browser may perform operations that directly updates a navigation stack with a number of navigation layers representing navigation screens without requiring the web browser to visit a corresponding number of webpages. Alternatively, a web application or browser-based interface may be re-directed through a sequence of navigation screens based on the set of values, where the set of values may include a sequence of URLs. For example, some embodiments may send a message that includes a sequence of re-direction commands to a client computing device. As described elsewhere in this disclosure, after receiving the sequence of re-direction commands, some embodiments may then present a corresponding sequence of navigation screens without requiring user interaction to navigate through the sequence of navigation screens. As described elsewhere in this disclosure, a client computing device may then display navigations screens associated with a sequence of identifiers of a navigation stack in response to a selection of a navigation layer of the navigation stack. For example, after a selection of a 'back' button on an android device, some embodiments may use a constructor method of a destination object to render a navigation screen reflecting the configuration of a destination.

Some embodiments may send program code to a client computing device via a second web message. The program code may include a set of values, where the set values is associated with a sequence of navigation destinations and determined based on a first web message using operations described in this disclosure. In some embodiments, sending the program code may include sending compiled program code for a lesser-memory application to a client computing device. Receipt of the compiled program code by a client computing device may cause the device to execute the compiled program code to generate an instance of the lesser-memory application. For example, after receiving program code via a first web response, some embodiments may set the main view controller for the client computing device to be the view controller of the instance of the lesser-memory application.

Some embodiments may send a web message to a client computing device, where the web message includes program code for a lesser-memory application. Some embodiments may select the program code from a plurality of program code based on an indication of a target operating system platform of the client computing device or other data provided by messages from the client computing device. For example, after obtaining a first message from a client computing device indicating that the device operates on the Android™ platform, some embodiments may select a downloadable package containing Android-specific modules for a lesser-memory application from a plurality of packages. Some embodiments may then send the selected package to the client computing device, where the program code of the package may include or use a set of values representing a sequence of navigation destinations.

In some embodiments, a server may obtain a web message from a lesser-memory application to retrieve a greater-memory application. Furthermore, the lesser-memory application may be a module of a greater-memory application. For example, some embodiments may provide a module of an application to a client computing device, where the module may include a set of features. Some embodiments may determine which of the set of features to download onto the client computing device based on set of activities associated with an invocation URL.

Some embodiments may transfer a stored state from a lesser-memory application to an associated greater-memory application that shares one or more modules with the lesser-memory application. Transferring the state of a lesser-memory application may include storing a current state of the lesser-memory application and a set of previous state values representing previously-used navigation screens of the lesser-memory application. Some embodiments may then use the current state and set of previous state values to determine a set of navigation destination values for a greater-memory application. Some embodiments may then deliver program code for the greater-memory application in conjunction with the set of navigation destination values to the client computing device. For example, after a user taps on a banner being displayed concurrently with a lesser-memory application executing on a computing device, the computing device may send a message having an application identifier for a greater-memory application to a server. In response to receiving the message, some embodiments may determine a set of values representing navigation destinations. Some embodiments may then send program code for the greater-memory application that includes a script or method that causes the greater-memory application to update a navigation stack based on the set of values.

In some embodiments, multiple computing devices may be concurrently updated in response to receiving a web message, where the multiple devices may be updated to display a screen of a UI of a local instance of an application. For example, some embodiments may receive a device identifier for a second device in proximity of a first client computing device via a set of wireless signals. Some embodiments may then send program code to the second device, where the program code may be a duplicate of the program code sent to the first client computing device. Alternatively, the program code for the second device may be different from the program code sent to the first computing device.

In some embodiments, operations of the process 1400 may include updating a learning model based on behavior metrics reported by the client computing device, as indicated by block 1460. In some embodiments, metrics of user behavior may be used to update a learning model to modify the sequence of navigation destinations used to update a navigation stack of a client computing device. For example, a server may select a sequence from different sequences of navigation destinations based on a user record. Alternatively, or in addition, some embodiments may provide different subsets of client computing devices with different types of navigation destination sequences to determine which navigation destination sequence is associated with a greater or lesser metric. For example, some embodiments may update training data with a set of metrics provided by a population of client computing devices, where the set of metrics may indicate an overall score change over a period of time (e.g., a credit change over a one-month period). Some embodiments may use the updated training data to update a machine learning model, such as by performing additional training and testing operations using the updated data to modify biases or weights of a neural network model used to determine a sequence of navigation destinations.

Figure 15:
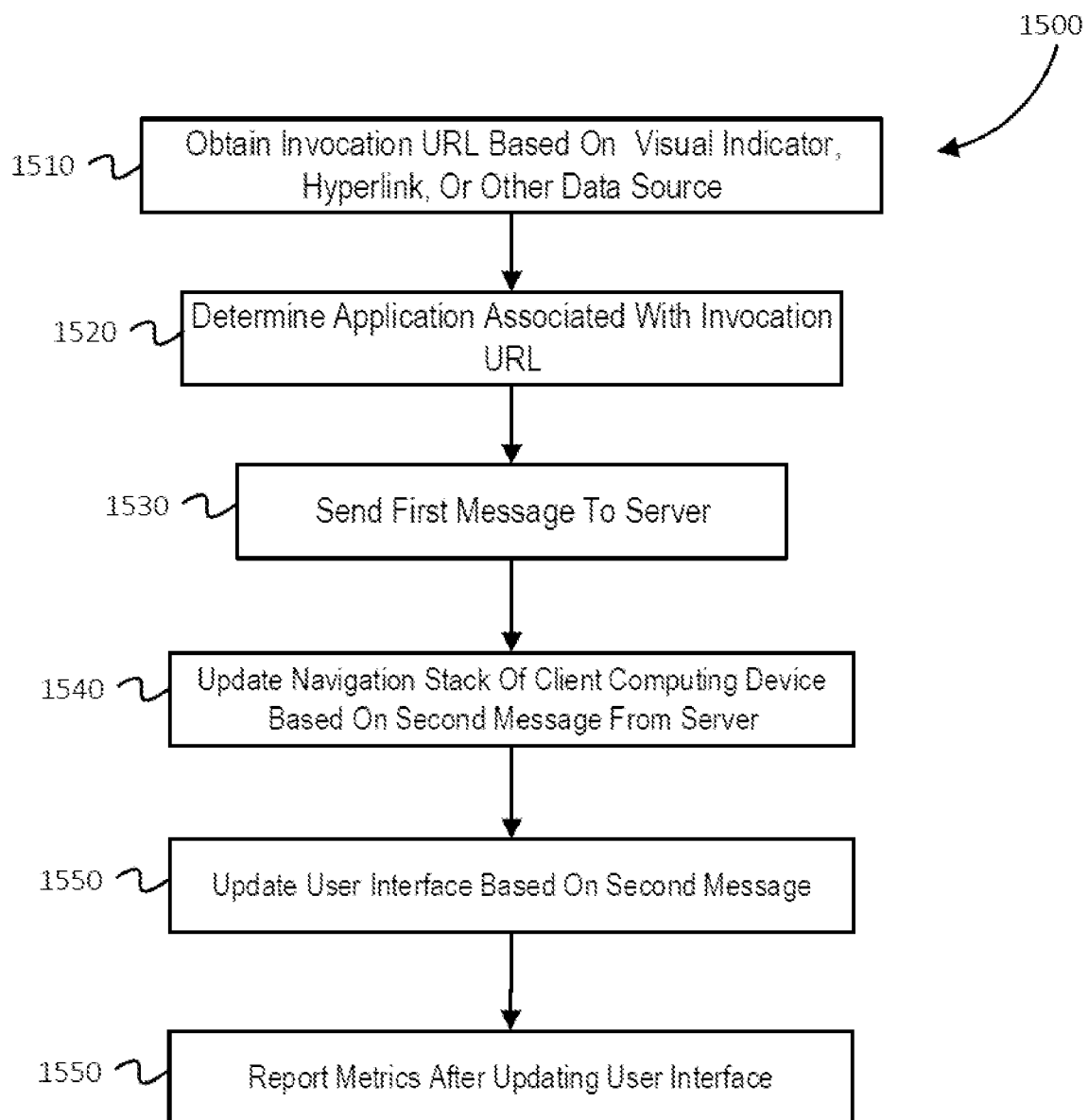
FIG. 15 is a flowchart of a process to update a navigation stack, in accordance with some embodiments of the present techniques.

FIG. 15 is a flowchart of a process to update a navigation stack, in accordance with some embodiments of the present techniques. In some embodiments, operations of the process 1500 may include obtaining an invocation URL, as indicated by block 1510. Some embodiments may use a camera of a client computing device to obtain a URL from a visual indicator, such as a barcode, a QR code, a graphical symbol, or the like. Alternatively, or in addition, some embodiments may use a wireless receiver of a client computing device to receive a wireless message, such as an NFC signal or another type of RFID signal. In some embodiments, the URL may be obtained by a first client computing device may be provided by a second client computing device. For example, the second client computing device may provide the NFC signal that includes the URL. Alternatively, or in addition, some embodiments may obtain the URL from a hyperlink or an interaction with a UI element of a webpage or native application executing on the client computing device.

In some embodiments, operations of the process 1500 may include determining an application associated with the invocation URL, as indicated by block 1520. As described elsewhere in this disclosure, after obtaining an invocation URL, some embodiments may use the invocation URL to query a file or set of values to determine whether a specified application is associated with the invocation URL. For example, some embodiments executing on an android operating system may compare some or all of the invocation URL with a set of URLs stored on an Android manifest file to determine whether an application is associated with the invocation URL on the Android manifest file. Comparing URLs may include parsing the invocation URL to determine a host domain and an associated set of intent values that may be used determine a sequence of navigation destinations for a specified application.

Some embodiments may generate or select an application or application features based on parsed data, where the program code causes the client computing device to activate a specified application. For example, some embodiments may determine that an invocation URL includes a first value "domain1," which matches a domain listed on a manifest file and is associated with the application "app1" in the manifest file. Some embodiments may cause the client computing device to activate the specified application "app1" and send a URL to display a first screen of a UI of the specified application.

Alternatively, some embodiments executing on an iOS operating system may determine that a specified application is associated with the invocation URL based on an associated domain entitlement file. An associated domain entitlement file may include an array of strings encoding a set of key-value pairs domains that are associated with the specified application. For example, a specified application may include or be associated with a URL by including an entitlement file that recites in part, "<string>applinks:www.vkl1.3t6.com</string>," where URLs that include "www.vkl1.3t6.com" may be associated with the specified application.

In some embodiments, a client computing device may select a web browser to use with the invocation URL based on the invocation URL or by default. For example, some embodiments may use the Apple Safari™ web browser, Android Chrome™ web browser, or the like. Some embodiments may determine that the application associated with the invocation URL is a web browser by checking whether there are other applications installed on the client computing device associated with the invocation URL. Based on a determination that no other native application associated with the invocation URL is installed on the client computing device, some embodiments may use the web browser to navigate to the web address identified by the invocation URL.

In some embodiments, operations of the process 1500 may include sending a web message to the server based on the invocation URL using the application, as indicated by block 1530. Some embodiments may send a web message from the client computing device to a server, where the web message may be sent to the invocation URL. As described elsewhere in this disclosure, the invocation URL may include the domain and a set of additional values that may be used by an application or service executing on the server or otherwise usable by the server to obtain a set of navigation destination values.

Some embodiments may send the web message using a specified application associated with the invocation URL. For example, after determining that a specified application is associated with an invocation URL, a client computing device may activate the specified application. The client computing device may then use the invocation URL to send a web request to a server within the context of the specified application, where the specified application may display a first navigation screen of a UI of the specified application.

Some embodiments operating on a client computing device may determine that a specified application is not installed on the client computing device. In response, some embodiments may indicate a lesser-memory application in a web message. Some embodiments may request a lesser-memory application based on a set of application features. For example, in some embodiments, an application feature may be represented as pointers to libraries using a naming convention for identification. Each feature may be associated with a module, where the module may be listed in a manifest file of an application. Some embodiments may then determine a module to retrieve based on the manifest file, where the web request sent to a server may identify the module such that the server provide the module to a client computing device in response.

In some embodiments, operations of the process 1500 may include updating a navigation stack or other data based on a response from the server, as indicated by block 1540. As described elsewhere in this disclosure, the navigation stack of a client computing device may include a navigation stack corresponding to an android application, where the navigation stack is controlled by a navigation controller object of the application, such as an, Android "NavController" object or an Apple "UINavigationController" object. For example, some embodiments may update a UI displayed by a client computing device by changing the destination using a method of an Android "NavController" object. Some embodiments may update the navigation stack based on a set of identifiers of navigation destinations, where each identifier of the set of navigation destination identifiers may represent another navigation layer to add to a navigation stack. Updating a navigation stack may include updating a navigation stack of a specific application executing on a client computing device. For example, an application executing on a client computing device may be associated with a sequence of activities listed in a navigation stack specific to the application. After receiving a sequence of three navigation destination identifiers, some embodiments may push a set of the three navigation layers mapping to the navigation destination identifiers onto the navigation stack in same order as the sequence. Alternatively, or in addition, the navigation stack may include an ordered array controllable by a "UINavigationController" object of an iOS application. Some embodiments may update the ordered array based on the set of navigation destination values. For example, some embodiments may receive a set of navigation destination values that characterize different UI states of a native application installed on the client computing device. Some embodiments may then update the ordered array based on the set of navigation destination values to include at least a first and second navigation layers.

In some embodiments, operations of the process 1500 may include updating a UI based on the response from the server, as indicated by block 1550. Updating the UI may include updating a native application executing on the client computing device, displaying a newly-downloaded lesser-memory application, updating a web app executing in a web browser, or the like. For example, after updating an ordered array of a UINavigationController object of an iOS application, some embodiments may display a UI corresponding with a most recent ViewController object identified by the ordered array. Similarly, after updating a navigation stack, some embodiments may display the current navigation layer of the navigation stack in an android device by using a constructor method of a destination object of the most recent navigation layer. In addition, in response to an interaction with a 'back' button or a similar UI element, some embodiments may select an adjacent identifier listed in a navigation stack and use a constructor method of a destination object identified by the adjacent identifier to display a navigation screen.

Alternatively, in the case of a web application, such as a progressive web application, some embodiments may execute a script that causes the web application or web page to update a browser history using an API of the browser. Alternatively, some embodiments may execute a script of the web application or webpage to automatically navigate through a plurality of web app screens until a destination screen is reached. In some embodiments, the delay between each re-direction operation may be less than 5 seconds, less than 1 second, less than 100 milliseconds, or some other value. After the execution of the script, some embodiments may detect that a user had tapped a 'back' button on an Android device or an iOS device and, in response, display a previous web app screen of the plurality of web app screens. An interaction with a 'back' button on the web browser application may then cause the client computing device to present a navigation screen that is identified or otherwise characterized by the navigation stack.

In some embodiments, operations of the process 1500 may include reporting metrics after updating the UI, as indicated by block 1550. Some embodiments may report metrics measured by a client computing device after updating the UI based on messages sent by a server. For example, an application may obtain metrics indicating types of record changes to an application, a length of time of engagement with an application, a user feedback value, or other metrics associated with an application. Some embodiments may provide the set of metrics to a server after being updated with a set of navigation destination values. For example, some embodiments may report the value by which a user credit limit was increased within six months after a user updates a credit record after being provided with a first set of navigation destination values. As disclosed elsewhere in this disclosure, a server may provide different sequences of navigation destination values based on a user record. Alternatively, or in addition, a server may be used to perform AB testing, where devices that send messages to a shared URL may be provided with different types of navigation destination value sequences to determine which type of navigation destination values sequence is associated with a greater or lesser metric. For example, some embodiments may update training data with a set of metrics provided by a plurality of client computing devices. Furthermore, machine learning operations may be used to determine a sequence of navigation destination values or their associated application navigation destinations. Some embodiments may use reinforcement learning or other self-updating learning operations to update a set of machine learning model parameters based on metrics reported by the UI.

Resource Utilization Retrieval and Modification

Various UI systems provide visualization indicating the utilization of a resource. This utilization may indicate an amount of resource use, rate of resource use, or the like. Resource allocation metrics may be helpful for evaluating that one or more device performance targets are met. Furthermore, various systems may perform one or more operations in response to a determination that a threshold has been satisfied by a measure of resource utilization. Such operations may include allocating more resources, modifying the distribution of resources, or the like. However, in various cases, the outcome of the effect of a value change may be delayed or unpredictable relative to an input. These delays or uncertainties may make appropriate responsive actions difficult to perform in time.

Some embodiments may obtain an indication of a change in resource use from a client computing device. The indication of the change or a data category associated with the indication of change may be used to search for a sequence of previous values associated with previous uses of the resource. Some embodiments may then determine a predicted schedule of changes to resource utilization using a prediction model based on the first value and the sequence of previous values. Some embodiments may then determine whether a set of criteria is satisfied, where the satisfaction of the set of criteria may indicate that a third-party metric is satisfied based on the schedule. Some embodiments may then send a notification message to the client computing device to indicate that the set of criteria is satisfied.

In some embodiments, additional operations may be performed to secure or accelerate resource management operations. For example, some embodiments may lock a database field and prevent a database transaction from updating the field. In addition, some embodiments may perform operations to update a prediction model based on updates to a training set that includes changes in a set of utilization values. For example, some embodiments may update a set of model parameters of a neural network after receiving an indication that a training dataset has been updated, where a trigger to update the training dataset may be based on an initial statistical computation indicating that a change in a value (e.g., mean credit score change with respect to mean change in credit utilization) is exceeds an expected value threshold or an expected range of values. Some embodiments may reduce neural network training operations over an application lifecycle by using statistical analysis to determine when to cause additional neural network training.

FIG. 1 is a schematic diagram of a first computing environment in which a score stored in an account may be updated, in accordance with some embodiments of the present technique.

FIG. 2 is a logical and physical architecture block diagram illustrating a computing environment in which various learning infrastructure may be implemented with the present techniques in accordance with some embodiments.

FIG. 3 is a flowchart illustrating a process to provide and obtain data via a UI, in accordance with some embodiments of the present techniques.

FIG. 4 is a flowchart illustrating a process to encrypt and decrypt data across accounts, in accordance with some embodiments of the present techniques.

FIG. 5 shows an example of a computing device by which the present techniques may be implemented.

FIG. 6 is a flowchart of a process configured to update encrypted data, in accordance with some embodiments of the present techniques.

FIG. 7 is a flowchart of a process configured to determine an output based on a decryption key, in accordance with some embodiments of the present techniques.

FIG. 8 is a flowchart of a process configured to update a variable based on a combined value, in accordance with some embodiments of the present techniques.

FIG. 9 is a schematic diagram of a first computing environment in which a score stored in an account may be updated, in accordance with some embodiments of the present technique.

FIG. 10 is a flowchart of a process configured to provide and obtain data via a combined interface in a cloud-based environment.

FIG. 11 is a logic and physical architecture block diagram illustrating a computing environment in which the asynchronous query caching may be implemented with the present techniques, in accordance with some embodiments.

FIG. 12 is a flowchart of a process configured to cache queries, in accordance with some embodiments of the present techniques.

FIG. 13 is a logic and physical architecture block diagram illustrating a computing environment in which navigation path generation may be implemented, in accordance with some embodiments of the present techniques.

FIG. 14 is a flowchart of a process to provide data that updates a navigation stack, in accordance with some embodiments of the present techniques.

FIG. 15 is a flowchart of a process to update a navigation stack, in accordance with some embodiments of the present techniques.

Figure 16:
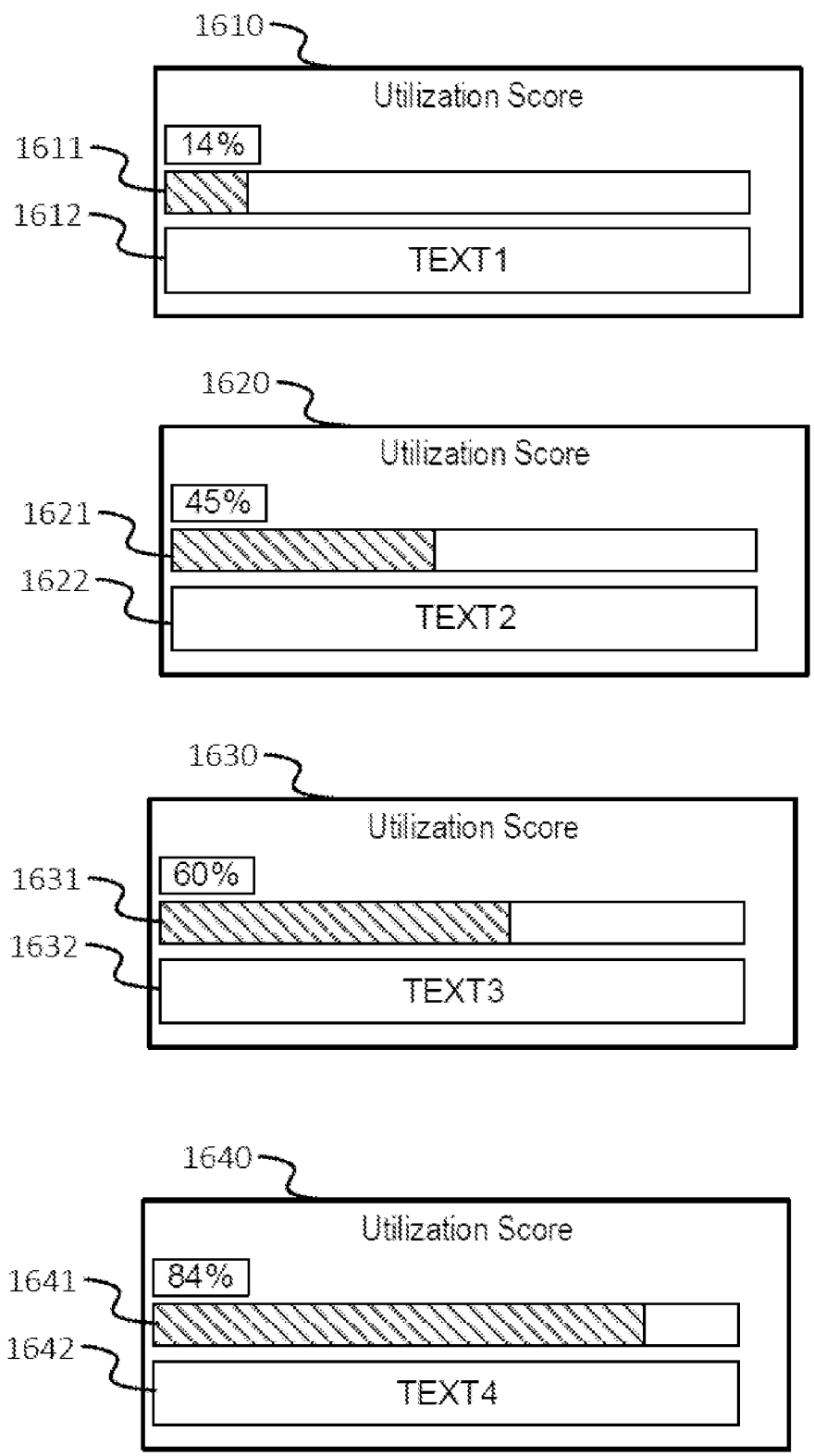
FIG. 16 shows a set of example user interfaces, in accordance with some embodiments of the present techniques.

FIG. 16 shows a set of example user interfaces, in accordance with some embodiments of the present techniques. The UIs 1610, 1620, 1630, and 1640 show an example navigation screen at 14% resource utilization, 45% resource utilization, 60% resource utilization, and 84% resource utilization, respectively. In some embodiments, the resource utilization values indicated by the UI 1610, 1620, 1630, and 1640 may represent a credit utilization, such as an amount of credit being used with respect to a total amount of credit available. As described elsewhere in this disclosure, some embodiments may obtain an indicated change in resource utilization via a web message. For example, the resource utilization value indicated by the UI 1610 may have been increased to the resource utilization value indicated by the UI 1620 based on a web request provided by a client computing device, such as a smartphone or tablet. In some embodiments, the UI element may display additional information from one or more third-party sources or provide a link to an external webpage.

In some embodiments, some of the data used to construct the UIs 1610, 1620, 1630, and 1640 may display additional information from one or more third-party sources. For example, some embodiments may obtain the data from an API of a third-party server. Furthermore, some embodiments may combine data from different data sources. For example, some embodiments may obtain a set of three different FICO™ scores via a file transfer protocol system (FTPS) or a plurality of APIs, such as the CSID API of Experian™. Some embodiments may then generate a weighted sum based on the set of three different FICO™ scores to determine an aggregate score.

In some embodiments, the resource may be a computing resource such as an amount of processor time, an amount of memory, a network parameter, or the like. Some embodiments may also generate one or more alerts based on the resource utilization score satisfying a set of alert criteria, such as by being equal to or greater than an alert threshold. In some embodiments, the appearance of the UI 1610, 1620, 1630, and 1640 may change based on the range of the resource utilization. For example, some embodiments may display different colors for a set of graph bars 1611, 1621, 1631, and 1641. Alternatively, or in addition, some embodiments may update text, background, or borders of the UI elements. For example, some embodiments may display the graph bar 1611 as green in response to a determination that a corresponding resource value is between 0% and 30%. Various other colors are possible. For example, some embodiments may set the color of the graph bars 1621, 1631, and 1641 to yellow for values between 30% to 60%, orange for values between 60% and 75%, or red for values between 75% and 100%.

In some embodiments, each of the UI elements 1612, 1622, 1632, and 1642 may be updated based on the resource utilization value. For example, "TEXT1" of UI element 1612 may include the text "Your utilization is low, stay in this range," UI Element 1622 may include the text "Your utilization is close to the 160% threshold. Address issue [[here]]." In some embodiments, the text "[[here]]" may be linked to another page or otherwise cause the display of a UI element that allows a user to update the utilization value. For example, some embodiments may display a UI element that permits a user to pay an amount owed for a credit account, which then causes the corresponding resource utilization to update.

Figure 17:
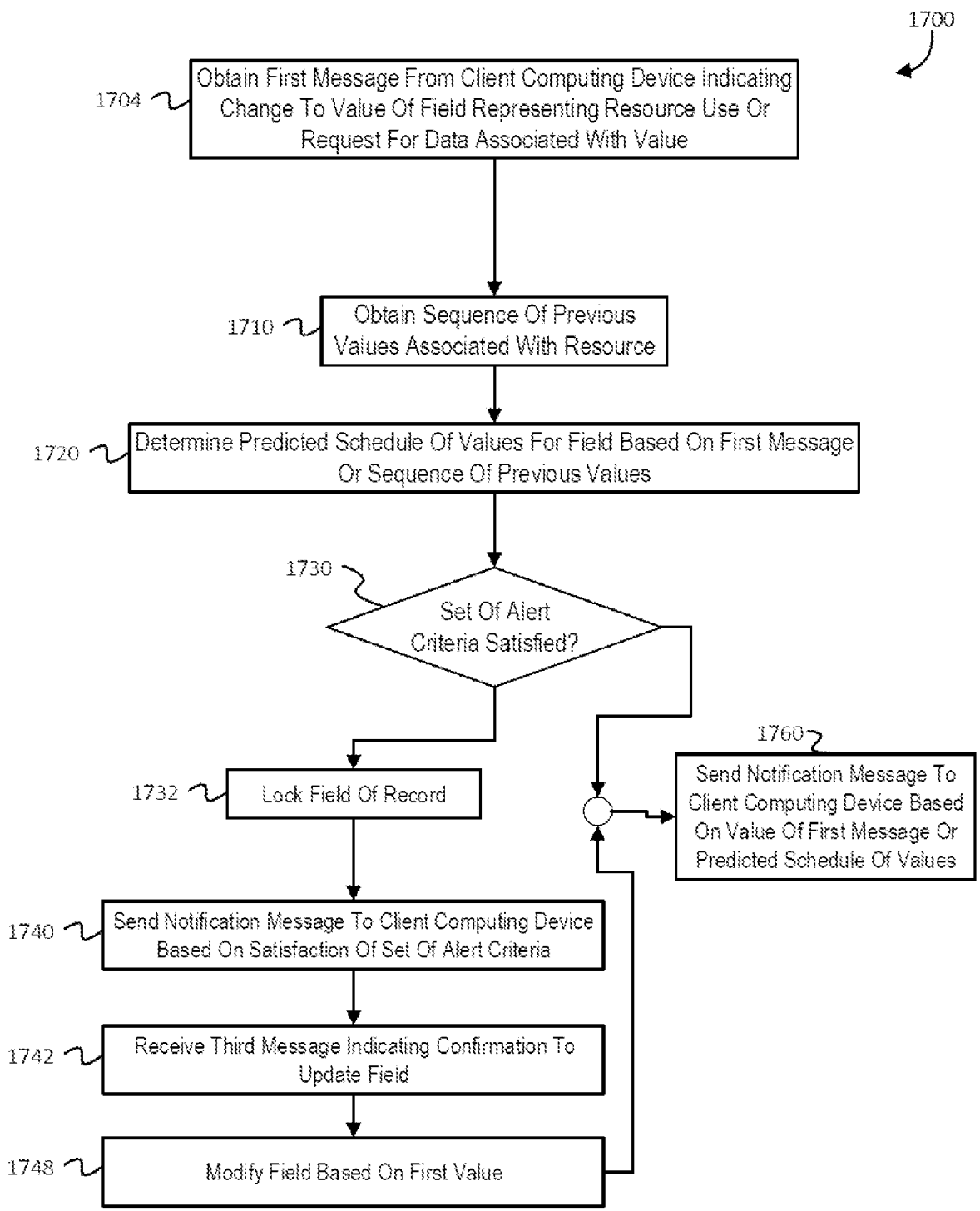
FIG. 17 is a flowchart of a process to update a resource allocation value and associated interface with a server, in accordance with some embodiments of the present techniques.

FIG. 17 is a flowchart of a process to update a resource allocation value and associated interface with a server, in accordance with some embodiments of the present techniques. In some embodiments, operations of the process 1700 may include obtaining a first message from a client computing device, the first message indicating a change to a value of a field representing resource utilization or a request for data associated with the value, as indicated by block 1704. In some embodiments, the first message may include a request for a value. For example, some embodiments may receive an HTTP web request from a web browser or other application executing on a client computing device, where the HTTP web request may include a value used to update a record. In some embodiments, The HTTP web request may indicate a request for a utilization value that is directly stored in a field of a record or other type of data structure. Alternatively, some embodiments may receive a web message from a client computing device indicating a request for a computed value representing a resource utilization value. For example, some embodiments may receive a request from a client computing device that comprises a set of database query commands to determine resource utilization as a ratio of a used resource and a maximum allocatable resource, such as a credit utilization ratio.

Some embodiments may receive a request to retrieve a value or modify the value using a voice user interface (VUI). For example, some embodiments may provide integration with the natural language speech platform such as Google Voice Assistant™, Amazon Alexa™, Apple Siri™, or the like. For example, some embodiments may receive a message based on a vocal query such as, "Alexa, what's my credit utilization?" As described elsewhere in this disclosure, some embodiments may, in response, provide a ratio value such as "12%" that may then be visually displayed or be used to generate an audio form of "12%" using the natural language speech platform.

In some embodiments, the first message may include a value indicating a change in resource utilization, where the value may be used to change a field of a record. For example, a client computing device send a set of values to a server to increase an allocation of memory to a database, where the first message may be sent via an HTTP web request, or another web request. In addition, the first message may include a plurality of values, where the plurality of values may represent a sequence of modifications to change the value of a field of a record. For example, some embodiments may receive a first message that indicates a first amount of resources to allocate at a first time and a second amount of resources to allocate at a second time.

In some embodiments, the resource being utilized may be a computing resource, such as an amount of memory, processing power, bandwidth, licenses to use a specified API, or the like. For example, some embodiments may receive a command to modify a memory allocation change indicating a change in the amount of memory that a virtual server is to allocate to a specified account. Alternatively, the resource being utilized may be another type of resource, such as financial credit, energy consumption, or the like. For example, some embodiments may receive instructions to modify a credit use from a client computing device such as a smart card reader, cell phone, tablet, kiosk, or the like.

In some embodiments, the first message may indicate that the value may be used for simulation purposes. For example, some embodiments may receive a first message from a client computing device that is received at an API of an application used to simulate a set of outcomes. Alternatively, or in addition, the application may perform operations to simulate modifying a field based on the field. Furthermore, the application may perform operations to determine a predicted schedule of additional changes to the field using one or more operations described in this disclosure.

In some embodiments, operations of the process 1700 may include obtaining a sequence of previous values associated with the resource, as indicated by block 1710. The sequence of previous values may represent a sequence of previous resource utilizations. For example, a sequence of previous values may include "[10%, 25%, 15%]," where the percentile values may represent the set previous resource utilizations for a three-month period. The sequence of previous values associated with the resource may be obtained from a record that is identified by a user identifier or otherwise includes the record. For example, some embodiments may receive a message requesting a credit utilization value for a user, where the message includes an identifier of the user. Some embodiments may then retrieve the credit utilization value from a first record stored in a SQL database and retrieve a set of previous credit utilization values from the first record or a set of additional records having indices identified by other values of the first record.

In some embodiments, a sequence of previous values representing a sequence of previous resource utilizations may be stored as a sequence of pairs, where each pair includes a value and a time associated with the value. In some embodiments, the time may be stored as a string, set of numeric values written in an established timestamp format such as the UNIX timestamp format, or some combination of strings, numeric values, symbols, or the like. For example, the sequence of previous values may include a first set of values and a first set of corresponding timestamps stored as an array "[[1625940499, 3.70], [1626016099, 900.31], [1626177680, 100.22]]" to represent that a sequence of changes that occur at different times. Some embodiments may interpret the first set of values as indicating that a resource utilization was increased by 3.7 on Jul. 10, 2021 6:08 PM GMT, that the resource utilization was also increased by 900.31 on Jul. 11, 2021 3:08:19 PM GMT, and that the resource utilization was also increased by 100.22 on Jul. 13, 2021 at 12:01:20 GMT. In some embodiments, the sequence of previous values may be stored with their corresponding sequence of timestamps in a same data structure. Alternatively, or in addition, the sequence of previous values and the corresponding sequence of timestamps may be stored in their own respective data structures. In some embodiments, a first record or a first plurality of records may include the sequence of previous values, and where a second record or second plurality of records may include the corresponding sequence of timestamps.

Some embodiments may transform a set of values to determine a resource utilization value, where the resource utilization value may be provided as a ratio, product, or other output of a function. For example, the value of a borrowed amount field and the value of a total available amount may be used to determine a resource utilization value. If the value of a borrowed amount field is 50 and the value of a total amount field is 100, some embodiments may determine that the utilization metric is 50% based on a division of 50 by 100. Some embodiments may perform a transformation operation to determine some or all of the sequence of previous values.

Some embodiments may determine a value indicating resource utilization based on a measure of central tendency of a set of three values, such as a mean average credit utilization rate across three different accounts. Some embodiments may adaptively generate alerts for a utilization rate based on additional information, such as a credit score. For example, some embodiments use one or more alert thresholds, where some embodiments may determine that a first alert threshold is satisfied if a corresponding first user associated with a score less than a score threshold (e.g., less than 700) has a utilization value greater than 50%. Alternatively, or in addition, some embodiments may determine that a second alert threshold is satisfied if a corresponding second user associated with a score greater than a score threshold (e.g., greater than 699) has a utilization value greater than 30%. Some embodiments may determine a score based on a plurality of other scores obtained from different data sources. For example, some embodiments may obtain a set of three different scores via three different APIs and determine an aggregated score by determining the weighted sum of the three different scores.

Some embodiments may obtain one or more values from an in-memory data store. For example, as described elsewhere in this disclosure, some embodiments may cache a resource utilization value in an in-memory data store, such as a Redis database, where the utilization value may be associated with a first query. Some embodiments may then obtain a second query and perform operations to determine whether the second query shares a set of parameters with the first query. Some embodiments may then determine that the second query shares a set of parameters with the first query. In response, some embodiments may retrieve the resource utilization value from the in-memory data store to perform one or more other values described in this disclosure, such as including the retrieved value for inclusion in the sequence of values.

In some embodiments, operations of the process 1700 may include determining a predicted schedule of values for the field based on the first message or sequence of previous values, as indicated by block 1720. In some embodiments, the predicted schedule values may represent an anticipated set of changes for a value. The sequence of previous values and the value provided in the message may be used as inputs for a prediction model to determine a set of predicted outputs. The set of predicted outputs may include a predicted future quantity for a record field, a predicted future change in the record field, a predicted future category change in the record field, or the like. Furthermore, some embodiments may determine a utilization value based on the values of multiple fields of different records associated with each other by a shared user identifier. For example, some embodiments may determine an aggregate utilization based on two utilization values for two different resource utilization accounts, a value weighted by a user-specific score amount, a value weighted or supplemented by a stored amount, or the like.

In some embodiments, the schedule of predicted changes may include an anticipated change based on a value provided via the first message. For example, some embodiments may receive instructions to increase a record value via a first message. Some embodiments may use the value as an input to predict a future change or set of changes. Furthermore, some embodiments may use the sequence of previous values described elsewhere for the process 1700 to predict a schedule of future changes using a prediction model.

In some embodiments the prediction model may include a neural network. For example, some embodiments may use a transformer neural network model to predict a sequence of value changes. For example, some embodiments may train a transformer neural network to perform predictions for future values over a duration of time. Using a transformer neural network to predict a schedule may include the timestamps associated with scalar values (e.g., timestamps indicating when a credit utilization changed, timestamps indicating when an amount of a resource was consumed or allocated, etc.) into a corresponding set of time embeddings. For example, some embodiments may decompose each time value to a linear component and a set of Fourier-transformed frequency-domain functions based on the time values, where both the linear component and set of frequency-domain functions include a set of weights that may be updated via a neural network training operation. Some embodiments may then use the set of frequency-domain functions as tokens and value-waveform token pairs as inputs for a set of attention values for the transformer neural network. Some embodiments may then use multi-headed self-attention based on the set of attention values to determine a set of matrices. Some embodiments may then use the set of matrices to determine a predicted schedule, where the schedule may include set of predicted values and an associated set of predicted times for those values.

Some embodiments may implement one or more operations described in this disclosure using a cloud computing infrastructure. For example, some embodiments may include or use a GraphQL server, a Web Server Gateway Interface (WSGI)-type web server (e.g., a server capable of operating a micro web framework such as Flask). Some embodiments may include one or more applications running on an Amazon™ Elastic Compute Cloud (EC2) service that may include an Auto Scaling group and one or more Postgres databases to store user account data. Some embodiments may use other databases, such as Redis, and may further cache data in a memory cache, such as Amazon™ Elasticache. For example, some embodiments may cache credit account information or results based on the credit account information using an in-memory data store database such as Redis and may use a cloud computing cache system for such in-memory databases, such as Amazon™ Elasticache. Some embodiments may perform operations to reconcile inconsistency between the versions of a utilization value stored in persistent storage, an in-memory database, or on a client computing device. For example, some embodiments may determine which of the versions was most recent and distribute the most recent version to other stored values. Some embodiments may use a hash value to index an identifier associated with the utilization value (e.g., the user account associated with the utilization value) and decrease the amount of time needed to distribute or update the utilization value.

Some embodiments may store a first value for a utilization field in persistent memory on a server or other centralized repository before pushing the first value to a mobile computing device. For example, some embodiments may reconcile a set of transactions across a day or week to determine a first utilization value used to fill a database field indicating utilization, such as a value indicating an absolute total amount borrowed, a ratio indicating an amount being borrowed relative to a total amount of credit or the like. The set of transactions may be obtained from a database of a server being used to operate one or more of the processes described in this disclosure, be obtained from a user-provided input, be obtained from a third-party source (e.g., obtained via an API in communication with a third-party server), or the like. For example, some embodiments may obtain transaction data stored in each row of a database provided by one or more third-party entities. Some embodiments may receive data from one or more repositories of a set of third-party servers such as batch credit information, a real-time change in a daily amount, and an amount for pending or otherwise unconfirmed transactions. Additionally, some embodiments may update the first utilization value based on a transaction amount instead of storing each individual transaction, which may reduce memory requirements on the server or other computing device used to store data. In some embodiments, data provided by a third-party entity or sent to a third-party entity may be independently encrypted. For example, some embodiments may re-encrypt data provided that was already encrypted by a third-party after the encrypted data is received at an API.

Some embodiments may then store a first utilization value in a database stored in persistent memory or an in-memory database. Some embodiments may use an in-memory database to increase performance efficiency during real-time operations. For example, some embodiments may obtain a utilization value from an in-memory database stored on cache. Using an in-memory database instead of or in addition to a database storing values in a persistent memory system may reduce the time required to provide a utilization value in response to a request for the utilization value.

Some embodiments may perform operations in the domain of integer linear programming or mixed integer programming to predict a set of outcomes. Some embodiments may use these predicted outcomes to compute an optimal balance of decisions to achieve a specific integer range or category. Some embodiments may perform operations such as using a simplex algorithm or an integer linear programming (ILP) algorithm to determine a combination of resource utilization and resource release operations to satisfy a set of thresholds using a cutting plane method, branch and bound methods, or the like. For example, some embodiments may determine a schedule of account-modifying actions that include credit utilization amounts, credit payment amounts, loan repayment amounts, credit increases, or the like to maintain a credit score that is greater than 700 by using a branch and cut method. Using a branch and bound method such as a branch and cut method may include converting actions into parameters of a linear program, such as converting a credit utilization amount into a component of a linear program and then performing a set of pivot operations. During each pivot operation, some embodiments may modify a set of linear program parameters until an optimized set of values has been determined that satisfies a set of constraints on the linear program parameters.

Some embodiments may determine a predicted schedule of values using a neural network to perform a mixed integer programming optimization operation. For example, some embodiments may use a neural diving operation and a neural branching operation to generate a predicted schedule of values using one or more operations described by Nair et al (Nair, V., Bartunov, S., Gimeno, F., von Glehn, I., Lichocki, P., Lobov, I., O'Donoghue, B., Sonnerat, N., Tjandraatmadja, C., Wang, P. and Addanki, R., 2020. Solving mixed integer programs using neural networks. arXiv preprint arXiv:2012.13349), which incorporated herein by reference. Performing a neural diving operation may include using a first neural network model having three or more layers of neurons to produce a set of partial assignments for a set of integer variables used as inputs. The first neural network model may be trained to increase the likelihood that the partial assignments will produce a greater objective value, where the objective value may correspond with a target value such as an increased credit score. The input integer variables of the first neural network may include values representing a resource allocation being above a first threshold, within a threshold range, or below a second threshold.

The set of partial assignments of an input integer variable may be combined to form an initial set of possible actions and a corresponding set of branches based on the set of possible actions. Some embodiments may then use a second neural network model to explore branches of possible outcomes in order to determine a determining a full assignment of integers. Some embodiments may have trained the second neural network using a set of training policies, where the trained second neural network may select which branches of possible outcomes to explore. After determining a full assignment of integers, some embodiments may then convert the integers into a schedule of values, such as a value indicating an increase or decrease in resource utilization.

In some embodiments, operations of the process 1700 may include determining whether a set of alert criteria is satisfied based on the predicted schedule of values, as indicated by block 1730. In some embodiments, the set of alert criteria may be based on whether a set of thresholds are satisfied. For example, some embodiments may use a utilization rate of 50% as a threshold. In response to a determination that a predicted schedule of values includes at least one value that exceeds 50%, some embodiments may determine that the set of alert criteria is satisfied. Alternatively, or in addition, some embodiments may use multiple alert criteria. For example, an embodiment may determine that a value of a predicted schedule has a utilization rate that exceeds 20% for a user record that satisfies the set of alert criteria if the user record is associated with a credit score that is less than 700.

Some embodiments may perform one or more predictive operations to determine whether an anticipated allocation amount will satisfy an alert threshold or other thresholds. For example, some embodiments may use a neural network or other machine learning model to determine whether an alert threshold will be satisfied based on inputs such as a stored utilization amount, a pending transaction amount (e.g., data obtained from a data transfer network such as the Plaid™ transaction network), a stated income amount, a stored bank account amount, a pending loan amount, or the like. Some embodiments may use the prediction to intelligently generate alerts for a user to indicate one or more values. For example, some embodiments may use a supervised neural network to take, as inputs, the utilization rate of a computing resource or a predicted schedule of values indicating future resource use to determine whether a stated allocation amount will be surpassed at any given time within a duration.

Some embodiments may determine other types of values, such as a credit score. Some embodiments may determine a plurality of credit scores or other types of scores using a prediction model or set of prediction models based on a value provided via message or a sequence of previous values. Some embodiments may then determine a measure of central tendency based on a plurality of credit scores to determine whether a numeric threshold is satisfied based on the measure of central tendency. For example, some embodiments may determine a mean credit score based on a predicted plurality of credit scores. In response to a determination that the mean credit score satisfies a numeric threshold, such as being below the alert threshold value, some embodiments may determine that a set of alert criteria is satisfied.

Some embodiments may then update a threshold amount for a user, where satisfying the threshold amount may indicate that at least one stated allocation amount for a user will be surpassed or that the likelihood of the user surpassing a stated allocation amount is greater than or equal to a likelihood threshold. For example, satisfying a threshold amount may indicate that a user is likely to have expenses and repayment obligations that surpass the stated allocation amount, where the probability associated with the likelihood may be greater than 10%, greater than 25%, greater than 50%, greater than 90%, or the like. As another example, some embodiments may use a trained neural network that takes, as input, a stated income, an outstanding loan amount, a current credit utilization amount, and a history of previous purchases or expenses to determine whether an individual will be paying or otherwise owing more than they can provide within a period. Some embodiments may then generate a set of credit alerts based on a credit borrowing amount indicated as likely (e.g., more than 10%, more than 25%, more than 50%, more than 90%) to cause an inability to pay a threshold amount or pay the full amount within a period.

In some embodiments, satisfying the set of criteria may include satisfying a criterion based on the results of a multidimensional analysis operation. For example, some embodiments may treat one or more of the fields as dimensions in a multidimensional array and perform multidimensional feature extraction operations or feature selection operations to determine one or more values representing a signature of resource use. Such operations may include PCA, encoder/decoder operations, LDA, or the like. Some embodiments may perform these operations on a server and provide the results to a client computing device, which may reduce a computation time or time required to execute one or more instructions. For example, some embodiments may use a PCA analysis function executing on a server to determine a set of principal components based on a sequence of credit changes that includes a predicted schedule of values or a sequence of previous values. Some embodiments may then determine whether the set of principal components satisfies a digital signature of components that indicates an anomaly. In response to a determination of an anomaly, as discussed elsewhere in this disclosure, some embodiments may send a notification message to a client computing device indicating the anomaly. In response to a determination that the set of criteria is satisfied, operations of the process 1700 may proceed to block 1732. Otherwise, operations of the process 1700 may proceed to block 1760.

In some embodiments, operations of the process 1700 may include locking the field of the record, as indicated by block 1732. Some embodiments may lock a field of a record by directly locking the record in a database or locking the field of the record in a database. For example, some embodiments may prevent and reverse database transactions affecting a locked record. Alternatively, or in addition, some embodiments may lock the field of a record by preventing the use of a set of operations that change to the field, where another set of operations may change the field. For example, some embodiments may lock the field of a record by preventing a first set of requests from modifying the value of a record, where the first set of requests is provided by a client computing device, where a second set of requests provided by a system administrator is permitted to modify the field.

In some embodiments, operations of the process 1700 may include sending a second message to the client computing device based on a determination that the set of alert criteria is satisfied, as indicated by block 1740. As described elsewhere in this disclosure, some embodiments may determine that a set of alert criteria is satisfied and send a message to a client computing device to display a notification. In some embodiments, as described elsewhere in this disclosure, a client computing device may be running an instance of an application that is executing program code which causes the client computing device to display a notification based a Boolean or categorical value.

Some embodiments may then provide a resource utilization value to an application executing on a client computing device via a second message. For example, some embodiments may provide a second message to an application such as a web browser or native application executing on a desktop computing, a laptop, a smartphone, a tablet, a VR headset, or the like. Some embodiments may update a locally stored set of values with a second set of values representing additional transactions since the last time the first utilization was provided. For example, some embodiments may receive the resource utilization value from a first database based on a profile value (e.g., a user identifier, an account number, or the like) of the user account, where the first resource utilization value was provided at 2 AM every day. Some embodiments may then provide a second set of values representing the resource utilization value after the processing of transactions that have been performed since the first utilization value was provided at 2 AM, where the updated value may replace the local version of the resource utilization value.

Some embodiments may send a notification message based on a selected communication channel with a client computing device. A communication channel may include a SMS or MMS network, a broadband cellular network such as a 5G network, a Wi-Fi connection, a Bluetooth connection, or the like. Some embodiments may select different communication channels to use for different user accounts or different client computing devices based on metrics such as response times, response rates, or the like. For example, some embodiments may obtain a plurality of response times, where each respective response time may be assigned to a different communication channel. Some embodiments may then select a communication channel based on the plurality of metrics, such as selecting SMS messaging based on SMS messaging being associated with the least response time. Some embodiments may then send a notification message or another message described in this disclosure via the selected communication channel.

In some embodiments, operations of the process 1700 may include receiving a third message indicating a confirmation to update the field, as indicated by block 1742. Some embodiments may send a confirmation request to a client computing device based on a determination that a set of criteria is satisfied. Some embodiments may further determine whether a user is permitted to increase an allocation limit and, in response to an affirmative determination, provide a vocal prompt to a user to ask the user if they would wish to increase their allocation limit.

In some embodiments, operations of the process 1700 may include modifying the field based on the first value, as indicated by block 1748. As described elsewhere in this disclosure, some embodiments may lock a record or a field of a record to prevent updates to the record or the field, respectively. After receiving a confirmation message from a client computing device, some embodiments may unlock a locked record or a locked field of the record. For example, after receiving a confirmation message indicating a confirmation to permit a transaction to occur that will change a record value from 9105 to 4105, some embodiments may perform an unlocking operation by setting a local variable of an object or a global variable of an application to permit one or more operations to modify the record value. Once the field is modified, some embodiments may send another notification message to a client computing device using operations similar or the same those described for block 1760.

In some embodiments, operations of the process 1700 may include sending a notification message to the client computing device based on the value of the first message or the predicted schedule of values, as indicated by block 1760. As described elsewhere in this disclosure, some embodiments may send a notification indicating that a value of a record has changed. For example, some embodiments may send a notification that visually shows a credit utilization value in a GUI. Alternatively, or in addition, some embodiments may convert the text of the notification into an audio stream that is then played by a client computing device. In some embodiments, the notification message based on the value of the first message as described by block 1760 may be different from the notification message described by block 1740. Alternatively, the notification message based on the value of the first message as described by block 1760 may be combined with the notification message described by block 1740.

Some embodiments may include a hyperlink with a notification message to a client computing device based on the first value or schedule of values. For example, some embodiments may send a message that comprises a sequence of navigation destinations to a client computing device. As described elsewhere in this disclosure, the sequence of navigation destinations may include a sequence of destination identifiers interpretable by a navigation object of an application executing on a client computing device. Alternatively, or in addition, some embodiments may provide a sequence of values that may characterize properties of one or more UI elements of a navigation screen, such as a UI element shape, size, color, or the like. After detecting an interaction with the hyperlink or other UI element, a client computing device may be caused to navigate to a target navigation destination and update its corresponding navigation stack based on the sequence of navigation destination identifiers. For example, after detecting an interaction with a hyperlink, some embodiments may generate or otherwise update a URL that links to a webpage that displays field value. After receiving a first message from the client computing device addressed to the URL, some embodiments may send a sequence of navigation destination identifiers (e.g., a sequence of application destinations, a set of URLs, or the like) via a second message. In some embodiments, the second message may cause a client computing device to update its navigation stack based on the sequence of navigation destination identifiers.

Some embodiments may determine that a first notification message was not read based on an indication from a client computing device that the first notification was not received or that the first notification was not read. Alternatively, or in addition, some embodiments may determine that a first notification was not received based on a lack of communication from the client computing device. In response to a determination that a first notification message was not read or received, some embodiments may send a second notification message to a second client computing device. For example, after sending a first notification message to the first client computing device 1310, some embodiments may send a second notification message to the second client computing device 1391.

In some embodiments, the notification messages sent to different devices may share a message value. For example, a first notification message sent to the first client computing device 1310 and a second notification message sent to the second client computing device 1391 may share a message value such as an account identifier or the value of a field of a user record. Some embodiments may first determine that the second client computing device is within a geographical range of the first client computing device before sending the notification message to the second client computing device. For example, some embodiments may obtain geolocation coordinates for the first and second devices and determine the physical distance between the two devices. Some embodiments may then determine whether the physical distance is less than a distance range. In response to a determination that the physical distance is less than the distance range, some embodiments may then send a second notification message to the second computing device. For example, some embodiments may search through a set of device identifiers that include an identifier of the second computing device, select the second device based on the geographical distance, or the like. For example, in response to a determination a physical distance between the first and second client computing devices 1310 and 1391 is less than a distance range of 5 meters, some embodiments may send a second notification message to the second client computing device 1391.

Some embodiments may send a notification message or another message described in this disclosure to a second device via a first device. For example, some embodiments may send a notification message to a first client computing device, such as a smartphone. The notification message may include program code, parameters, or another set of values that causes the first device to then transmit the notification message to second client computing device, such as another smartphone, a tablet, a smartwatch, a headset, or the like. For example, in some embodiments, the server system 1320 may send a notification message to the first client computing device 1310, where the first client computing device 1310 may then send the notification message to the second client computing device 1391 via a set of wireless signals.

In some embodiments, the notification messages sent to different devices may be used to confirm a transaction. For example, some embodiments may detect a second record associated with a second user account based on a shared value, such as a shared account identifier or shared device identifier. In some embodiments, the notification message sent to the first or second client computing device may include a button, slider, or another interactive UI element. A client computing device may then send a permission value to a server in response to detecting an interaction with the interactive UI element. In response to receiving the permission value, some embodiments may transfer an amount from a field of the second record to a field of the first record. For example, some embodiments may cause a client computing device to display a navigation screen having a UI element that, when interacted with, may send a permission value to a server that causes the server to transfer a resource allocation amount from a first user record to a second user record. In response to receiving the permission value, some embodiments may then transfer a resource allocation amount of a computing resource from a field of the second record to a field of the first record.

Figure 18:
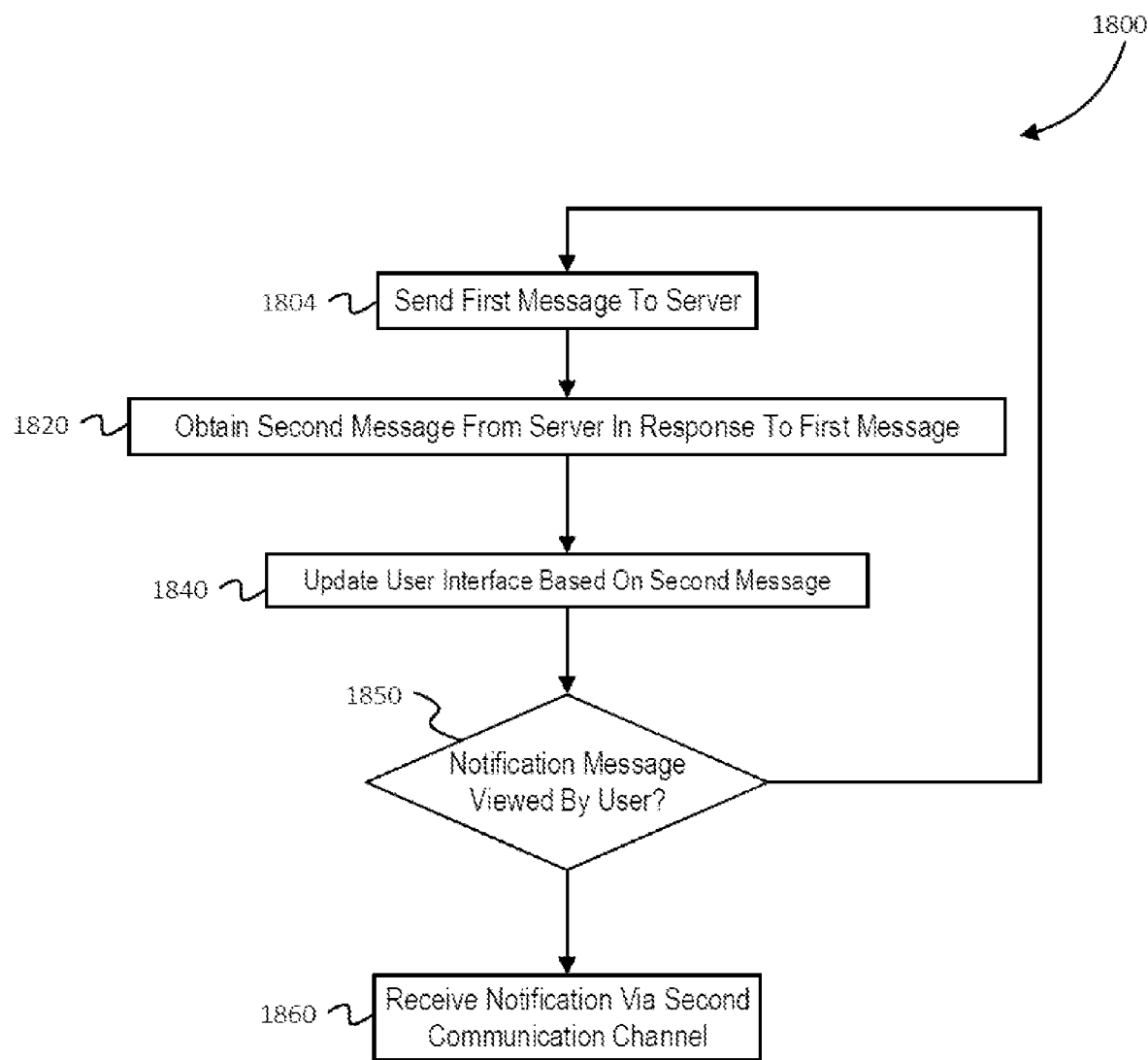
FIG. 18 is a flowchart of a process to update a resource allocation value and associated interface with a client computing device, in accordance with some embodiments of the present techniques.

FIG. 18 is a flowchart of a process to update a resource allocation value and associated interface with a client computing device, in accordance with some embodiments of the present techniques. In some embodiments, operations of the process 1800 may include sending a first message to a server, as indicated by block 1804. Operations to send the first message from the server may include one or more operations described in this disclosure. For example, some embodiments may send a web request transmitted through a wireless signal to a server, where the web request may provide one or more values to the server and expect the fulfillment of one or more promises of the web request. As described elsewhere in this disclosure, the first message may include a request for data used to display one or more UI elements.

In some embodiments, the first message may include one or more values stored on a local memory of the client computing device. For example, some embodiments may obtain a set of requested database transactions that are stored on a local persistent memory or local in-memory cache of a client computing device during a period where the client computing device is unable to access a network. Some embodiments may then provide the stored values from the in-memory cache or the local persistent memory to a server via a first message once the client computing device is connected to a network capable of communicating with the server.

Some embodiments may be implemented via a web browser or within the context of the native application of a mobile computing device. For example, some embodiments may include or be in communication with an application that can be implemented as a native App Clip of an iOS device, further described in https://developer.apple.com/documentation/app_clips, which is incorporated herein by reference. Some embodiments may prompt a user for permission to access private data or to access third-party data associated with the user. Some embodiments may also ask for verification from the user. For example, some embodiments may request a fingerprint confirmation, perform a facial recognition operation, request a passkey or pass-symbol, or the like. Some embodiments may provide UI advantages by avoiding a request to install a new application onto a computing device and instead operating within the context of an existing application of the computing device. For example, some embodiments may determine that a user is making a credit card purchase using a web browser and, in response, provide a UI element indicating a credit utilization amount based on the credit card purchase. Some embodiments may then provide a link to install a native application associated with the credit utilization amount or provide a link to open an associated native application, such as a native application, to perform one or more of the operations described above.

In some embodiments, operations of the process 1800 may include obtaining a second message from the server in response to the first message, as indicated by block 1820. As described elsewhere in this disclosure, the second message may include instructions interpretable as commands to display notifications on a UI of the client computing device. For example, after receiving a notification command via a second web message, some embodiments may display a UI screen identified by a navigation destination sent via the second web message. The UI screen may include a value requested by the first web message or include a field value changed by the value of the first web message. For example, some embodiments may display a total amount of an available resource after the modification of the total amount by a request for additional allocatable resources. In some embodiments, the allocatable resource may be a computing resource. Alternatively, or in addition, the allocatable resource may include a credit amount, loan amount, or the like.

In some embodiments, the second message may be received in form of a whole audio file or an audio stream. For example, the second message may include the phrase "you have 30 available" or "your credit utilization is 20%" stored in the form an audio file. The audio file may be sent as a file stored in a waveform audio file format, an mp3 file format, a free lossless audio compression (FLAC) format, or the like. In some embodiments, the second message may be received as a text file that is then converted into an audio output. For example, some embodiments may receive, vi an HTTP web response, a string "you have 30% remaining" and, in response, generate an audio output using one or more natural language speech services based on the string.

In some embodiments, operations of the process 1800 may include updating a user interface based on the second message, as indicated by block 1840. As described elsewhere in this disclosure, some embodiments may use a set of methods, functions, or services native to an operating system of the client computing device to update a UI. For example, after receiving a credit utilization value via the second message, some embodiments may display the credit utilization value on a UI.

Some embodiments may generate a set of alerts based on the utilization amount. For example, some embodiments may determine that a utilization amount exceeds a pre-set threshold or user profile-defined threshold and, in response, generate an alert message. The alert message may be provided as a pop-up, an alert message sent to an in-app message center, or the like. In some embodiments, a UI element may provide a user with the means to update the alert thresholds. For example, some embodiments may allow a user to update a set of threshold values from [50%, 100%] to [25%, 50%, 100%], which may add an alert threshold of "25%." In some embodiments, satisfying an alert threshold may cause the update of a visual display of an application icon. For example, the visual display of an application icon on the home screen of an iOS device may be updated with a red circle and a utilization rate (e.g., via publishing dynamic data) to indicate that a credit utilization alert threshold has been satisfied. Implementations of the update may include the use of one or more APIs or related routines described in "httpXs://developer.apple.com/documentation/usernotifications/" or its related documents, the entire disclosure of which is hereby incorporated herein by reference. For example, some embodiments may use the methods described for the "UNUserNotificationCenter" class. Various communication channels may be used to generate a notification, such as via SMS text messaging, email, operating system-based notification, notifications in a web browser, notifications in a native application on a computing device, or the like. Some embodiments may use a messaging service such as Firebase Cloud Messaging to concurrently generate notifications or other messages across multiple platforms. Some embodiments may also selectively determine which communication channel to use based on an analysis of recorded past user response rate or response time.

When displaying a UI indicating a utilization amount, some embodiments may provide a hyperlink or other UI elements that allow a user to access their corresponding data. For example, some embodiments may provide a set of hyperlinks to the most significant changes to an account within a duration (e.g., greatest transaction(s) in an account, greatest allocation(s) for a computational resource, or the like). Some embodiments may differentiate types of transactions, such as confirmed transactions, pending transactions, rejected transactions, or other transaction categories based on text color, text background color, font size, font style, or the like. Some embodiments may further include a UI element that becomes visible, active, or may otherwise be interacted with by a user, where an interaction with the UI element may update a maximum utilization value. For example, some embodiments may determine that a credit account has reached the 50% alert threshold and, in response, determine whether the user of the credit account is permitted to increase their credit value. In response to a determination that the credit account user is permitted to increase their credit value, an application or service executing on a server may then provide a hyperlink to a user. An interaction with the hyperlink may cause some embodiments to display a navigation screen of a native application that permits a user to modify one or more values of a record associated with the user.

In some embodiments, operations of the process 1800 may include determining whether a user has viewed the notification, as indicated by block 1850. Some embodiments may determine whether the user has viewed a notification sent to a client computing device based on a set of measurements provided by the client computing device. For example, some embodiments may obtain accelerometer measurements, sound measurements, light measurements, gyroscopic measurements, or the like from a client computing device to determine whether a user has viewed an object. Some embodiments may require a user perform a facial recognition scan using an API of a client computing device before sending a notification that a notification has been read. In response to a determination that the notification has been detected by a user, some embodiments may send a notification to a second client computing device within a geographical range of the first client computing device. In response to a determination that the notification message is viewed by the user, operations of the process 1700 may proceed to block 1860. Otherwise, operations of the process 1700 may end or proceed to block 1804 to await user interaction.

In some embodiments, operations of the process 1800 may include receiving a second notification message via a second communication channel, as indicated by block 1860. Some embodiments may be capable of receiving notification message through different communication channels usable by a shared client computing device. For example, as described elsewhere in this disclosure, a mobile computing device such as a smart phone or tablet may be capable of receiving SMS text message notifications, Wi-Fi, Bluetooth, or the like. After receiving a first notifications message via a first communication channel such as a message sent over a Wi-Fi network, a server may determine that the first notification was not viewed by a user. The server may then send a second notification message to a client computing device, where some embodiments may receive the second notification via a communication channel that is different from the first communication channel. For example, some embodiments may receive a second notification message via a SMS text message.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored in a computer-accessible medium separate from computer system 500 may be transmitted to computer system 500 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored in a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third-party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C,"

and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood in view of the following enumerated embodiments:

1. A non-transitory, machine-readable medium storing instructions that, when executed by one or more processors, effectuate operations comprising: obtaining, with a computer system, a first message from a client computing device; determining, with the computer system, a set of values based on the first message, wherein a first subset of values of the set of values is associated with a first navigation screen, and wherein a second subset of values of the set of values is associated with a second navigation screen; generating, with the computer system, a second message comprising the set of values; sending, with the computer system, the second message to the client computing device; updating, with the computer system, a navigation stack stored on the client computing device based on the set of values by inserting a value of the first subset of values before a value of the second subset of values in a sequence of the navigation stack; and displaying, with the computer system, the second navigation screen based on the second subset of values, wherein an interaction with a user interface element of the client computing device causes the client computing device to display the first navigation screen.

2. The medium of embodiment 1, wherein: the navigation stack comprises an ordered sequence of values; obtaining the first message comprises obtaining the first message as a hypertext transfer protocol web request addressed to a uniform resource locator; the set of values comprises a sequence of identifiers of navigation destinations, the sequence of identifiers comprising a first destination identifier and a second destination identifier; each respective destination identifier of the sequence of identifiers maps to a respective destination object comprising a respective constructor method; the first navigation screen is associated with a first destination object identified by the first destination identifier; the second navigation screen is associated with a second destination object identified by the second destination identifier; determining the set of values comprises determining the second destination identifier based on the uniform resource locator; and displaying the second navigation screen comprises executing a constructor method of the second destination object.

3. The medium of embodiment 2, wherein: determining the set of values comprises determining a first subset of state values associated with the first destination identifier and a second subset of state values associated with the second destination identifier; the first subset of values comprises the first subset of state values and the first destination identifier; the second subset of values comprises the second subset of state values and the second destination identifier; the first subset of state values comprises a first value of a user record; the second subset of state values comprises a second value of the user record; and displaying the second navigation screen comprises displaying the second navigation screen to display the second subset of state values.

4. The medium of any one of embodiments 1-3, wherein the set of values is a first set of values, the operations further comprising: determining whether the client computing device has a first application stored on the client computing device based on the first message; and in response to a determination that the client computing device has the first application stored on the client computing device, selecting the first set of values from a plurality of sets of values, and wherein the second message causes the client computing device to update a stored sequence of navigation layers controlled by a navigation controller object of the first application.

5. The medium of any one of embodiments 1-4, wherein the first message is addressed to a uniform resource locator comprising an internet domain identifier, wherein the set of values is a first set of values, the operations further comprising: determining whether the client computing device has a first application stored on the client computing device based on the first message; in response to a determination that the client computing device does not have the first application stored on the client computing device, determine whether the first message includes a permission value that matches a value stored on a set of permission values; and in response to a determination that the first message includes the permission value that matches the value stored on the set of permission values, obtaining a program code for lessermemory application, wherein: a set of associated domains stored on the client computing device indicates that the lesser-memory application is associated with the internet domain identifier; and the second message comprises the program code for the lesser-memory application.

6. The medium of embodiment 5, wherein the lesser-memory application is less than 4 megabytes when transferred via the second message.

7. The medium of any one of embodiments 1-5, wherein determining the set of values comprises: retrieving a record from a data store based on the first message; obtaining a set of record values stored in the record; and determining the first subset of values and second subset of values based on the set of record values.

8. The medium of any one of embodiments 1-7, the operations further comprising: determining whether the client computing device has a first application stored on the client computing device based on the first message; and in response to a determination that the client computing device does not have the first application stored on the client computing device, obtaining a set of program code executable by a web browser of the client computing device, wherein: sending the second message comprises sending the set of program code; displaying the second navigation screen comprises executing the set of program code; and executing the set of program code comprises executing a re-direction command to navigate from the first navigation screen to the second navigation screen; and executing the re-direction command causes an update to a browser history of the web browser.

9. The medium of any one of embodiments 1-8, wherein: the client computing device is a first client computing device; the first message comprises data obtained from a second client computing device; the first subset of values comprises a first identifier associated with the first client computing device; and the second subset of values comprises a second identifier associated with the second client computing device.

10. The medium of embodiment 9, the operations further comprising determining whether the second identifier is identified by a set of user identifiers indicating an anomaly, wherein sending the second message to the client computing device comprises sending the second message to the client computing device in response to a determination that the second identifier is not identified by the set of user identifiers.

11. The medium of embodiment 9, wherein obtaining the data from the second client computing device comprises obtaining the data from a visual marker displayed on the second client computing device.

12. The medium of embodiment 9, the first message is collected from a wireless communication device transmitting a signal at a frequency between 13 megahertz and 14 megahertz.

13. The medium of any one of embodiments 1-12, the operations further comprising: retrieving a record from a data store based on the first message; obtaining a set of wireless signals from a second client computing device, wherein the first message comprises an identifier of the second client computing device; and sending a third message to the second client computing device, wherein the third message causes the second client computing device to display a record value of the record.

14. The medium of any one of embodiments 1-13, wherein the client computing device is a first client computing device, the operations further comprising: obtaining a third message from a second client computing device, wherein the first message and the third message are both addressed to a shared uniform resource locator; determining a second set of values based on the second message, wherein a third subset of values of the second set of values corresponds with a third navigation screen, and wherein the second set of values comprises the second subset of values; generating a fourth message comprising the second set of values; and sending the fourth message to the client computing device, wherein the fourth message causes the second client computing device to update a second navigation stack stored on the second client computing device based on the second set of values and display the second navigation screen.

15. The medium of any one of embodiments 1-14, wherein the first message comprises device comprises geolocation data measured by the client computing device.

16. The medium of any one of embodiments 1-15, wherein determining the set of values comprises providing a neural network model with data of the first message to retrieve the set of values, wherein: an output of the neural network model comprises a set of identifiers, and wherein the set of identifiers identifies the first navigation screen and the second navigation screen; and determining the set of values based on the set of identifiers.

17. The medium of any one of embodiments 1-16, wherein: the user interface element is a first user interface element; a navigation stack value of the navigation stack is generated based on at least one value of the set of values; and the second navigation screen comprises a second user interface element that, when interacted with, removes the navigation stack value from the navigation stack.

18. A system, comprising: one or more processors; and one or more computer readable media storing instructions that when executed by the one or more processors effectuate operations comprising: the operations of any one of embodiments 1-17.

19. A method, comprising: the operations of any one of embodiments 1-17.

What is claimed is:

1. A non-transitory, machine-readable medium storing instructions that, when executed by one or more processors, effectuate operations comprising:

obtaining, with a computer system, a first message from a client computing device, wherein the client computing device displays an initial screen associated with a first application during or prior to the obtaining the first message;

determining, with the computer system, whether the client computing device has a second application stored on the client computing device based on the first message;

in response to a determination that the client computing device has the second application stored on the client computing device, determining, with the computer system, a set of values based on the first message, wherein a first subset of values of the set of values is associated with a first navigation screen included in the second application, and wherein a second subset of values of the set of values is associated with a second navigation screen in the second application;

generating, with the computer system, a second message comprising the set of values;

sending, with the computer system, the second message to the client computing device;

updating, with the computer system and based on the set of values, a navigation stack that is stored on the client computing device and that includes an initial set of values associated with the first application before a value of the second subset of values in an ordered sequence of the navigation stack by inserting, before the value of the second subset of values in the sequence of the navigation stack, a value of the first subset of values that replaces the initial set of values; and displaying, with the computer system, the second navigation screen based on the second subset of values, wherein an interaction with a user interface element of the client computing device causes the client computing device to reference the updated navigation stack to display the first navigation screen included in the second application.

2. The medium of claim 1, wherein:

obtaining the first message comprises obtaining the first message as a hypertext transfer protocol web request addressed to a uniform resource locator;

the set of values comprises a sequence of identifiers of navigation destinations, the sequence of identifiers comprising a first destination identifier and a second destination identifier;

each respective destination identifier of the sequence of identifiers maps to a respective destination object comprising a respective constructor method;

the first navigation screen is associated with a first destination object identified by the first destination identifier;

the second navigation screen is associated with a second destination object identified by the second destination identifier;

determining the set of values comprises determining the second destination identifier based on the uniform resource locator; and displaying the second navigation screen comprises executing a constructor method of the second destination object.

3. The medium of claim 2, wherein:

determining the set of values comprises determining a first subset of state values associated with the first destination identifier and a second subset of state values associated with the second destination identifier;

the first subset of values comprises the first subset of state values and the first destination identifier;

the second subset of values comprises the second subset of state values and the second destination identifier;

the first subset of state values comprises a first value of a user record;

the second subset of state values comprises a second value of the user record; and displaying the second navigation screen comprises displaying the second navigation screen to display the second subset of state values.

4. The medium of claim 1, wherein the set of values is a first set of values, the operations further comprising:

in response to the determination that the client computing device has the second application stored on the client computing device, selecting the first set of values from a plurality of sets of values, and wherein the second message causes the client computing device to update a stored sequence of navigation layers controlled by a navigation controller object of the first application when updating the navigation stack.

5. The medium of claim 1, wherein the first message is addressed to a uniform resource locator comprising an internet domain identifier, wherein the set of values is a first set of values, the operations further comprising:

determining whether the client computing device has a third application stored on the client computing device based on the first message;

in response to a determination that the client computing device does not have the third application stored on the client computing device, determine whether the first message includes a permission value that matches a value stored on a set of permission values; and in response to a determination that the first message includes the permission value that matches the value stored on the set of permission values, obtaining a program code for lesser-memory application, wherein:
  a set of associated domains stored on the client computing device indicates that the lesser-memory application is associated with the internet domain identifier; and
  the second message comprises the program code for the lesser-memory application.

6. The medium of claim 5, wherein the lesser-memory application is less than 4 megabytes when transferred via the second message.

7. The medium of claim 1, wherein determining the set of values comprises:

retrieving a record from a data store based on the first message;

obtaining a set of record values stored in the record; and determining the first subset of values and second subset of values based on the set of record values.

8. The medium of claim 1, the operations further comprising:

determining whether the client computing device has a third application stored on the client computing device based on the first message; and in response to a determination that the client computing device does not have the third application stored on the client computing device, obtaining a set of program code executable by a web browser of the client computing device, wherein:
  sending the second message comprises sending the set of program code;
  displaying the second navigation screen comprises executing the set of program code; and
  executing the set of program code comprises executing a re-direction command to navigate from the first navigation screen to the second navigation screen; and executing the re-direction command causes an update to a browser history of the web browser.

9. The medium of claim 1, wherein:

the client computing device is a first client computing device;

the first message comprises data obtained from a second client computing device;

the first subset of values comprises a first identifier associated with the first client computing device; and the second subset of values comprises a second identifier associated with the second client computing device.

10. The medium of claim 9, the operations further comprising determining whether the second identifier is identified by a set of user identifiers indicating an anomaly, wherein sending the second message to the client computing device comprises sending the second message to the client computing device in response to a determination that the second identifier is not identified by the set of user identifiers.

11. The medium of claim 9, wherein obtaining the data from the second client computing device comprises obtaining the data from a visual marker displayed on the second client computing device.

12. The medium of claim 9, the first message is collected from a wireless communication device transmitting a signal at a frequency between 13 megahertz and 14 megahertz.

13. The medium of claim 1, the operations further comprising:
retrieving a record from a data store based on the first message;
obtaining a set of wireless signals from a second client computing device, wherein the first message comprises an identifier of the second client computing device; and
sending a third message to the second client computing device, wherein the third message causes the second client computing device to display a record value of the record.

14. The medium of claim 1, wherein the client computing device is a first client computing device, the operations further comprising:
obtaining a third message from a second client computing device, wherein the first message and the third message are both addressed to a shared uniform resource locator;
determining a second set of values based on the second message, wherein a third subset of values of the second set of values corresponds with a third navigation screen, and wherein the second set of values comprises the second subset of values;
generating a fourth message comprising the second set of values; and
sending the fourth message to the client computing device, wherein the fourth message causes the second client computing device to update a second navigation stack stored on the second client computing device based on the second set of values and display the second navigation screen.

15. The medium of claim 1, wherein the first message comprises geolocation data measured by the client computing device.

16. The medium of claim 1, wherein determining the set of values comprises providing a neural network model with data of the first message to retrieve the set of values, wherein:
an output of the neural network model comprises a set of identifiers, and wherein the set of identifiers identifies the first navigation screen and the second navigation screen; and
determining the set of values based on the set of identifiers.

17. The medium of claim 1, wherein:
the user interface element is a first user interface element;
a navigation stack value of the navigation stack is generated based on at least one value of the set of values; and
the second navigation screen comprises a second user interface element that, when interacted with, removes the navigation stack value from the navigation stack.

18. The medium of claim 1, wherein determining the set of values comprises steps for determining the set of values.

19. The medium of claim 1, wherein generating the second message comprises steps for generating the second message.

20. The medium of claim 1, wherein:
obtaining the first message comprises obtaining the first message as a hypertext transfer protocol web request addressed to a uniform resource locator;

the set of values comprises a sequence of identifiers of navigation destinations, the sequence of identifiers comprising a first destination identifier and a second destination identifier;
each respective destination identifier of the sequence of identifiers maps to a respective destination object comprising a respective constructor method;
the first navigation screen is associated with a first destination object identified by the first destination identifier;
the second navigation screen is associated with a second destination object identified by the second destination identifier;
determining the set of values comprises determining the second destination identifier based on the uniform resource locator;
displaying the second navigation screen comprises executing a constructor method of the second destination object;
determining the set of values comprises determining a first subset of state values associated with the first destination identifier and a second subset of state values associated with the second destination identifier;
the first subset of values comprises the first subset of state values and the first destination identifier;
the second subset of values comprises the second subset of state values and the second destination identifier;
the first subset of state values comprises a first value of a user record;
the second subset of state values comprises a second value of the user record;
displaying the second navigation screen comprises displaying the second navigation screen to display the second subset of state values;
the set of values is a first set of values, the operations further comprising:
in response to a determination that the client computing device has the second application stored on the client computing device, selecting the first set of values from a plurality of sets of values, and wherein the second message causes the client computing device to update a stored sequence of navigation layers controlled by a navigation controller object of the first application;
the first message is addressed to a uniform resource locator comprising an internet domain identifier, wherein the set of values is a first set of values, the operations further comprising:
determining whether the client computing device has a third application stored on the client computing device based on the first message;
in response to a determination that the client computing device does not have the third application stored on the client computing device, determine whether the first message includes a permission value that matches a value stored on a set of permission values; and
in response to a determination that the first message includes the permission value that matches the value stored on the set of permission values, obtaining a program code for lesser-memory application, wherein:
a set of associated domains stored on the client computing device indicates that the lesser-memory application is associated with the internet domain identifier; and the second message comprises the program code for the lesser-memory application;
the lesser-memory application is less than 4 megabytes when transferred via the second message;
determining the set of values comprises:
retrieving a record from a data store based on the first message;
obtaining a set of record values stored in the record; and
determining the first subset of values and second subset of values based on the set of record values;
the operations further comprise:
 determining whether the client computing device has the third application stored on the client computing device based on the first message; and
 in response to a determination that the client computing device does not have the third application stored on the client computing device, obtaining a set of program code executable by a web browser of the client computing device, wherein:
  sending the second message comprises sending the set of program code;
  displaying the second navigation screen comprises executing the set of program code; and
  executing the set of program code comprises executing a re-direction command to navigate from the first navigation screen to the second navigation screen; and
 executing the re-direction command causes an update to a browser history of the web browser;
the client computing device is a first client computing device;
the first message comprises data obtained from a second client computing device;
the first subset of values comprises a first identifier associated with the first client computing device;
the second subset of values comprises a second identifier associated with the second client computing device;
the operations further comprise determining whether the second identifier is identified by a set of user identifiers indicating an anomaly, wherein sending the second message to the client computing device comprises sending the second message to the client computing device in response to a determination that the second identifier is not identified by the set of user identifiers;
obtaining the data from the second client computing device comprises obtaining the data from a visual marker displayed on the second client computing device;
the first message is collected from a wireless communication device transmitting a signal at a frequency between 13 megahertz and 14 megahertz;
operations further comprise:
 retrieving a record from a data store based on the first message;
 obtaining a set of wireless signals from a second client computing device, wherein the first message comprises an identifier of the second client computing device; and
 sending a third message to the second client computing device, wherein the third message causes the second client computing device to display a record value of the record;
the operations further comprise:
 obtaining a third message from a second client computing device, wherein the first message and the third message are both addressed to a shared uniform resource locator;
 determining a second set of values based on the second message, wherein a third subset of values of the second set of values corresponds with a third navigation screen, and wherein the second set of values comprises the second subset of values;
 generating a fourth message comprising the second set of values; and
 sending the fourth message to the client computing device, wherein the fourth message causes the second client computing device to update a second navigation stack stored on the second client computing device based on the second set of values and display the second navigation screen;
the first message comprises geolocation data measured by the client computing device;
determining the set of values comprises providing a neural network model with data of the first message to retrieve the set of values, wherein:
 an output of the neural network model comprises a set of identifiers, and wherein the set of identifiers identifies the first navigation screen and the second navigation screen; and
 determining the set of values based on the set of identifiers;
the user interface element is a first user interface element;
a navigation stack value of the navigation stack is generated based on at least one value of the set of values; and
the second navigation screen comprises a second user interface element that, when interacted with, removes the navigation stack value from the navigation stack.

21. A method comprising:
 obtaining, with a computer system, a first message from a client computing device, wherein the client computing device displays an initial screen associated with a first application during or prior to the obtaining the first message;
 determining, with the computer system, whether the client computing device has a second application stored on the client computing device based on the first message;
 in response to a determination that the client computing device has the second application stored on the client computing device, determining, with the computer system, a set of values based on the first message, wherein a first subset of values of the set of values is associated with a first navigation screen included in the second application, and wherein a second subset of values of the set of values is associated with a second navigation screen in the second application;
 generating, with the computer system, a second message comprising the set of values;
 sending, with the computer system, the second message to the client computing device;
 updating, with the computer system and based on the set of values, a navigation stack that is stored on the client computing device and that includes an initial set of values associated with the first application before a value of the second subset of values in an ordered sequence of the navigation stack by inserting, before the value of the second subset of values in the sequence of the navigation stack, a value of the first subset of values that replaces the initial set of values; and
 displaying, with the computer system, the second navigation screen based on the second subset of values, wherein an interaction with a user interface element of the client computing device causes the client computing device to reference the updated navigation stack to display the first navigation screen included in the second application.

* * * * *